(12) United States Patent
Ishihara et al.

(10) Patent No.: US 10,483,665 B2
(45) Date of Patent: Nov. 19, 2019

(54) GROUND TERMINAL AND WIRE HARNESS

(71) Applicants: YAZAKI CORPORATION, Tokyo (JP); TOYOTA JIDOSHA KABUSHIKI KAISHA, Toyota-shi, Aichi-ken (JP)

(72) Inventors: Yoshiyuki Ishihara, Toyota (JP); Hiroki Goto, Aichi (JP); Takashi Nomoto, Aichi (JP); Takahiro Shiohama, Shizuoka (JP); Shuji Ueno, Aichi (JP); Hiroyuki Matsuda, Toyota (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/371,763

(22) Filed: Dec. 7, 2016

(65) Prior Publication Data

US 2017/0170580 A1 Jun. 15, 2017

(30) Foreign Application Priority Data

Dec. 9, 2015 (JP) .................................. 2015-240442

(51) Int. Cl.
*H01R 11/32* (2006.01)
*B60R 16/02* (2006.01)
(Continued)

(52) U.S. Cl.
CPC .......... *H01R 11/32* (2013.01); *B60R 16/0215* (2013.01); *H01B 7/0045* (2013.01);
(Continued)

(58) Field of Classification Search
CPC ......... H01R 11/11; H01R 11/12; H01R 11/32; H01R 4/185; H01R 4/186; H01R 4/34; H01R 4/64; B60R 16/0215; H01B 7/0045
(Continued)

(56) References Cited

U.S. PATENT DOCUMENTS

| 2,406,079 A | * | 8/1946 | Krueger | H01R 4/16 |
|||||29/12|
| 2,748,452 A | * | 6/1956 | Pierce | H01R 13/115 |
|||||206/717|

(Continued)

FOREIGN PATENT DOCUMENTS

| CN | 103814480 A | 5/2014 |
| CN | 104143798 A | 11/2014 |

(Continued)

OTHER PUBLICATIONS

Communication dated Sep. 26, 2017 from the Japanese Patent Office in counterpart application No. 2015-240442.
(Continued)

*Primary Examiner* — Harshad C Patel
(74) *Attorney, Agent, or Firm* — Sughrue Mion, PLLC

(57) ABSTRACT

A ground terminal and a wire harness include a conductor connecting portion to which a linear conductor is connected, a plurality of fastening portions each of which is connected to the conductor connecting portion, is formed into a planar shape, and is capable of being fastened to a grounding surface through a fastening member in a state of facing the grounding surface, and a deformation portion that connects the fastening portions and is deformed more easily than the fastening portions. As a result, the ground terminal and the wire harness provide an effect of being properly fastened to the grounding surface.

3 Claims, 43 Drawing Sheets

(51) Int. Cl.
*H01B 7/00* (2006.01)
*H01R 4/18* (2006.01)
*H01R 4/26* (2006.01)
*H01R 4/34* (2006.01)
*H01R 11/12* (2006.01)

(52) U.S. Cl.
CPC .............. *H01R 4/185* (2013.01); *H01R 4/188* (2013.01); *H01R 4/26* (2013.01); *H01R 4/34* (2013.01); *H01R 11/12* (2013.01)

(58) Field of Classification Search
USPC .......................................................... 439/109
See application file for complete search history.

(56) References Cited

U.S. PATENT DOCUMENTS

| | | | | |
|---|---|---|---|---|
| 3,082,397 A * | 3/1963 | Clarkson | ................ | H01R 33/05 29/413 |
| 4,196,960 A * | 4/1980 | Gelfand | ................. | H01R 11/12 439/874 |
| 4,396,960 A * | 8/1983 | Matla | ................. | G11B 5/59633 360/77.02 |
| 4,983,133 A | 1/1991 | Van Scyoc et al. | | |
| 5,558,531 A * | 9/1996 | Ikeda | .................... | H01R 11/12 439/287 |
| 5,688,131 A * | 11/1997 | Byfield, Jr. | ............... | H01R 4/64 439/883 |
| 5,934,923 A * | 8/1999 | Matsuoka | .............. | H01R 11/12 439/287 |
| 6,086,399 A * | 7/2000 | Matsunaga | ............ | H01R 4/305 439/287 |
| 6,530,795 B2 * | 3/2003 | Maeda | ................... | H01R 11/12 439/287 |
| 6,783,377 B2 * | 8/2004 | Aoyama | ................ | H01R 11/12 439/92 |
| 7,192,319 B1 * | 3/2007 | Rahman | ............... | H01H 85/044 439/766 |
| 7,467,968 B1 * | 12/2008 | Sink | ........................ | H01R 11/11 439/491 |
| 8,137,116 B2 * | 3/2012 | Omori | .................. | H01R 13/648 439/883 |
| 8,382,535 B2 * | 2/2013 | Werthman | ............. | H01R 11/12 439/177 |
| 9,559,443 B2 * | 1/2017 | Boutin | .................... | H01R 11/11 |
| 2008/0182462 A1 * | 7/2008 | Werthman | ............. | H01R 11/12 439/884 |
| 2010/0087106 A1 * | 4/2010 | Lawson | ................. | H01R 11/12 439/884 |
| 2012/0208410 A1 * | 8/2012 | Ikeda | .................... | H01M 2/206 439/883 |
| 2014/0235078 A1 | 8/2014 | Omori et al. | | |
| 2014/0335743 A1 | 11/2014 | Kakimi et al. | | |
| 2015/0280332 A1 * | 10/2015 | Naganishi | ................ | H01R 4/30 439/781 |
| 2016/0141774 A1 * | 5/2016 | Boutin | .................... | H01R 11/11 439/518 |

FOREIGN PATENT DOCUMENTS

| | | |
|---|---|---|
| JP | 50-14586 U | 2/1973 |
| KR | 1020100120107 A | 11/2010 |
| WO | 2015/079988 A1 | 6/2015 |

OTHER PUBLICATIONS

Communication dated Jul. 4, 2018 from the State Intellectual Property Office of the P.R.C. in counterpart Chinese application No. 201611121535.X.

* cited by examiner

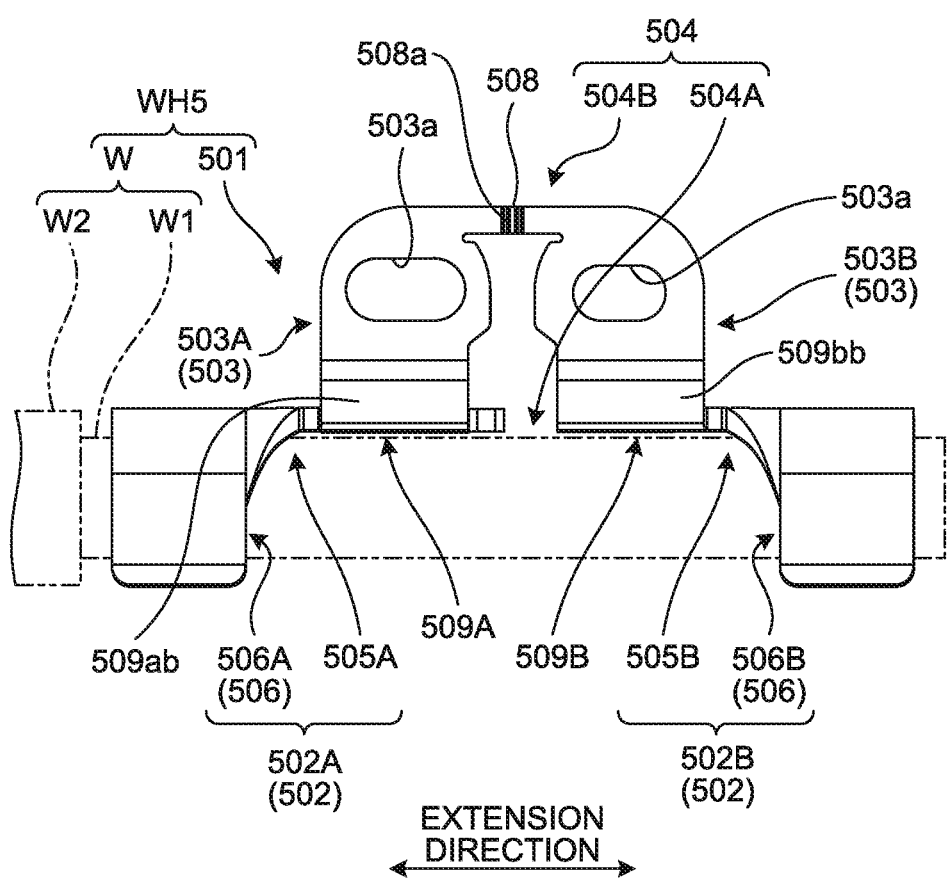

US 10,483,665 B2

GROUND TERMINAL AND WIRE HARNESS

CROSS-REFERENCE TO RELATED APPLICATION(S)

The present application claims priority to and incorporates by reference the entire contents of Japanese Patent Application No. 2015-240442 filed in Japan on Dec. 9, 2015.

BACKGROUND OF THE INVENTION

1. Field of the Invention

The present invention relates to a ground terminal and a wire harness.

2. Description of the Related Art

As a conventional ground terminal that is applied to a wire harness or the like, International Publication No. WO 2015/079988, for example, discloses a ground terminal that is mounted, with a bolt, on a body formed by coating a grounding surface of a housing made of conductive metal with a non-conductive film.

The above-mentioned ground terminal as disclosed in International Publication No. WO 2015/079988 has room for further improvement in, for example, more proper fastening to the ground surface.

SUMMARY OF THE INVENTION

The present invention has been made in view of the above-mentioned circumstances and an object thereof is to provide an ground terminal and a wire harness capable of being fastened to a grounding surface properly.

In order to achieve the above mentioned object, a ground terminal according to one aspect of the present invention includes a conductor connecting portion to which a linear conductor is connected; a plurality of fastening portions each of which is connected to the conductor connecting portion, is formed into a planar shape, and is capable of being fastened to a grounding surface through a fastening member in a state of facing the grounding surface; and a deformation portion that connects the fastening portions and is deformed more easily than the fastening portions.

According to another aspect of the present invention, in the ground terminal, it is possible to configure that the deformation portion includes a thin portion that is formed to be thinner than the fastening portions.

According to still another aspect of the present invention, in the ground terminal, it is possible to configure that the thin portion has a recess at a surface side facing the grounding surface.

According to still another aspect of the present invention, in the ground terminal, it is possible to configure that at least one of the conductor connecting portion is provided corresponding to each of the fastening portions, and the deformation portion includes the linear conductor that connects the fastening portions through the respective conductor connecting portions and is more flexible than the fastening portions.

According to still another aspect of the present invention, in the ground terminal, it is possible to configure that the deformation portion includes a bending connecting portion that connects the fastening portions through a bending portion.

According to still another aspect of the present invention, in the ground terminal, it is possible to configure that the bending portion projects to a side separated from the grounding surface and is bent.

According to still another aspect of the present invention, in the ground terminal, it is possible to configure that at least one of the conductor connecting portion is provided corresponding to each of the fastening portions, and the deformation portion includes a first deformation portion including the linear conductor that connects the fastening portions through the respective conductor connecting portions and is more flexible than the fastening portions, and a second deformation portion that connects the fastening portions connected by the first deformation portion and includes a thin portion that is formed to be thinner than the fastening portions.

According to still another aspect of the present invention, in the ground terminal, it is possible to configure that the deformation portion is provided at a position facing the grounding surface.

According to still another aspect of the present invention, in the ground terminal, it is possible to further include projecting portions that are formed so as to project from the fastening portions, abut against the grounding surface, and form foreign matter avoiding space portions capable of accommodating objects on the grounding surface between the fastening portions and the grounding surface, in a state where the fastening portions face the grounding surface.

In order to achieve the above mentioned object, a wire harness according to still another aspect of the present invention includes an electric wire that includes a linear conductor having conductivity; and a ground terminal that includes a conductor connecting portion to which the linear conductor is connected, a plurality of fastening portions each of which is connected to the conductor connecting portion, is formed into a planar shape, and is capable of being fastened to a grounding surface through a fastening member in a state of facing the grounding surface, and a deformation portion that connects the fastening portions and is deformed more easily than the fastening portions.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 59 is a plan view illustrating the schematic configuration of the ground terminal in the seventeenth embodiment.

DETAILED DESCRIPTION OF THE PREFERRED EMBODIMENTS

Hereinafter, embodiments according to the present invention will be described in detail with reference to the drawings. The embodiments do not limit the present invention. Components in the following embodiments encompass components capable of being easily replaced by those skilled in the art and substantially the same components.

First Embodiment

Figure 1:
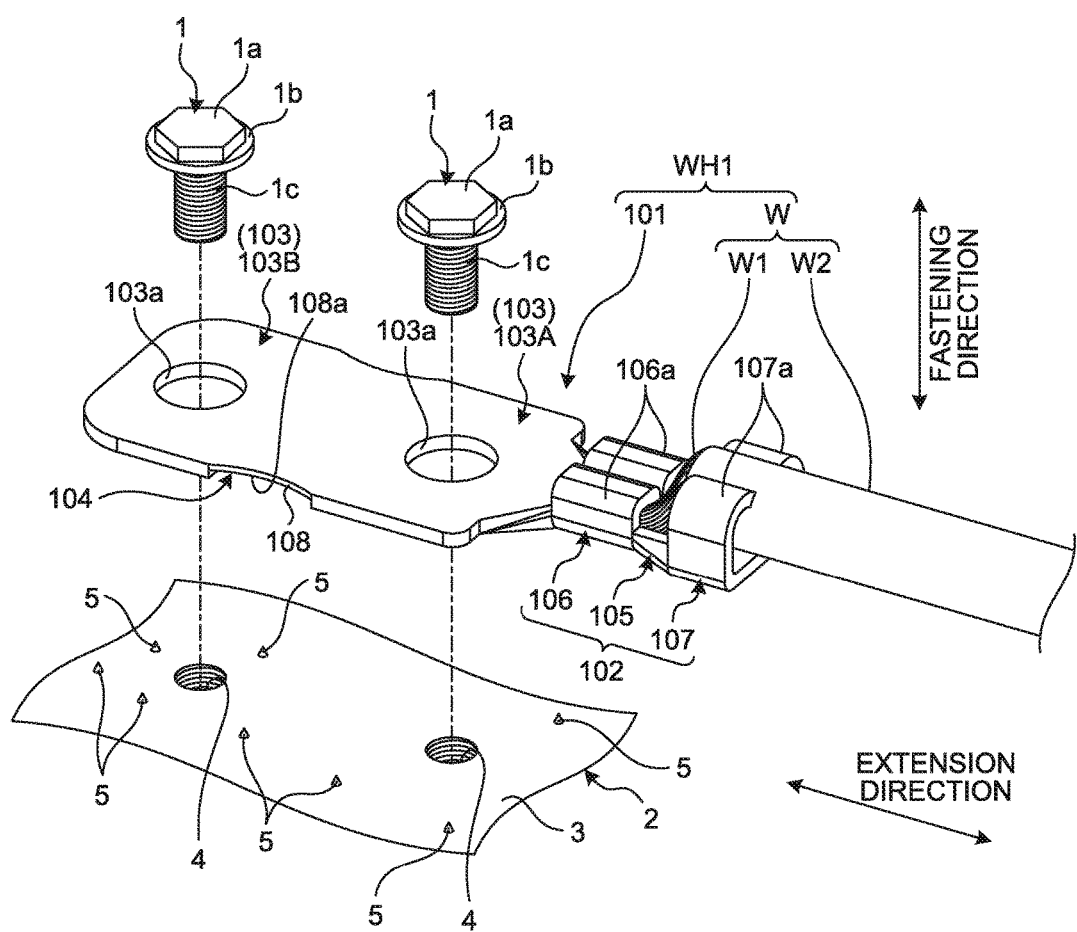
FIG. 1 is a perspective view illustrating a schematic configuration of a ground terminal according to a first embodiment.
Figure 2:
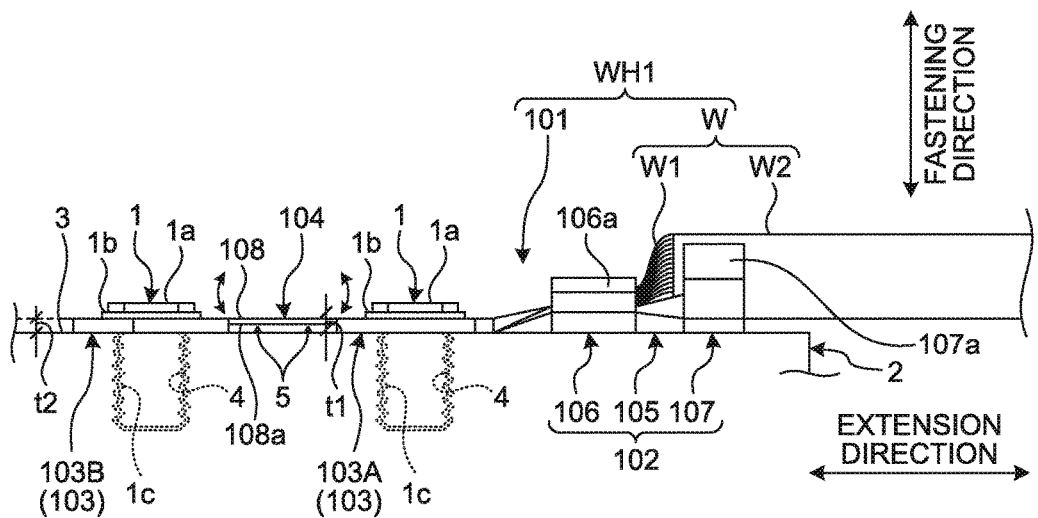
FIG. 2 is a side view illustrating the schematic configuration of the ground terminal in the first embodiment.
Figure 3:
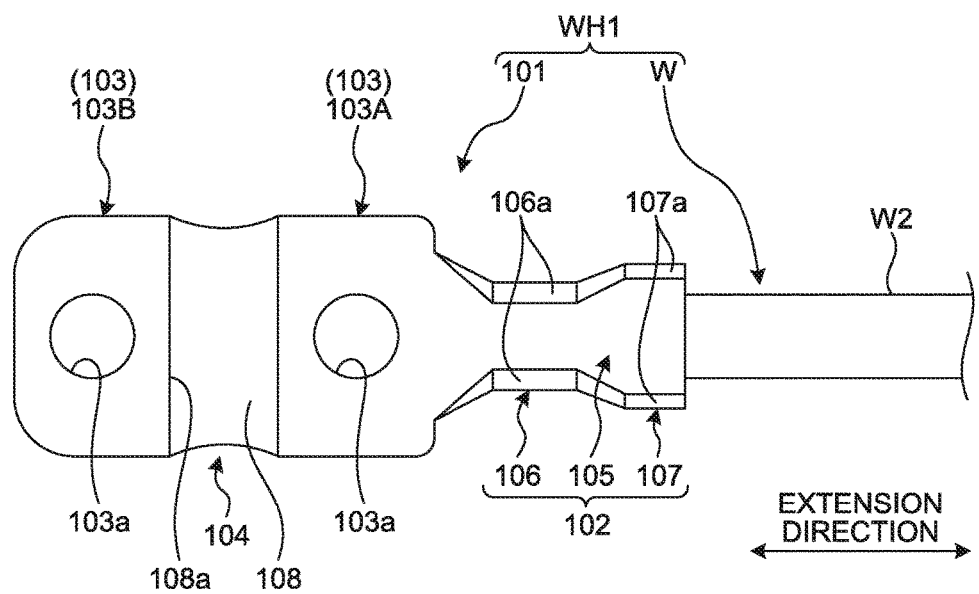
FIG. 3 is a plan view illustrating the schematic configuration of the ground terminal in the first embodiment.

FIG. 1 is a perspective view illustrating a schematic configuration of a ground terminal according to a first embodiment. FIG. 2 is a side view illustrating the schematic configuration of the ground terminal in the first embodiment. FIG. 3 is a plan view illustrating the schematic configuration of the ground terminal in the first embodiment (plan view at the side facing a grounding surface).

A ground terminal 101 in the embodiment as illustrated in FIG. 1, FIG. 2, and FIG. 3 is applied to, for example, a wire harness WH1 that is used for a car or the like, is mounted on a grounding surface 3 of a fixing portion 2 such as a vehicle body through fastening members 1 such as bolts, and makes what-is-called grounding. The wire harness WH1 is used for power supply and signal communication in order to connect devices that are mounted on, for example, a car. The fixing portion 2 such as the vehicle body has the planar grounding surface 3 that is configured by, for example, coating the surface of a housing made of conductive metal with a non-conductive film such as a coating film and screw holes 4 for fastening the fastening members 1 to the grounding surface 3 are formed therein. The ground terminal 101 is typically fastened to the grounding surface 3 through the fastening members 1 and the screw holes 4 in a state of facing the grounding surface 3 and is electrically connected to the fixing portion 2 through contact sites between the fastening members 1 and the screw holes 4, and the like, to make grounding.

Fine foreign matters 5 generated by welding, cutting processing, or the like in a manufacturing process or the like adhere to the grounding surface 3 of the fixing portion 2 in some cases. When, for example, the grounding surface 3 is coated with the coating film as described above, the foreign matters 5 are fixed to the grounding surface 3 in a state of being covered by the coating film in some cases. The ground terminal 101 in the embodiment has the configuration capable of being fastened to the grounding surface 3 properly even when, for example, the fine foreign matters 5 adhere to the grounding surface 3 as described above. Hereinafter, the configuration of the ground terminal 101 will be described in detail with reference to the drawings.

In the following description, the direction in which fastening is performed with the fastening members 1 is referred to as a "fastening direction" in some cases. The fastening direction typically corresponds to a direction along the normal line direction of the grounding surface 3 formed into the planar shape. Furthermore, the direction in which an electric wire W configuring the wire harness WH1 extends linearly is referred to as an "extension direction" in some cases. The respective directions used in the following description express directions in a state where respective parts are assembled on one another unless otherwise specified.

The wire harness WH1 to which the ground terminal 101 in the embodiment is applied enables a plurality of electric wires W to be connected to respective devices that are mounted on, for example, a vehicle at a time by connectors or the like while the electric wires W to be used for power supply and signal communication are bundled to form a unit component in order to connect the devices. The wire harness WH1 includes the electric wire W and the ground terminal 101 provided at a terminal of the electric wire W. The electric wire W is a what-is-called ground wire and includes, for example, a linear conductor W1 having conductivity and a cover portion W2 having insulating property that covers the outer side of the linear conductor W1. The linear conductor W1 in the embodiment is a core wire formed by bundling a plurality of strands made of conductive metal such as copper, copper alloy, aluminum, and aluminum alloy. Alternatively, the linear conductor W1 may be a twisted core wire formed by twisting a plurality of strands or may be a metal bar or the like. The cover portion W2 is wire cover that covers the outer circumferential side of the linear conductor W1. The cover portion W2 is formed by, for example, extrusion molding of an insulating resin material (PP, PVC, cross-linked PE, or the like that is appropriately selected in consideration of abrasion resistance, chemical resistance, heat resistance, and the like) or the like. The cover portion W2 of the electric wire W is stripped off at at least one terminal of the linear conductor W1, the one terminal of the linear conductor W1 is exposed from the cover portion W2, and the ground terminal 101 is provided at the exposed terminal of the linear conductor W1. In this example, the electric wire W is formed so as to extend with a substantially constant diameter in the linearly extending extension direction. The cross-sectional shape (cross-sectional shape in the direction intersecting with the extension direction) of the linear conductor W1 is substantially circular, the cross-sectional shape (cross-sectional shape in the direction intersecting with the extension direction) of the cover portion W2 is substantially circular ring, and the cross-sectional shape of the electric wire W as a whole is substantially circular. The wire harness WH1 may be configured by further including a grommet, a protector, and a fixing tool.

The ground terminal 101 in the embodiment includes a wire connecting portion 102, a plurality of fastening portions 103, and a deformation portion 104. The overall ground terminal 101 is integrally configured with conductive metal such as copper, copper alloy, aluminum, and aluminum alloy. The respective parts such as the wire connecting portion 102, the fastening portions 103, and the deformation portion 104 are integrally formed in the ground terminal 101 by, for example, press molding of one metal plate punched to have shapes corresponding to the respective parts. The ground terminal 101 includes two fastening portions 103, that is, a first fastening portion 103A as the first fastening portion 103 and a second fastening portion 103B as the second fastening portion 103. The ground terminal 101 is integrally formed in such a manner that the wire connecting portion 102, the first fastening portion 103A, the deformation portion 104, and the second fastening portion 103B are aligned in this order from one side to the other side in the extension direction. In the following description, when the first fastening portion 103A and the second fastening portion 103B need not to be particularly distinguished from each other, they are simply referred to as the "fastening portion 103" in some cases.

The wire connecting portion 102 is a portion to which the electric wire W is connected. To be more specific, the wire connecting portion 102 includes a base portion 105 on which the terminal of the electric wire W is arranged, a conductor connecting portion 106 to which the linear conductor W1 of the electric wire W is connected, and a cover connecting portion 107 to which the cover portion W2 of the electric wire W is connected. The base portion 105 is a portion on which the terminal of the electric wire W is placed and is formed into a substantially rectangular plate shape. The conductor connecting portion 106 is a portion on which the terminal of the linear conductor W1 is crimped and includes a pair of caulking pieces 106a. The cover connecting portion 107 is a portion on which the terminal of the cover portion W2 is crimped and includes a pair of caulking pieces 107a. Each of the caulking pieces 106a and 107a is a band-like portion formed so as to project from the base portion 105 along the direction orthogonal to the extension direction of the electric wire W. The caulking pieces 106a are formed on an end portion of the base portion 105 at one side in the extension direction, in this example, on the end portion thereof at the first fastening portion 103A side. The caulking pieces 107a are formed on an end portion of the base portion 105 at the other side in the extension direction, in this example, on the end portion thereof at the opposite side to the first fastening portion 103A side so as to be spaced from the caulking pieces 106a along the extension direction. In the wire connecting portion 102, in a state where the terminal of the electric wire W at the side at which the linear conductor W1 is exposed is placed on the base portion 105, the linear conductor W1 is located at the side of the caulking pieces 106a, and the cover portion W2 is located at the side of the caulking pieces 107a, the linear conductor W1 is caulked together with the caulking pieces 106a and the cover portion W2 is caulked together with the caulking pieces 107a. With this, in the wire connecting portion 102, the linear conductor W1 is crimped between the caulking pieces 106a and the base portion 105 in the conductor connecting portion 106 and the cover portion W2 is crimped between the caulking pieces 107a and the base portion 105 in the cover connecting portion 107.

Each of the fastening portions 103 is a portion that is connected to the wire connecting portion 102 including the conductor connecting portion 106, is formed into a planar shape, and can be fastened to the grounding surface 3 through the fastening member 1 in a state of facing the grounding surface 3. The fastening portions 103 in the embodiment include the first fastening portion 103A and the second fastening portion 103B as described above. Both of the first fastening portion 103A and the second fastening portion 103B are formed into substantially rectangular plate shapes. The base portion 105 of the wire connecting portion 102 is connected to the first fastening portion 103A at one end side in the extension direction and the deformation portion 104 is connected to the first fastening portion 103A at the other end side in the extension direction. In other words, the first fastening portion 103A is formed so as to project along the extension direction from the base portion 105. The deformation portion 104 is connected to the second fastening portion 103B at one end side in the extension direction. The first fastening portion 103A and the second fastening portion 103B are formed into the planar shape so as to face and be substantially parallel with the grounding surface 3 in the fastening direction in a state of being fastened to the grounding surface 3, and the normal line of the plane intersects with the extension direction. In this example, the normal line of the plane of the first fastening portion 103A and the second fastening portion 103B is typically along the fastening direction. The first fastening portion 103A and the second fastening portion 103B are formed on substantially the same plane as the base portion 105.

Both of the first fastening portion 103A and the second fastening portion 103B have fastening holes 103a formed at substantially center positions. The respective fastening holes 103a penetrate through the first fastening portion 103A and the second fastening portion 103B in the fastening direction and the fastening members 1 are inserted into the respective fastening holes 103a. The fastening members 1 are bolts having hexagonal head portions 1a and include washers 1b and shaft portions 1c to be integrally formed. The washers 1b are formed into circular ring plate shapes having larger diameters than those of the head portions 1a. The shaft portions 1c extend in bar shapes to the side of the washers 1b from the head portions 1a and screw threaded grooves capable of being screwed with the screw holes 4 in the grounding surface 3 are formed on the shaft portions 1c. When the shaft portions 1c of the fastening members 1 are inserted into the respective fastening holes 103a and the shaft portions 1c are screwed with the screw holes 4 in the grounding surface 3, the first fastening portion 103A and the second fastening portion 103B are held between the washers 1b and the grounding surface 3 and fastening force acts thereon. With this, the first fastening portion 103A and the second fastening portion 103B are fastened to the grounding surface 3. The first fastening portion 103A and the second fastening portion 103B are electrically connected to the fixing portion 2 through the shaft portions 1c of the fastening members 1 and the inner circumferential surfaces of the screw holes 4 in a state of being fastened to the screw holes 4 in the grounding surface 3 through the fastening members 1. Each of the fastening portions 103, in this example, each of the first fastening portion 103A and the second fastening portion 103B is electrically connected to the fixing portion 2.

The deformation portion 104 is a portion that connects the fastening portions 103 and is configured to be deformed more easily than the fastening portions 103. The deformation portion 104 is located between the first fastening portion 103A and the second fastening portion 103B in the extension direction and is configured as a portion connecting the first fastening portion 103A and the second fastening portion 103B. That is to say, the first fastening portion 103A is connected to the deformation portion 104 at one end side in the extension direction and the second fastening portion 103B is connected to the deformation portion 104 at the other end side in the extension direction.

The deformation portion 104 in the embodiment includes a thin portion 108 that is formed to be thinner than the fastening portions 103. The thin portion 108 is formed into a plate shape connecting the first fastening portion 103A and the second fastening portion 103B and is formed such that a plate thickness t1 (see FIG. 2) thereof along the fastening direction is smaller than a plate thickness t2 (see FIG. 2) of the first fastening portion 103A and the second fastening portion 103B. The thin portion 108 has a recess 108a that is formed at the surface side facing the grounding surface 3 in accordance with the difference between the plate thickness t1 and the plate thickness t2 in a state where the first fastening portion 103A and the second fastening portion 103B are fastened to the grounding surface 3. That is to say, in this example, the surface of the thin portion 108 at the side facing the grounding surface 3 has a step with respect to the first fastening portion 103A and the second fastening portion 103B whereas the surface thereof at the side opposite to the side facing the grounding surface 3 is uniform with the first fastening portion 103A and the second fastening portion 103B on the same plane. The recess 108a is preferably formed such that the depth thereof along the fastening direction is larger than the previously supposed depths of the foreign matters 5. Both end portions of the thin portion 108 in the direction orthogonal to the extension direction and the fastening direction are curved in a constricted form. The thin portion 108 is formed in a range in which it does not overlap with portions of the first fastening portion 103A and the second fastening portion 103B that are held between the washers 1b and the grounding surface 3 and on which the fasting force acts. The thin portion 108 configuring the deformation portion 104 in the embodiment is provided at a position facing the grounding surface 3 in the fastening direction in a state where the first fastening portion 103A and the second fastening portion 103B are fastened to the grounding surface 3.

The ground terminal 101 as described above includes the conductor connecting portion 106 to which the linear conductor W1 is connected, the fastening portions 103 each of which is connected to the conductor connecting portion 106, is formed into the planar shape, and can be fastened to the grounding surface 3 through the fastening member 1 in the state of facing the grounding surface 3, and the deformation portion 104 that connects the fastening portions 103 and is deformed more easily than the fastening portions 103. The wire harness WH1 as described above includes the electric wire W including the linear conductor W1 having conductivity and the above-mentioned ground terminal 101.

Accordingly, even when, for example, objects such as the fine foreign matters 5 adhere to the grounding surface 3, the ground terminal 101 and the wire harness WH1 can improve the possibility of the fastening portion 103 capable of being fastened to the grounding surface 3 to exist without running onto the foreign matters 5 by providing the fastening portions 103 that are fastened to the grounding surface 3. Furthermore, the ground terminal 101 and the wire harness WH1 can absorb a possibly generated step between the fastening portion 103 that has not run onto the foreign matters 5 and the fastening portion 103 that has run onto the foreign matters 5 with deformation of the deformation portion 104. The fastening portion 103 that has not run onto the foreign matters 5 can therefore be prevented from following the fastening portion 103 that has run onto the foreign matters 5 and being influenced by the foreign matters 5. The ground terminal 101 and the wire harness WH1 can thereby improve the possibility that any of the fastening portions 103 is fastened to the grounding surface 3 with a proper positional relation with the grounding surface 3, that is, a positional relation of facing the grounding surface 3 substantially in parallel. For example, there is a risk that, for the ground terminal 101 and the wire harness WH1, proper fastening force cannot be ensured or the fastening members 1 are easily loosened due to vibration when the fastening portions 103 run onto the foreign matters 5 and are fastened in an inclined state with respect to the grounding surface 3. To address this risk, the ground terminal 101 and the wire harness WH1 can improve the possibility of the fastening portion 103 that is fastened with the proper positional relation as described above to exist, thereby easily ensuring the state in which any of the fastening portions 103 is fastened properly. As a result, the ground terminal 101 and the wire harness WH1 absorb the step with the deformation portion 104 even when any of the fastening portions 103 run onto the foreign matters 5 and can improve the possibility of the fastening portion 103 capable of facing and being fastened to the grounding surface 3 properly to exist, thereby being properly fastened to the grounding surface 3.

With the ground terminal 101 and the wire harness WH1 as described above, the deformation portion 104 includes the thin portion 108 that is formed to be thinner than the fastening portions 103. Accordingly, the ground terminal 101 and the wire harness WH1 can make the deformation portion 104 easy to be deformed with the thin portion 108, thereby absorbing the possibly generated step between the fastening portion 103 that has not run onto the foreign matters 5 and the fastening portion 103 that has run onto the foreign matters 5 by causing the thin portion 108 to function as a hinge. With the ground terminal 101 and the wire harness WH1 in this example, the end portions of the thin portion 108 are formed to be curved in the constricted form, thereby making the deformation portion 104 easier to be deformed. Furthermore, in the ground terminal 101 and the wire harness WH1, the deformation portion 104 can be easily formed by press processing or the like.

Furthermore, with the ground terminal 101 and the wire harness WH1 as described above, the thin portion 108 has the recess 108a at the surface side facing the grounding surface 3. Accordingly, the ground terminal 101 and the wire harness WH1 cause the recess 108a of the thin portion 108 to function as a foreign matter avoiding (escape) space portion for accommodating the foreign matters 5 as the objects on the grounding surface 3 and preventing running onto the foreign matters 5, thereby reducing the possibility that the deformation portion 104 itself runs onto the foreign matters 5.

Moreover, with the ground terminal 101 and the wire harness WH1 as described above, the deformation portion 104 is provided at the position facing the grounding surface 3. Accordingly, the ground terminal 101 and the wire harness WH1 enable the grounding surface 3 to function as a receiving surface of the deformation portion 104, thereby preventing excessive deformation of the deformation portion 104 and vibration from the deformation portion 104.

Although the thin portion 108 as described above has the recess 108a at the surface side facing the grounding surface 3 in the state in which the first fastening portion 103A and the second fastening portion 103B are fastened to the grounding surface 3, the position of the recess 108a is not limited thereto and a recess may be formed at the surface side opposite to the surface facing the grounding surface 3 or recesses may be formed at both surface sides. Furthermore, although both end portions of the thin portion 108 in the direction orthogonal to the extension direction and the fastening direction are curved in the constricted form in the above description, the thin portion 108 is not limited thereto.

Second Embodiment

Figure 4:
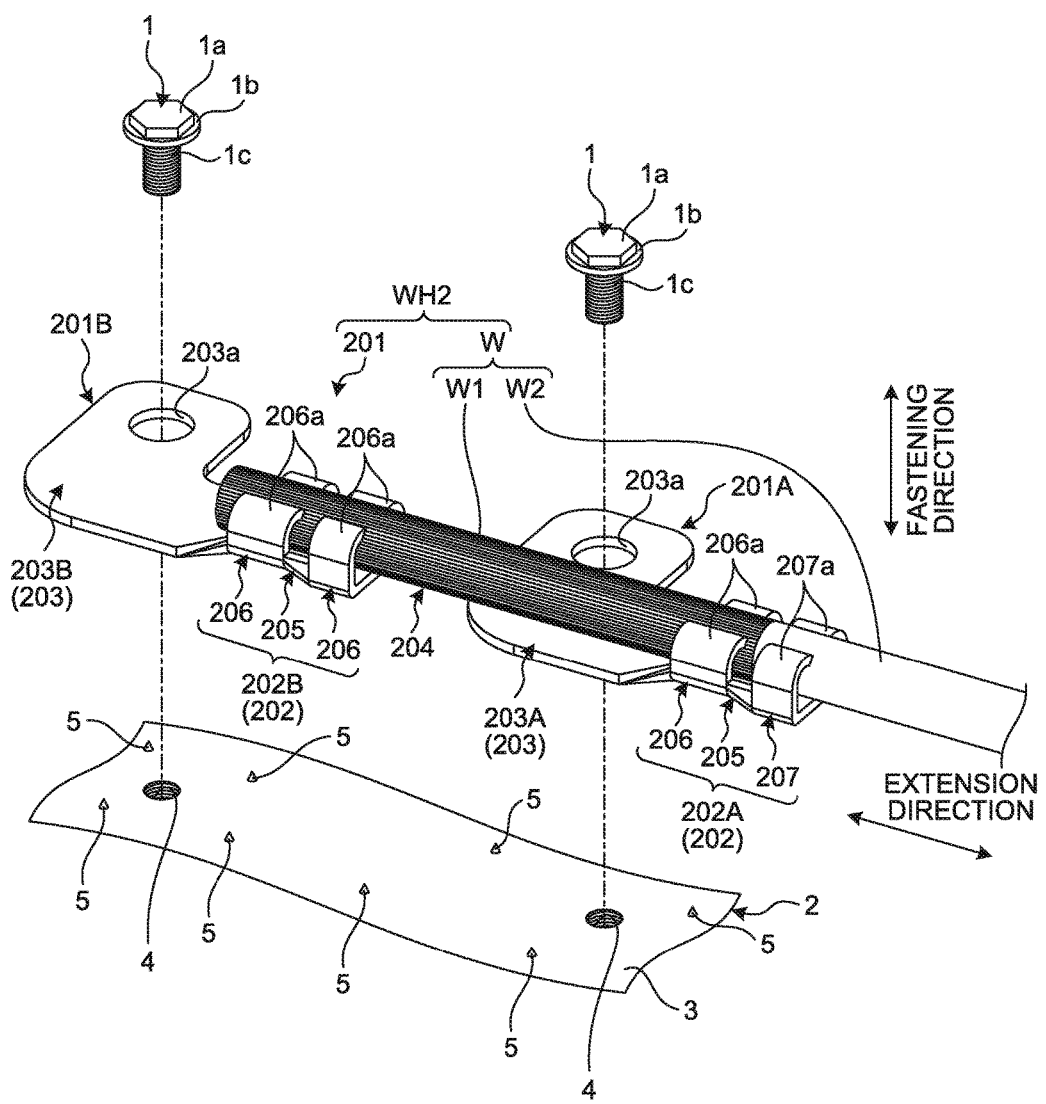
FIG. 4 is a perspective view illustrating a schematic configuration of a ground terminal according to a second embodiment.
Figure 5:
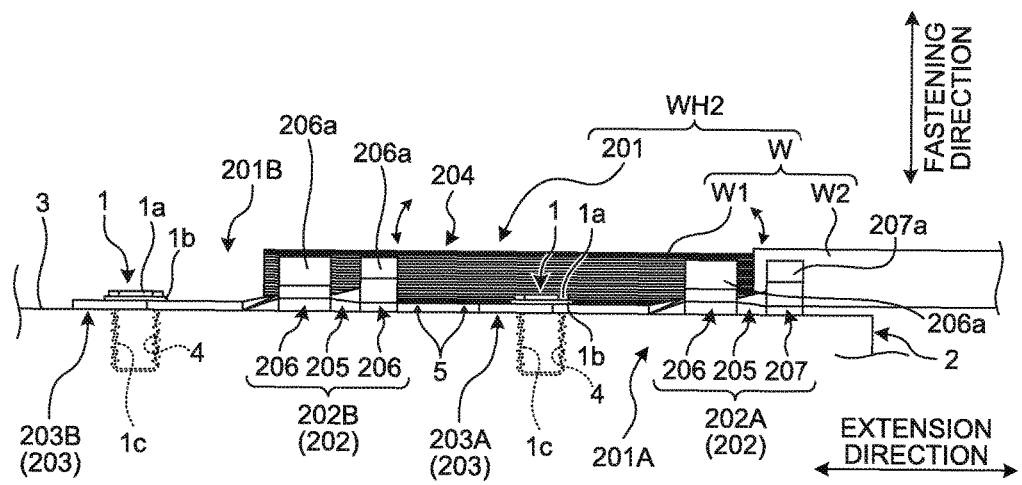
FIG. 5 is a side view illustrating the schematic configuration of the ground terminal in the second embodiment.
Figure 6:
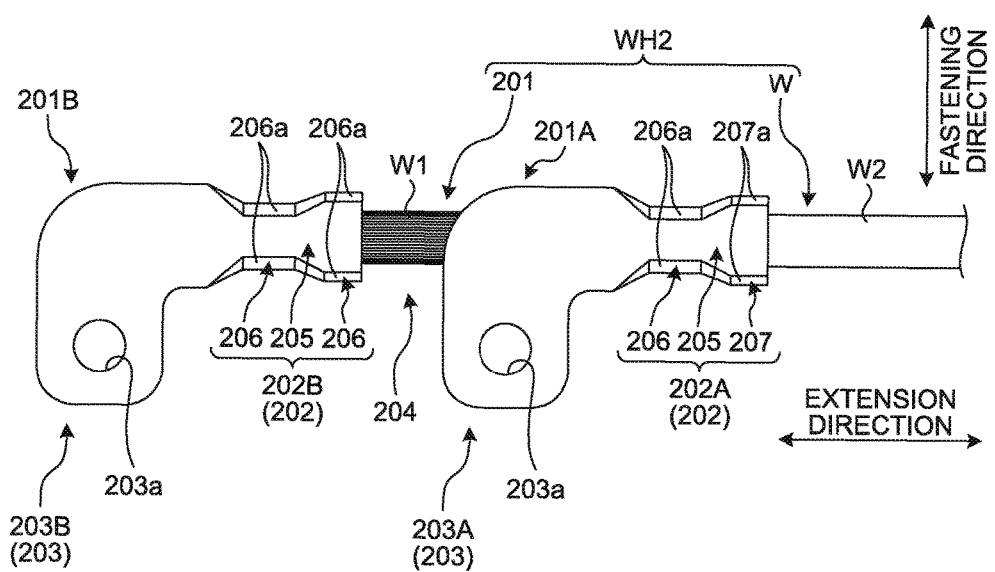
FIG. 6 is a plan view illustrating the schematic configuration of the ground terminal in the second embodiment.

FIG. 4 is a perspective view illustrating a schematic configuration of a ground terminal according to a second embodiment. FIG. 5 is a side view illustrating the schematic configuration of the ground terminal in the second embodiment. FIG. 6 is a plan view illustrating the schematic configuration of the ground terminal in the second embodiment (plan view at the side facing a grounding surface). The ground terminal and a wire harness in the second embodiment are different from those in the first embodiment in the configuration of a deformation portion. Hereinafter, common reference numerals denote the same components as those in the above-mentioned embodiment and overlapping description of common configurations, actions, and effects are omitted as much as possible (the same holds below).

A ground terminal 201 in the embodiment as illustrated in FIG. 4, FIG. 5, and FIG. 6 is applied to, for example, a wire harness WH2 or the like. The wire harness WH2 includes the electric wire W and the ground terminal 201 provided at a terminal of the electric wire W. The ground terminal 201 in the embodiment includes a plurality of wire connecting portions 202, a plurality of fastening portions 203, and a deformation portion 204.

The ground terminal 201 in the embodiment is integrally configured by sets of one wire connecting portion 202 and one fastening portion 203 with conductive metal such as copper, copper alloy, aluminum, and aluminum alloy. The ground terminal 201 includes two wire connecting portions 202, that is, a first wire connecting portion 202A as the first wire connecting portion 202 and a second wire connecting portion 202B as the second wire connecting portion 202. The ground terminal 201 includes two fastening portions 203, that is, a first fastening portion 203A as the first fastening portion 203 and a second fastening portion 203B as the second fastening portion 203. In the ground terminal 201, the first wire connecting portion 202A and the first fastening portion 203A integrally configure one first divided terminal 201A and the second wire connecting portion 202B and the second fastening portion 203B integrally configure one second divided terminal 201B as a separate body from the first divided terminal 201A. In the ground terminal 201, the first divided terminal 201A, the deformation portion 204, and the second divided terminal 201B are aligned in this order from one side to the other side in the extension direction. To be more specific, in the ground terminal 201, the first wire connecting portion 202A of the first divided terminal 201A, the first fastening portion 203A thereof, the deformation portion 204, the second wire connecting portion 202B of the second divided terminal 201B, and the second fastening portion 203B thereof are aligned in this order from one side to the other side in the extension direction. In the following description, when the first wire connecting portion 202A and the second wire connecting portion 202B need not to be particularly distinguished from each other, they are simply referred to as the "wire connecting portion 202" in some cases. Furthermore, when the first fastening portion 203A and the second fastening portion 203B need not to be particularly distinguished from each other, they are simply referred to as the "fastening portion 203" in some cases.

The wire connecting portions 202 are portions to which the electric wire W is connected. To be more specific, the first wire connecting portion 202A includes a base portion 205 on which the terminal of the electric wire W is arranged, a conductor connecting portion 206 to which the linear conductor W1 of the electric wire W is connected, and a cover connecting portion 207 to which the cover portion W2 of the electric wire W is connected. On the other hand, the second wire connecting portion 202B includes the base portion 205 on which the terminal of the electric wire W is arranged and two conductor connecting portions 206 to which the linear conductor W1 of the electric wire W is connected and does not include the cover connecting portion 207. The base portions 205, the conductor connecting portions 206, and the cover connecting portion 207 have substantially the same configurations as those of the base portion 105, the conductor connecting portion 106, and the cover connecting portion 107 as described above although shapes, sizes, and the like are slightly different therefrom. Each conductor connecting portion 206 includes a pair of caulking pieces 206a and the cover connecting portion 207 includes a pair of caulking pieces 207a. In the first wire connecting portion 202A, in a state where the terminal of the electric wire W at the side at which the linear conductor W1 is exposed is placed on the base portion 205, the linear conductor W1 is located at the side of the caulking pieces 206a, and the cover portion W2 is located at the side of the caulking pieces 207a, the linear conductor W1 is caulked together with the caulking pieces 206a and the cover portion W2 is caulked together with the caulking pieces 207a. With this, in the first wire connecting portion 202A of the first divided terminal 201A, the linear conductor W1 is crimped between the caulking pieces 206a and the base portion 205 in the conductor connecting portion 206 and the cover portion W2 is crimped between the caulking pieces 207a and the base portion 205 in the cover connecting portion 207. In the second wire connecting portion 202B, in a state where the terminal of the electric wire W at the side at which the linear conductor W1 is exposed at the terminal leading end side of the linear conductor W1 relative to the first divided terminal 201A including the first wire connecting portion 202A is placed on the base portion 205 and the linear conductor W1 is located between the caulking pieces 206a, the linear conductor W1 is caulked together with the caulking pieces 206a of the two conductor connecting portions 206. With this, in the second wire connecting portion 202B of the second divided terminal 201B, the linear conductor W1 is crimped between the caulking pieces 206a and the base portion 205 in the two conductor connecting portions 206.

Each of the fastening portions 203 is a portion that is connected to the wire connecting portion 202 including the conductor connecting portion 206, is formed into a planar shape, and can be fastened to the grounding surface 3 through the fastening member 1 in a state of facing the grounding surface 3. The fastening portions 203 in the embodiment include the first fastening portion 203A and the second fastening portion 203B as described above. The first fastening portion 203A and the second fastening portion 203B have substantially the same configurations as those of the first fastening portion 103A and the second fastening portion 103B as described above although shapes, sizes, and the like are slightly different therefrom. Both of the first fastening portion 203A and the second fastening portion 203B have fastening holes 203a formed at substantially center positions. The base portion 205 (end portion at the conductor connecting portion 206 side) of the first wire connecting portion 202A is connected to the first fastening portion 203A at one end side in the extension direction and the base portion 205 of the second wire connecting portion 202B is connected to the second fastening portion 203B at one end side in the extension direction. When the shaft portions 1c of the fastening members 1 are inserted into the respective fastening holes 203a and the shaft portions 1c are screwed with the screw holes 4 in the grounding surface 3, the first fastening portion 203A and the second fastening portion 203B are held between the washers 1b and the grounding surface 3 and fastening force acts thereon. With this, the first fastening portion 203A and the second fastening portion 203B are fastened to the grounding surface 3.

The deformation portion 204 is a portion that connects the fastening portions 203 and is configured to be deformed more easily than the fastening portions 203. The deformation portion 204 is located between the first fastening portion 203A and the second fastening portion 203B in the extension direction and is configured as a portion connecting the first fastening portion 203A and the second fastening portion 203B. That is to say, the first fastening portion 203A is connected to the deformation portion 204 at one end side in the extension direction and the second fastening portion 203B is connected to the deformation portion 204 at the other end side in the extension direction. In this example, the deformation portion 204 is located between the first divided terminal 201A including the first fastening portion 203A and the second divided terminal 201B including the second fastening portion 203B in the extension direction and is configured as a portion connecting the first wire connecting portion 202A of the first divided terminal 201A and the second wire connecting portion 202B of the second divided terminal 201B.

The deformation portion 204 in the embodiment includes the linear conductor W1 that connects the fastening portions 203 through the respective conductor connecting portions 206 and is more flexible than the fastening portions 203. That is to say, in this example, the deformation portion 204 is also utilized as the linear conductor W1 that configures the electric wire W and is more flexible than the fastening portions 203. The linear conductor W1 that also serves as the deformation portion 204 is a core wire formed by bundling a plurality of strands made of conductive metal as described above. Alternatively, the linear conductor W1 may be a twisted core wire formed by twisting a plurality of strands or may be a metal bar or the like having flexibility. The linear conductor W1 is provided so as to bridge between the conductor connecting portion 206 of the first divided terminal 201A and the respective conductor connecting portions 206 of the second divided terminal 201B as described above and connects the first fastening portion 203A and the second fastening portion 203B through the respective conductor connecting portions 206. The linear conductor W1 configuring the deformation portion 204 in the embodiment is provided at a position facing the grounding surface 3 in the fastening direction in a state where the first fastening portion 203A and the second fastening portion 203B are fastened to the grounding surface 3.

The ground terminal 201 and the wire harness WH2 as described above can absorb a step with the deformation portion 204 even when, for example, any of the fastening portions 203 runs onto the foreign matters 5 and can improve the possibility of the fastening portion 203 capable of facing and being fastened to the grounding surface 3 properly to exist, thereby being properly fastened to the grounding surface 3.

Furthermore, with the ground terminal 201 and the wire harness WH2 as described above, at least one conductor connecting portion 206 is provided corresponding to each of the fastening portions 203 and the deformation portion 204 includes the linear conductor W1 that connects the fastening portions 203 through the respective conductor connecting portions 206 and is more flexible than the fastening portions 203. Accordingly, the ground terminal 201 and the wire harness WH2 can make the deformation portion 204 easy to be deformed with the flexible linear conductor W1 and can absorb a possibly generated step between the fastening portion 203 that has not run onto the foreign matters 5 and the fastening portion 203 that has run onto the foreign matters 5 with flexible movement of the linear conductor W1. In addition, the ground terminal 201 and the wire harness WH2 can reduce the number of components by causing the linear conductor W1 of the electric wire W to also serve as the deformation portion 204 and provide the deformation portion 204, thereby, for example, reducing the manufacturing cost. The ground terminal 201 and the wire harness WH2 cause a space portion between the fastening portions 203 connected by the linear conductor W1 to function as a foreign matter avoiding (escape) space portion for preventing running onto the foreign matters 5 as objects on the grounding surface 3, thereby reducing the possibility that the deformation portion 204 itself runs onto the foreign matters 5.

Moreover, the ground terminal 201 and the wire harness WH2 as described above enable the grounding surface 3 to function as a receiving surface of the deformation portion 204, thereby preventing excessive deformation of the deformation portion 204 and vibration from the deformation portion 204.

Third Embodiment

Figure 7:
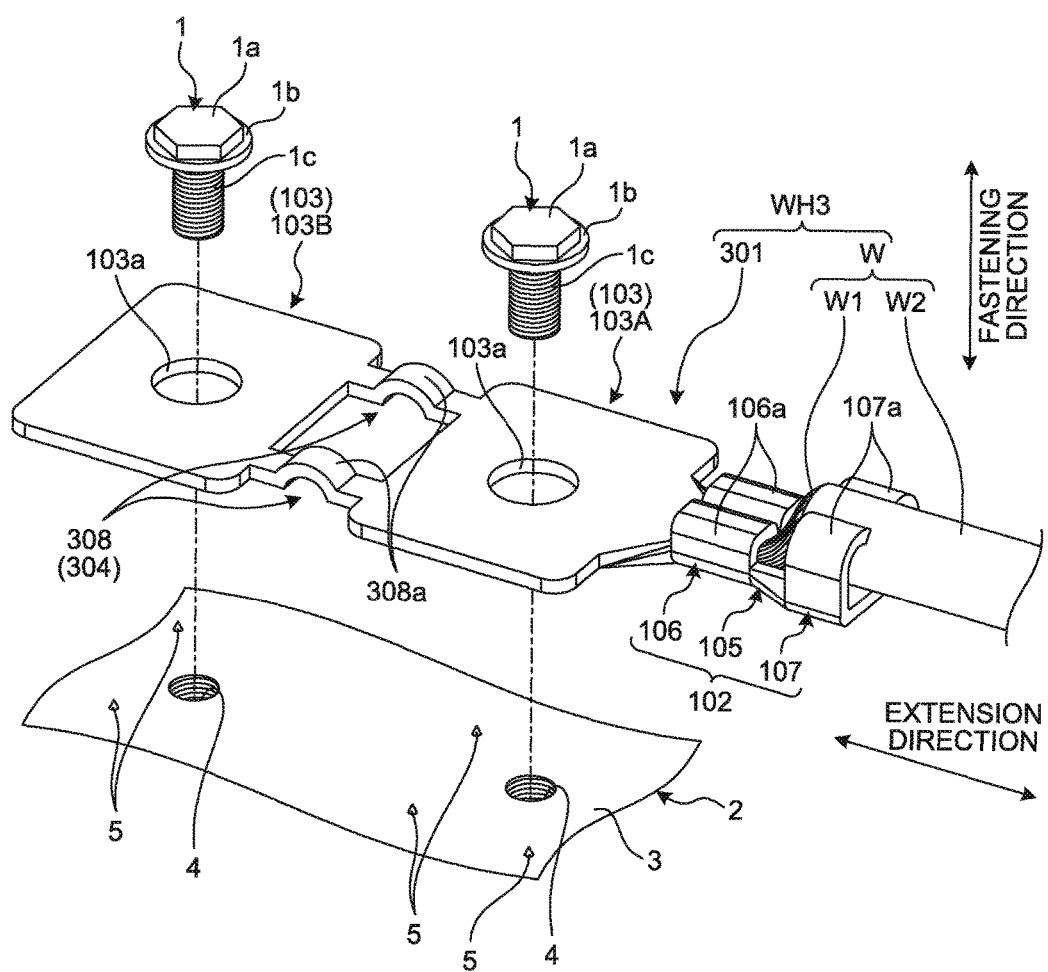
FIG. 7 is a perspective view illustrating a schematic configuration of a ground terminal according to a third embodiment.
Figure 8:
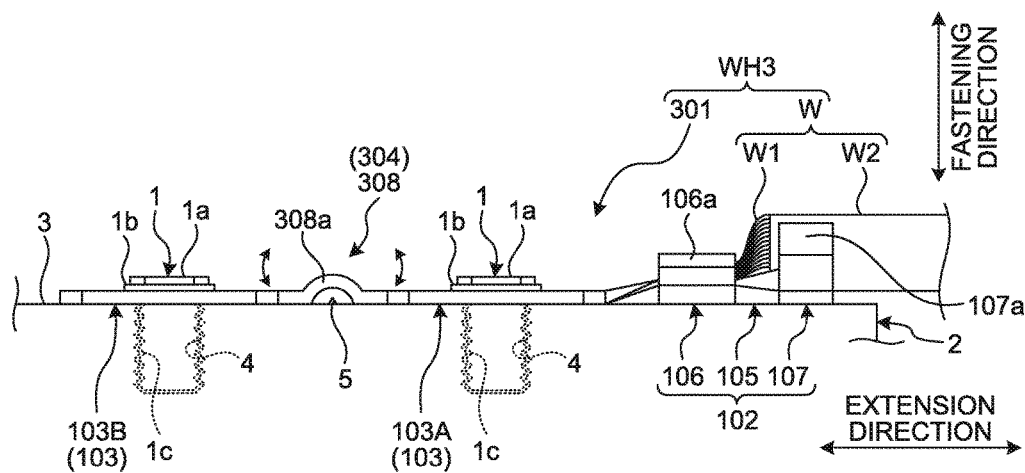
FIG. 8 is a side view illustrating the schematic configuration of the ground terminal in the third embodiment.
Figure 9:
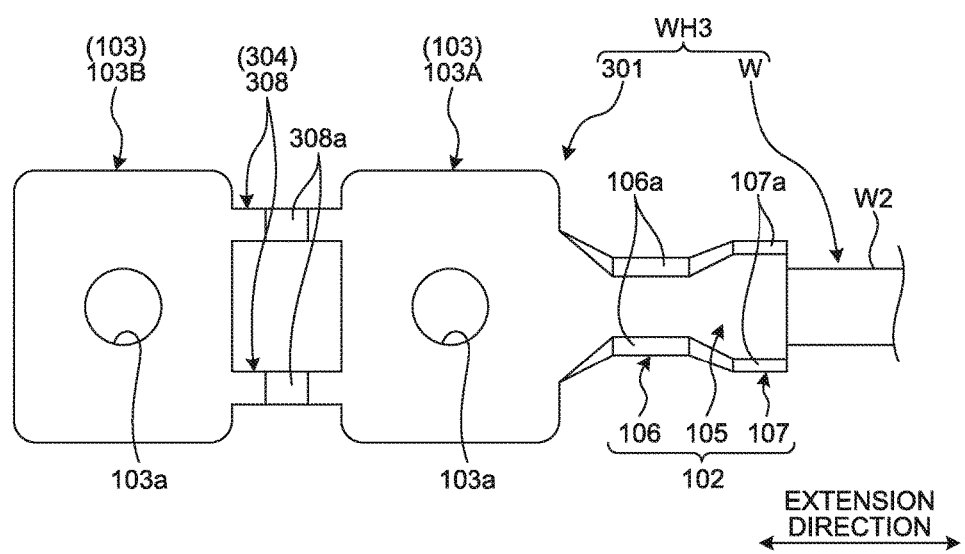
FIG. 9 is a plan view illustrating the schematic configuration of the ground terminal in the third embodiment.

FIG. 7 is a perspective view illustrating a schematic configuration of a ground terminal according to a third embodiment. FIG. 8 is a side view illustrating the schematic configuration of the ground terminal in the third embodiment. FIG. 9 is a plan view illustrating the schematic configuration of the ground terminal in the third embodiment (plan view at the side facing a grounding surface). The ground terminal and a wire harness in the third embodiment are different from those in the first and second embodiments in the configuration of a deformation portion.

A ground terminal 301 in the embodiment as illustrated in FIG. 7, FIG. 8, and FIG. 9 is applied to, for example, a wire harness WH3 or the like. The wire harness WH3 includes the electric wire W and the ground terminal 301 provided at a terminal of the electric wire W. The ground terminal 301 in the embodiment includes the wire connecting portion 102, the fastening portions 103, and a deformation portion 304. The overall ground terminal 301 in the embodiment is integrally configured with conductive metal such as copper, copper alloy, aluminum, and aluminum alloy. The wire connecting portion 102 and the fastening portions 103 have substantially the same configurations as those of the wire connecting portion 102 and the fastening portions 103 of the above-mentioned ground terminal 101 although shapes, sizes, and the like are slightly different therefrom. The ground terminal 301 is integrally formed in such a manner that the wire connecting portion 102, the first fastening portion 103A, the deformation portion 304, and the second fastening portion 103B are aligned in this order from one side to the other side in the extension direction.

The deformation portion 304 is a portion that connects the fastening portions 103 and is configured to be deformed more easily than the fastening portions 103. The deformation portion 304 is located between the first fastening portion 103A and the second fastening portion 103B in the extension direction and is configured as a portion connecting the first fastening portion 103A and the second fastening portion 103B. That is to say, the first fastening portion 103A is connected to the deformation portion 304 at one end side in the extension direction and the second fastening portion 103B is connected to the deformation portion 304 at the other end side in the extension direction.

The deformation portion 304 in the embodiment includes bending connecting portions 308 that connect the fastening portions 103 through bending portions 308a. The bending connecting portions 308 are formed into connecting piece forms connecting the first fastening portion 103A and the second fastening portion 103B and include the curved bending portions 308a on center portions thereof. In other words, the bending connecting portions 308 are formed into bridge forms bridging between the first fastening portion 103A and the second fastening portion 103B. The deformation portion 304 includes two bending connecting portions 308 with an interval in the direction orthogonal to the extension direction and the fastening direction. The respective bending connecting portions 308 are formed such that the bending portions 308a project to the side opposite to the side facing the grounding surface 3 in a state where the first fastening portion 103A and the second fastening portion 103B are fastened to the grounding surface 3. That is to say, in this example, the bending portions 308a project to the side separated from the grounding surface 3 and are bent. The bending portions 308a are preferably formed such that the heights thereof are larger than the previously supposed heights of the foreign matters 5. The respective bending connecting portions 308 configuring the deformation portion 304 in the embodiment are provided at positions facing the grounding surface 3 in the fastening direction in a state where the first fastening portion 103A and the second fastening portion 103B are fastened to the grounding surface 3.

The ground terminal 301 and the wire harness WH3 as described above can absorb a step with the deformation portion 304 even when, for example, any of the fastening portions 103 runs onto the foreign matters 5 and can improve the possibility of the fastening portion 103 capable of facing and being fastened to the grounding surface 3 properly to exist, thereby being properly fastened to the grounding surface 3.

Furthermore, with the ground terminal 301 and the wire harness WH3 as described above, the deformation portion 304 includes the bending connecting portions 308 that connect the fastening portions 103 through the bending portions 308a. Accordingly, the ground terminal 301 and the wire harness WH3 can make the deformation portion 304 easy to be deformed with the bending connecting portions 308 and can absorb a possibly generated step between the fastening portion 103 that has not run onto the foreign matters 5 and the fastening portion 103 that has run onto the foreign matters 5 by causing the bending connecting portions 308 to function as hinges. In this example, The ground terminal 301 and the wire harness WH3 can have the configuration that is relatively easier to be deformed than the case using the above-mentioned thin portion 108 and cause a space portion between the fastening portions 103 connected by the bending connecting portions 308 to function as a foreign matter avoiding (escape) space portion for preventing running onto the foreign matters 5 as objects on the grounding surface 3, thereby reducing the possibility that the deformation portion 304 itself runs on the foreign matters 5.

Furthermore, with the ground terminal 301 and the wire harness WH3 as described above, the bending portions 308a project to the side separated from the grounding surface 3 and are bent. Accordingly, the ground terminal 301 and the wire harness WH3 cause a space portion between the bending portions 308a of the bending connecting portions 308 and the grounding surface 3 to function as a foreign matter avoiding (escape) space portion for accommodating the foreign matters 5 as the objects on the grounding surface 3 and preventing running onto the foreign matters 5, thereby reducing the possibility that the deformation portion 304 itself runs onto the foreign matters 5.

Moreover, the ground terminal 301 and the wire harness WH3 as described above enable the grounding surface 3 to function as a receiving surface of the deformation portion 304, thereby preventing excessive deformation of the deformation portion 304 and vibration from the deformation portion 304.

Fourth Embodiment

Figure 10:
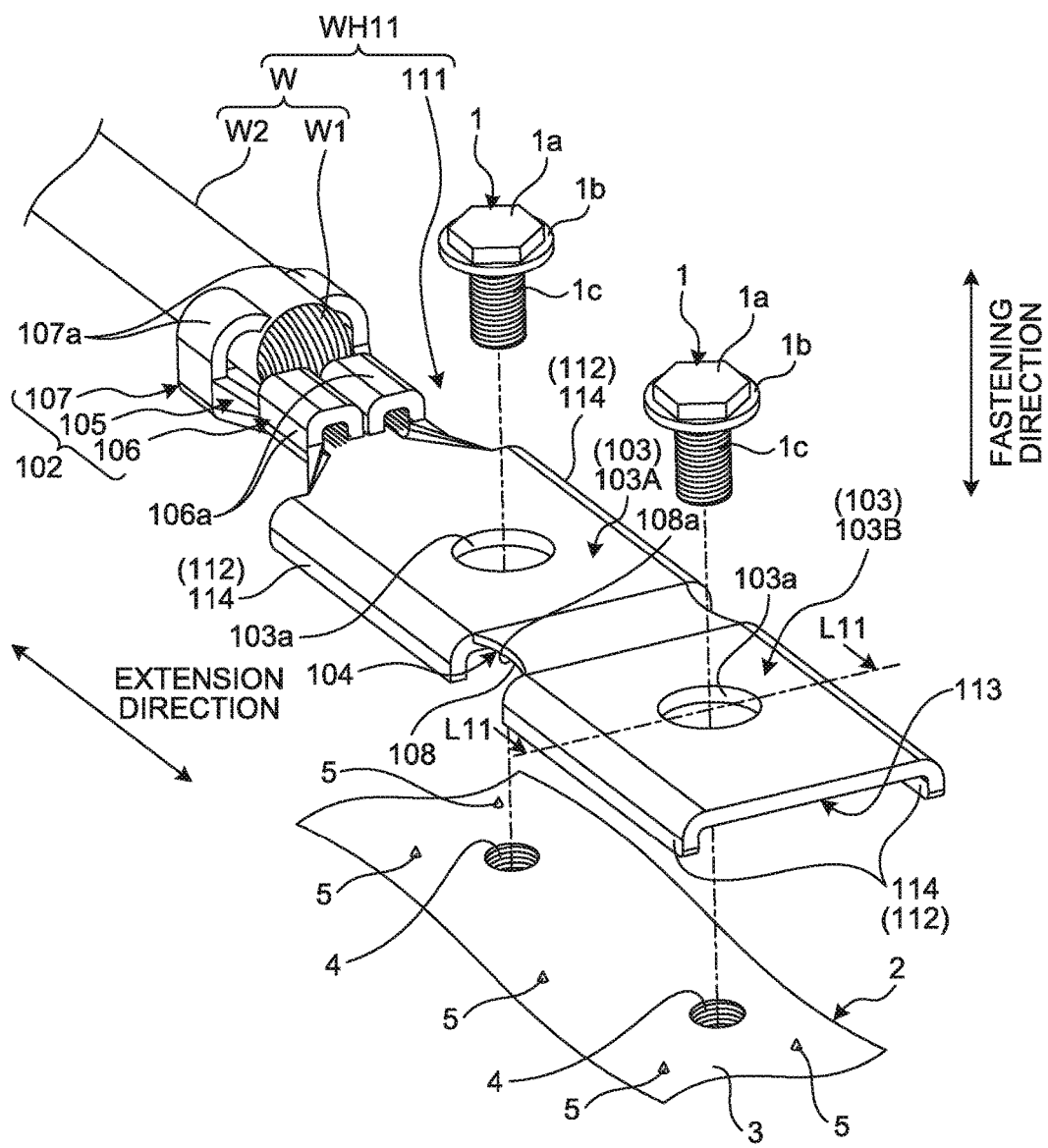
FIG. 10 is a perspective view illustrating a schematic configuration of a ground terminal according to a fourth embodiment.
Figure 11:
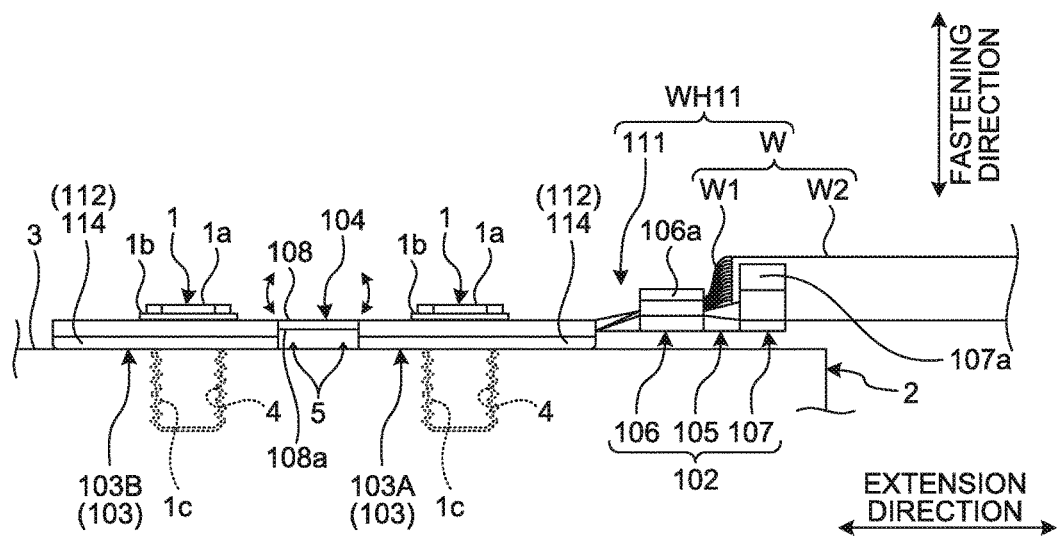
FIG. 11 is a side view illustrating the schematic configuration of the ground terminal in the fourth embodiment.
Figure 12:
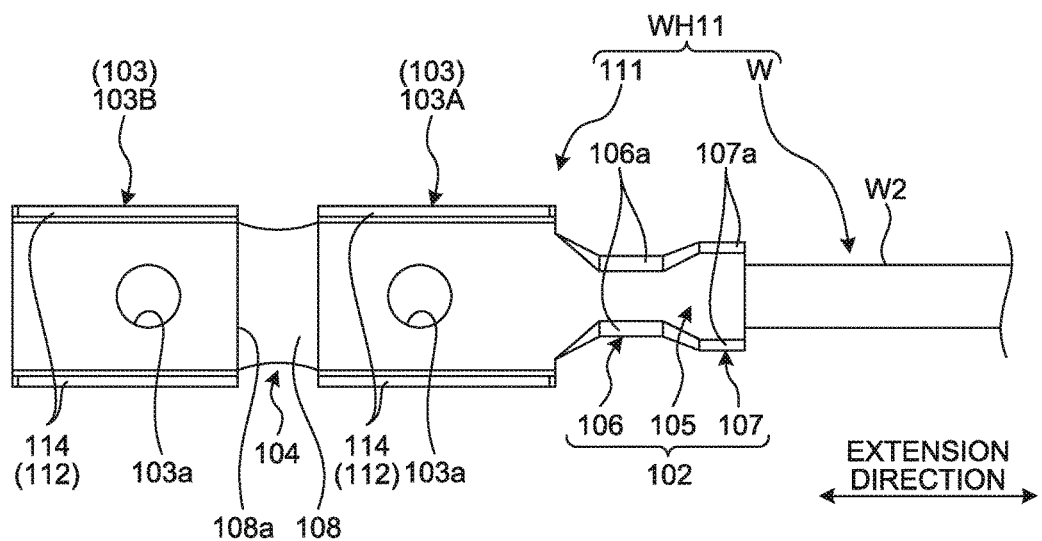
FIG. 12 is a plan view illustrating the schematic configuration of the ground terminal in the fourth embodiment.
Figure 13:
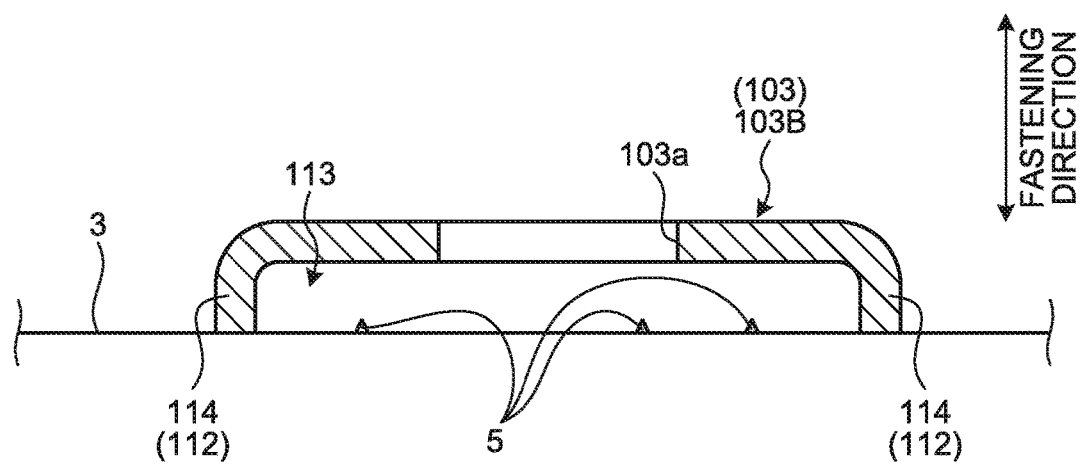
FIG. 13 is a cross-sectional view cut along line L11-L11 in FIG. 10.

FIG. 10 is a perspective view illustrating a schematic configuration of a ground terminal according to a fourth embodiment. FIG. 11 is a side view illustrating the schematic configuration of the ground terminal in the fourth embodiment. FIG. 12 is a plan view illustrating the schematic configuration of the ground terminal in the fourth embodiment (plan view at the side facing a grounding surface). FIG. 13 is a cross-sectional view cut along line L11-L11 in FIG. 10. The ground terminal and a wire harness in the fourth embodiment are different from those in the first embodiment in that projecting portions are included. It should be noted that fastening members are not illustrated in FIG. 13 for easiness of understanding.

A ground terminal 111 in the embodiment as illustrated in FIG. 10, FIG. 11, FIG. 12, and FIG. 13 is applied to, for example, a wire harness WH11 or the like. The wire harness WH11 includes the electric wire W and the ground terminal 111 provided at a terminal of the electric wire W. The ground terminal 111 in the embodiment includes the wire connecting portion 102, the fastening portions 103, the deformation portion 104, and projecting portions 112. The overall ground terminal 111 in the embodiment is integrally configured with conductive metal. The wire connecting portion 102, the fastening portions 103, and the deformation portion 104 have substantially the same configurations as those of the wire connecting portion 102, the fastening portions 103, and the deformation portion 104 of the above-mentioned ground terminal 101 although shapes, sizes, and the like are slightly different therefrom.

The projecting portions 112 are portions that are formed so as to project from the fastening portions 103, and abut against the grounding surface 3 and form foreign matter avoiding space portions 113 between the fastening portions 103 and the grounding surface 3 in a state where the fastening portions 103 face the grounding surface 3. The projecting portions 112 function as spacers between the fastening portions 103 and the grounding surface 3 so that the foreign matter avoiding space portions 113 are formed as space portions capable of accommodating the foreign matters 5 as objects on the grounding surface 3 between the fastening portions 103 and the grounding surface 3.

The projecting portions 112 in the embodiment include flange portions 114 that are formed by folding end portions of the fastening portions 103. The flange portions 114 are provided on each of the fastening portions 103, in this example, each of the first fastening portion 103A and the second fastening portion 103B. The flange portions 114 are formed in pair on the first fastening portion 103A such that both end portions thereof along the extension direction are folded to the side at which the grounding surface 3 is located substantially perpendicularly. In the same manner, the flange portions 114 are formed in pair on the second fastening portion 103B such that both end portions thereof along the extension direction are folded to the side at which the grounding surface 3 is located substantially perpendicularly. The pair of flange portions 114 provided on each of the first fastening portion 103A and the second fastening portion 103B face each other substantially in parallel with an interval therebetween in the direction orthogonal to the extension direction and the fastening direction and extend along the extension direction. The projecting amounts of the respective flange portions 114 of the projecting portions 112 are set such that the fastening portions 103 have a proper positional relation with the grounding surface 3, that is, have a positional relation of facing the grounding surface 3 substantially in parallel in a state where the front ends of the respective flange portions 114 abut against the grounding surface 3 with no foreign matter 5 interposed therebetween. The projecting portions 112 are preferably formed such that the projecting amounts of the respective flange portions 114 are larger than the previously supposed sizes of the foreign matters 5. The front ends of the respective flange portions 114 configuring the projecting portions 112 abut against the grounding surface 3 and function as the spacers between the fastening portions 103 and the grounding surface 3 to cause the foreign matter avoiding space portions 113 to be defined between the fastening portions 103 and the grounding surface 3.

The ground terminal 111 and the wire harness WH11 as described above can absorb a step with the deformation portion 104 even when, for example, any of the fastening portions 103 runs on the foreign matters 5 and can improve the possibility of the fastening portion 103 capable of facing and being fastened to the grounding surface 3 properly to exist, thereby being properly fastened to the grounding surface 3.

Furthermore, the ground terminal 111 and the wire harness WH11 as described above include the projecting portions 112 that are formed so as to project from the fastening portions 103, and abut against the grounding surface 3 and form the foreign matter avoiding space portions 113 capable of accommodating the foreign matters 5 as the objects on the grounding surface 3 between the fastening portions 103 and the grounding surface 3 in a state where the fastening portions 103 face the grounding surface 3. Accordingly, the ground terminal 111 and the wire harness WH11 cause the front ends of the projecting portions 112 that are formed so as to project from the fastening portions 103 to abut against the grounding surface 3, thereby making the contact area with the grounding surface 3 relatively smaller than when the surfaces of the fastening portions 103 and the grounding surface 3 abut against each other. Moreover, the ground terminal 111 and the wire harness WH11 form the foreign matter avoiding space portions 113 between the fastening portions 103 and the grounding surface 3 and the foreign matter avoiding space portions 113 can therefore accommodate therein the foreign matters 5 as the objects on the grounding surface 3 and prevent running onto the foreign matters 5. As a result, the ground terminal 111 and the wire harness WH11 can reduce the possibility of running onto the foreign matters 5 and can improve the possibility that the fastening portions 103 are fastened to the grounding surface 3 with the above-mentioned proper positional relation, thereby being properly fastened to the grounding surface 3 more reliably.

Furthermore, with the ground terminal 111 and the wire harness WH11 as described above, the projecting portions 112 include the flange portions 114 by folding the end portions of the fastening portions 103. Accordingly, the ground terminal 111 and the wire harness WH11 enable the projecting portions 112 projecting from the fastening portions 103 to be easily provided with the flange portions 114 and cause the flange portions 114 to also serve as reinforcing members of the fastening portions 103 to improve the strength of the fastening portions 103.

Fifth Embodiment

Figure 14:
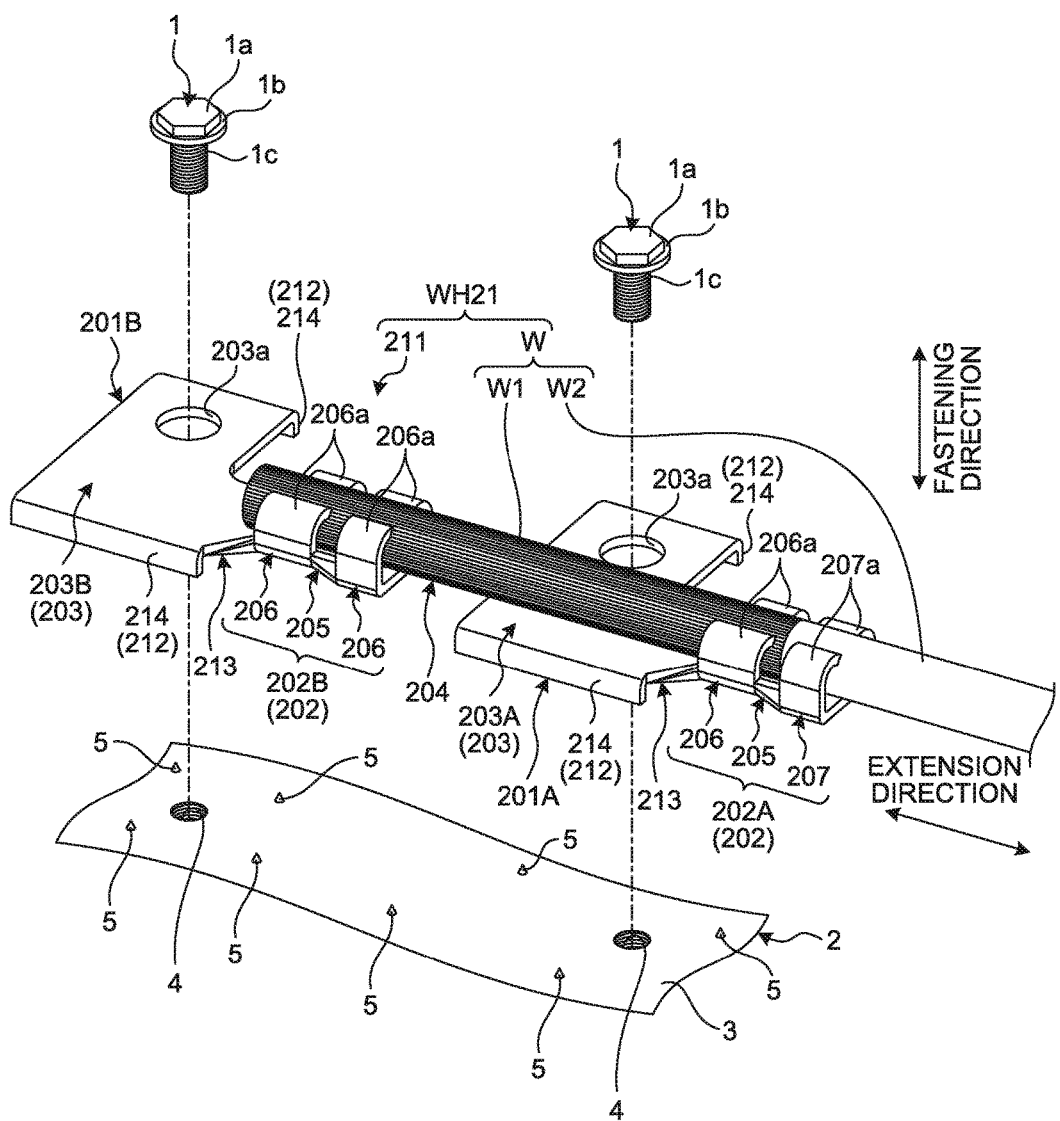
FIG. 14 is a perspective view illustrating a schematic configuration of a ground terminal according to a fifth embodiment.
Figure 15:
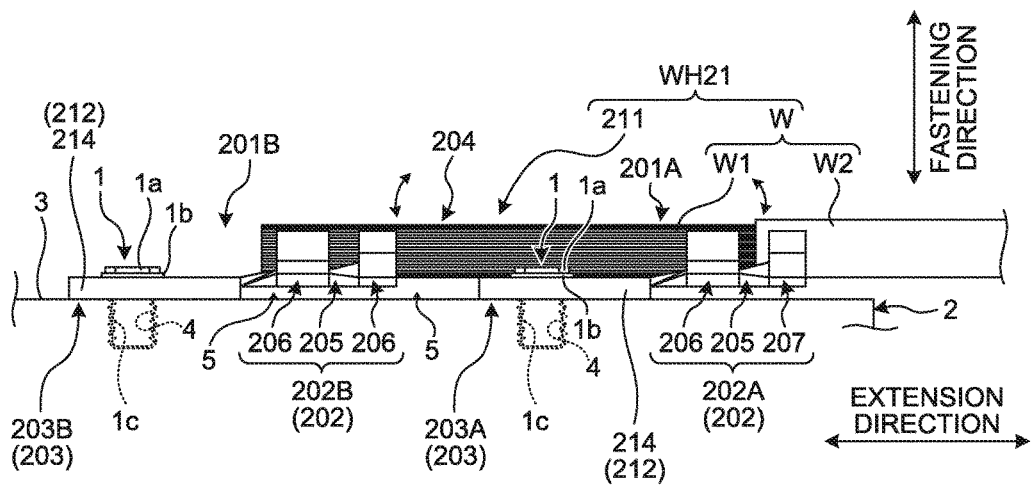
FIG. 15 is a side view illustrating the schematic configuration of the ground terminal in the fifth embodiment.
Figure 16:
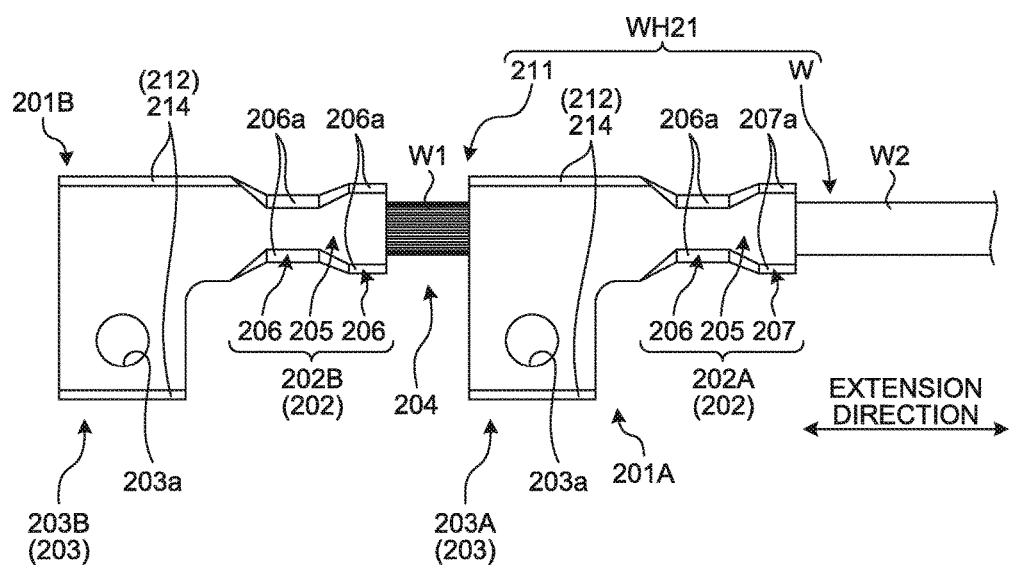
FIG. 16 is a plan view illustrating the schematic configuration of the ground terminal in the fifth embodiment.

FIG. 14 is a perspective view illustrating a schematic configuration of a ground terminal according to a fifth embodiment. FIG. 15 is a side view illustrating the schematic configuration of the ground terminal in the fifth embodiment. FIG. 16 is a plan view illustrating the schematic configuration of the ground terminal in the fifth embodiment (plan view at the side facing a grounding surface). The ground terminal and a wire harness in the fifth embodiment are different from those in the second embodiment in that projecting portions are included.

A ground terminal 211 in the embodiment as illustrated in FIG. 14, FIG. 15, and FIG. 16 is applied to, for example, a wire harness WH21 or the like. The wire harness WH21 includes the electric wire W and the ground terminal 211 provided at a terminal of the electric wire W. The ground terminal 211 in the embodiment includes the wire connecting portions 202, the fastening portions 203, the deformation portion 204, and projecting portions 212. The wire connecting portions 202, the fastening portions 203, and the deformation portion 204 have substantially the same configurations as those of the wire connecting portions 202, the fastening portions 203, and the deformation portion 204 of the above-mentioned ground terminal 201 although shapes, sizes, and the like are slightly different therefrom.

The projecting portions 212 are portions that are formed so as to project from the fastening portions 203, and abut against the grounding surface 3 and form foreign matter avoiding space portions 213 between the fastening portions 203 and the grounding surface 3 in a state where the fastening portions 203 face the grounding surface 3. The projecting portions 212 function as spacers between the fastening portions 203 and the grounding surface 3 so that the foreign matter avoiding space portions 213 are formed as space portions capable of accommodating the foreign matters 5 as objects on the grounding surface 3 between the fastening portions 203 and the grounding surface 3.

The projecting portions 212 in the embodiment include flange portions 214 that are formed by folding end portions of the fastening portions 203. The flange portions 214 are provided on each of the fastening portions 203, in this example, each of the first fastening portion 203A of the first divided terminal 201A and the second fastening portion 203B of the second divided terminal 201B. The flange portions 214 have substantially the same configurations as those of the above-mentioned flange portions 114 although shapes, sizes, and the like are slightly different therefrom.

The ground terminal 211 and the wire harness WH21 as described above can absorb a step with the deformation portion 204 even when, for example, any of the fastening portions 203 runs onto the foreign matters 5 and can improve the possibility of the fastening portion 203 capable of facing and being fastened to the grounding surface 3 properly to exist, thereby being properly fastened to the grounding surface 3.

Furthermore, the ground terminal 211 and the wire harness WH21 as described above cause the front ends of the projecting portions 212 that are formed so as to project from the fastening portions 203 to abut against the grounding surface 3, thereby making the contact area with the grounding surface 3 relatively small. Moreover, the ground terminal 211 and the wire harness WH21 form the foreign matter avoiding space portions 213 between the fastening portions 203 and the grounding surface 3 and can therefore reduce the possibility of running onto the foreign matters 5, thereby being properly fastened to the grounding surface 3 more reliably.

In addition, the ground terminal 211 and the wire harness WH21 enable the projecting portions 212 projecting from the fastening portions 203 to be easily provided with the flange portions 214 and cause the flange portions 214 to also serve as reinforcing members of the fastening portions 203 to improve the strength of the fastening portions 203.

Sixth Embodiment

Figure 17:
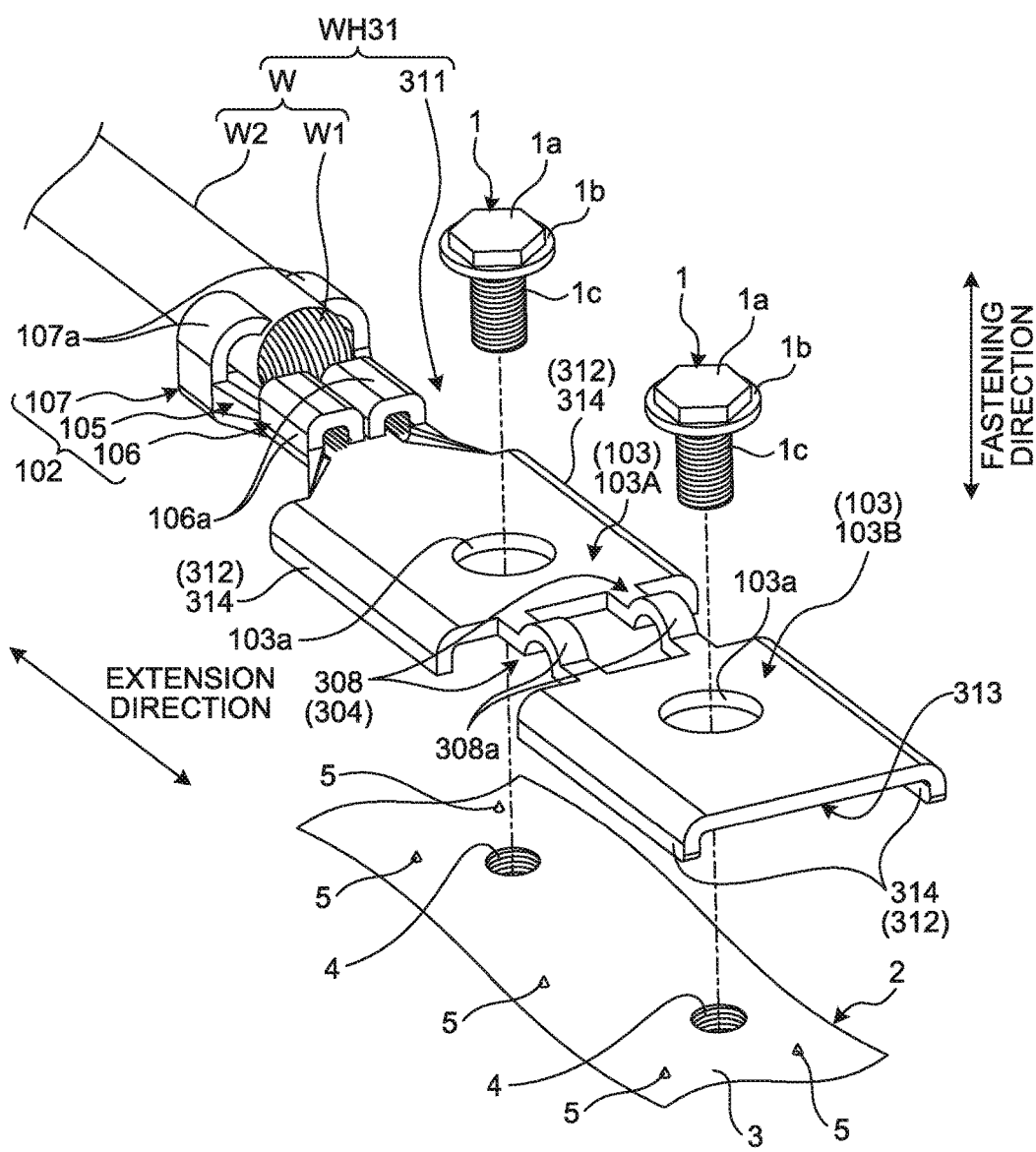
FIG. 17 is a perspective view illustrating a schematic configuration of a ground terminal according to a sixth embodiment.
Figure 18:
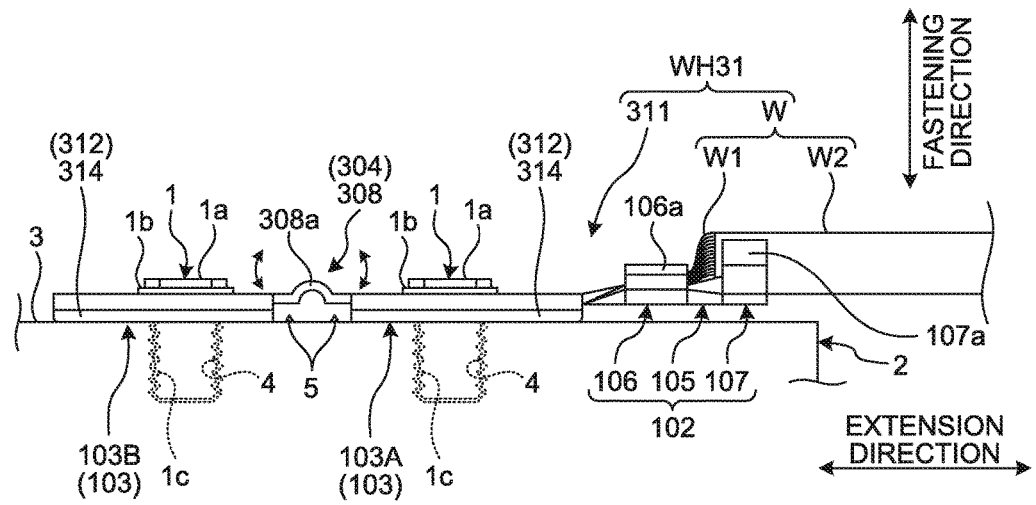
FIG. 18 is a side view illustrating the schematic configuration of the ground terminal in the sixth embodiment.
Figure 19:
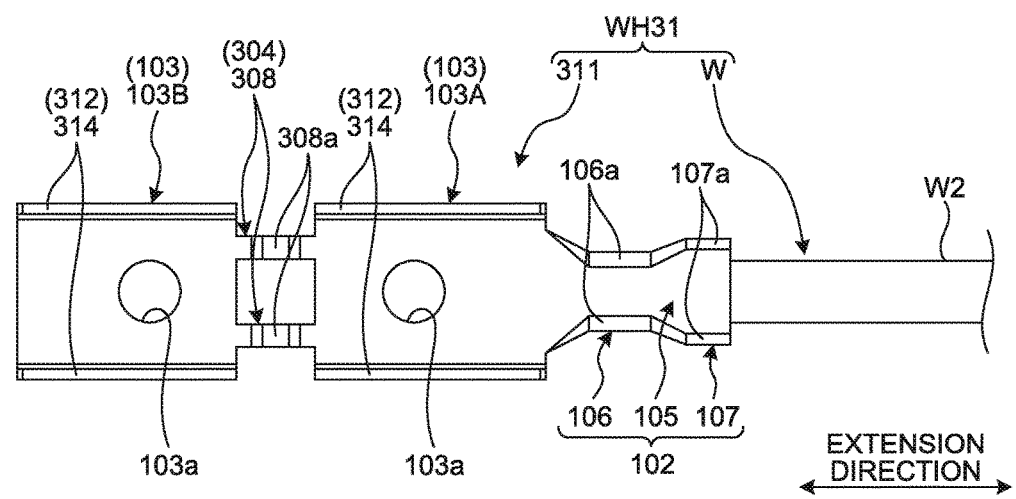
FIG. 19 is a plan view illustrating the schematic configuration of the ground terminal in the sixth embodiment.

FIG. 17 is a perspective view illustrating a schematic configuration of a ground terminal according to a sixth embodiment. FIG. 18 is a side view illustrating the schematic configuration of the ground terminal in the sixth embodiment. FIG. 19 is a plan view illustrating the schematic configuration of the ground terminal in the sixth embodiment (plan view at the side facing a grounding surface). The ground terminal and a wire harness in the sixth embodiment are different from those in the third embodiment in that projecting portions are included.

A ground terminal 311 in the embodiment as illustrated in FIG. 17, FIG. 18, and FIG. 19 is applied to, for example, a wire harness WH31 or the like. The wire harness WH31 includes the electric wire W and the ground terminal 311 provided at a terminal of the electric wire W. The ground terminal 311 in the embodiment includes the wire connecting portion 102, the fastening portions 103, the deformation portion 304, and projecting portions 312. The overall ground terminal 311 in the embodiment is integrally configured with conductive metal. The wire connecting portion 102, the fastening portions 103, and the deformation portion 304 have substantially the same configurations as those of the wire connecting portion 102, the fastening portions 103, and the deformation portion 304 of the above-mentioned ground terminal 301 although shapes, sizes, and the like are slightly different therefrom.

The projecting portions 312 are portions that are formed so as to project from the fastening portions 103, and abut against the grounding surface 3 and form foreign matter avoiding space portions 313 between the fastening portions 103 and the grounding surface 3 in a state where the fastening portions 103 face the grounding surface 3. The projecting portions 312 function as spacers between the fastening portions 103 and the grounding surface 3 so that the foreign matter avoiding space portions 313 are formed as space portions capable of accommodating the foreign matters 5 as objects on the grounding surface 3 between the fastening portions 103 and the grounding surface 3.

The projecting portions 312 in the embodiment include flange portions 314 that are formed by folding end portions of the fastening portions 103. The flange portions 314 are provided on each of the fastening portions 103, in this example, each of the first fastening portion 103A and the second fastening portion 103B. The flange portions 314 have substantially the same configurations as those of the above-mentioned flange portions 114 although shapes, sizes, and the like are slightly different therefrom.

The ground terminal 311 and the wire harness WH31 as described above can absorb a step with the deformation portion 304 even when, for example, any of the fastening portions 103 runs onto the foreign matters 5 and can improve the possibility of the fastening portion 103 capable of facing and being fastened to the grounding surface 3 properly to exist, thereby being properly fastened to the grounding surface 3.

The ground terminal 311 and the wire harness WH31 as described above cause the front ends of the projecting portions 312 that are formed so as to project from the fastening portions 103 to abut against the grounding surface 3, thereby making the contact area with the grounding surface 3 relatively small. Moreover, the ground terminal 311 and the wire harness WH31 form the foreign matter avoiding space portions 313 between the fastening portions 103 and the grounding surface 3 and can therefore reduce the possibility of running onto the foreign matters 5, thereby being properly fastened to the grounding surface 3 more reliably.

In addition, the ground terminal 311 and the wire harness WH31 as described above enable the projecting portions 312 projecting from the fastening portions 103 to be easily provided with the flange portions 314 and cause the flange portions 314 to also serve as reinforcing members of the fastening portions 103 to improve the strength of the fastening portions 103.

Seventh Embodiment

Figure 20:
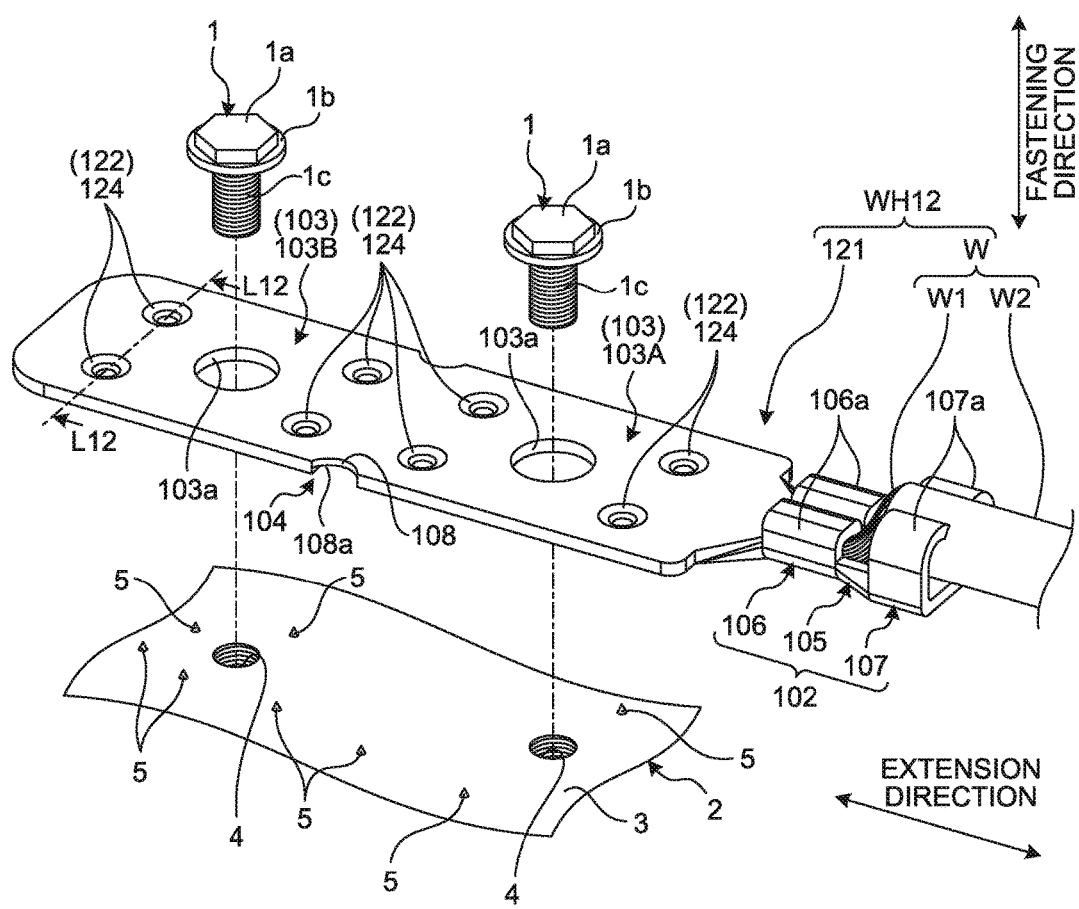
FIG. 20 is a perspective view illustrating a schematic configuration of a ground terminal according to a seventh embodiment.
Figure 21:
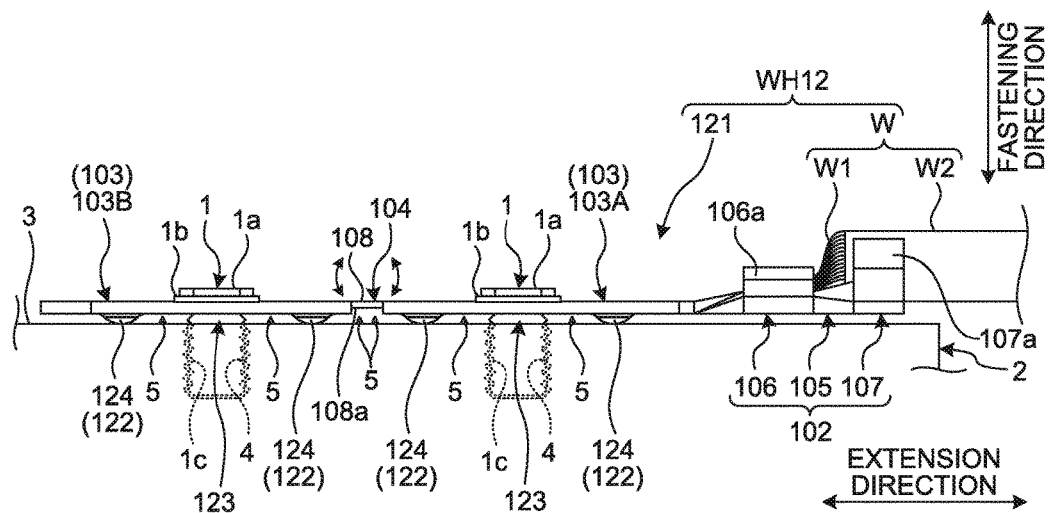
FIG. 21 is a side view illustrating the schematic configuration of the ground terminal in the seventh embodiment.
Figure 22:
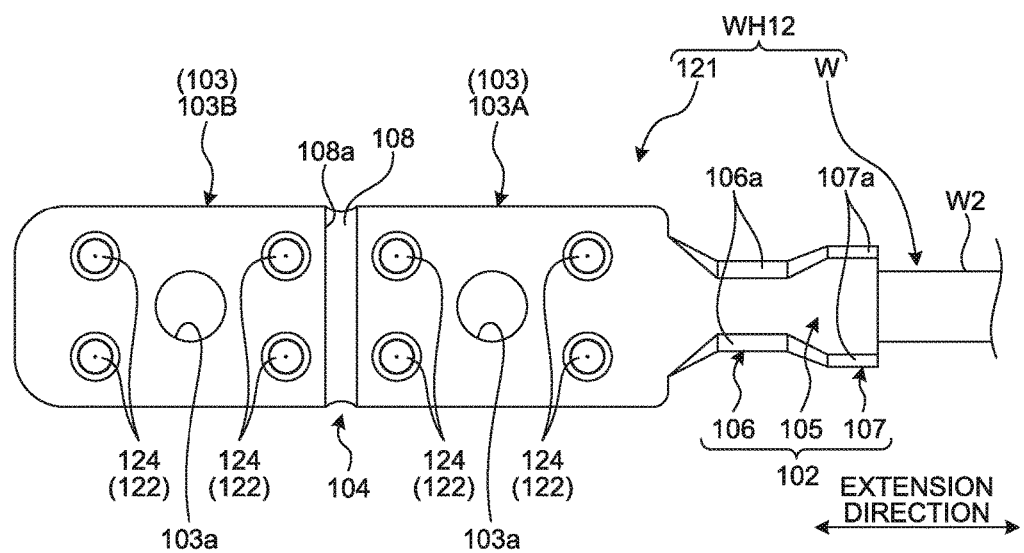
FIG. 22 is a plan view illustrating the schematic configuration of the ground terminal in the seventh embodiment.
Figure 23:
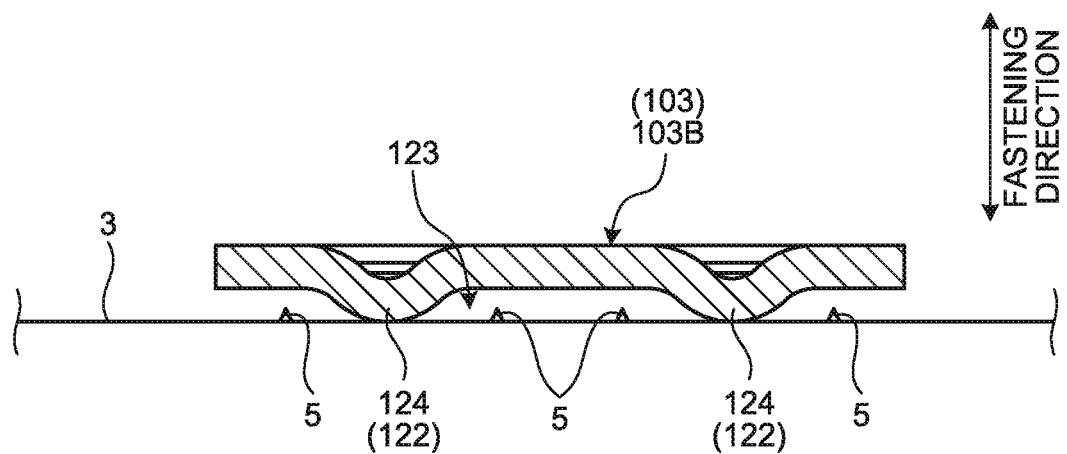
FIG. 23 is a cross-sectional view cut along line L12-L12 in FIG. 20.

FIG. 20 is a perspective view illustrating a schematic configuration of a ground terminal according to a seventh embodiment. FIG. 21 is a side view illustrating the schematic configuration of the ground terminal in the seventh embodiment. FIG. 22 is a plan view illustrating the schematic configuration of the ground terminal in the seventh embodiment (plan view at the side facing a grounding surface). FIG. 23 is a cross-sectional view cut along line L12-L12 in FIG. 20. The ground terminal and a wire harness in the seventh embodiment are different from those in the fourth embodiment in the configuration of projecting portions.

A ground terminal 121 in the embodiment as illustrated in FIG. 20, FIG. 21, FIG. 22, and FIG. 23 is applied to, for example, a wire harness WH12 or the like. The wire harness WH12 includes the electric wire W and the ground terminal 121 provided at a terminal of the electric wire W. The ground terminal 121 in the embodiment includes projecting portions 122 instead of the projecting portions 112 of the above-mentioned ground terminal 111. The configurations of the ground terminal 121 other than the projecting portions 122 are substantially the same as those of the above-mentioned ground terminal 111 although shapes, sizes, and the like are slightly different therefrom.

The projecting portions 122 are portions that are formed so as to project from the fastening portions 103, and abut against the grounding surface 3 and form foreign matter avoiding space portions 123 between the fastening portions 103 and the grounding surface 3 in a state where the fastening portions 103 face the grounding surface 3. The projecting portions 122 function as spacers between the fastening portions 103 and the grounding surface 3 so that the foreign matter avoiding space portions 123 are formed as space portions capable of accommodating the foreign matters 5 as objects on the grounding surface 3 between the fastening portions 103 and the grounding surface 3.

The projecting portions 122 in the embodiment include projections 124 formed into dot-like shapes projecting toward the grounding surface 3 side from the surfaces of the fastening portions 103 that face the grounding surface 3. The projections 124 are provided on each of the fastening portions 103, in this example, each of the first fastening portion 103A and the second fastening portion 103B. In the first fastening portion 103A, the projections 124, in this example, four projections 124 in total, one for each corner portion of the first fastening portion 103A formed into a substantially rectangular plate shape are formed so as to project to the grounding surface 3 side and surround the fastening hole 103a. In the same manner, in the second fastening portion 103B, the projections 124, in this example, four projections 124 in total, one for each corner portion of the second fastening portion 103B formed into a substantially rectangular plate shape are formed so as to project to the grounding surface 3 side and surround the fastening hole 103a. The projections 124 provided on each of the first fastening portion 103A and the second fastening portion 103B are formed into the dot-like shapes projecting toward the grounding surface 3 side from the surfaces facing the grounding surface 3 by, for example, round indent processing. The projecting amounts of the respective projections 124 of the projecting portions 122 are set such that the fastening portions 103 have a proper positional relation with the grounding surface 3, that is, have a positional relation of facing the grounding surface 3 substantially in parallel in a state where the front ends of the respective projections 124 abut against the grounding surface 3 with no foreign matter 5 interposed therebetween. The projecting portions 122 are preferably formed such that the projecting amounts of the respective projections 124 are larger than the previously supposed sizes of the foreign matters 5. The front ends of the respective projections 124 configuring the projecting portions 122 abut against the grounding surface 3 and function as spacers between the fastening portions 103 and the grounding surface 3 so as to cause the foreign matter avoiding space portions 123 to be defined between the fastening portions 103 and the grounding surface 3.

The ground terminal 121 and the wire harness WH12 as described above can absorb a step with the deformation portion 104 even when, for example, any of the fastening portions 103 runs onto the foreign matters 5 and can improve the possibility of the fastening portion 103 capable of facing and being fastened to the grounding surface 3 properly to exist, thereby being properly fastened to the grounding surface 3.

Furthermore, the ground terminal 121 and the wire harness WH12 as described above cause the front ends of the projecting portions 122 that are formed so as to project from the fastening portions 103 to abut against the grounding surface 3, thereby making the contact area with the grounding surface 3 relatively small. Moreover, the ground terminal 121 and the wire harness WH12 form the foreign matter avoiding space portions 123 between the fastening portions 103 and the grounding surface 3 and can therefore reduce the possibility of running onto the foreign matters 5, thereby being properly fastened to the grounding surface 3 more reliably.

In addition, with the ground terminal 121 and the wire harness WH12 as described above, the projecting portions 122 include the projections 124 formed into the dot-like shapes projecting toward the grounding surface 3 side from the surfaces of the fastening portions 103 that face the grounding surface 3. Accordingly, the ground terminal 121 and the wire harness WH12 enable the projecting portions 122 projecting from the fastening portions 103 to be easily provided with the projections 124. Furthermore, the ground terminal 121 and the wire harness WH12 can make the contact area with the grounding surface 3 relatively smaller than when the flange portions 114 or the like are provided and can further reduce the possibility of running onto the foreign matters 5.

Eighth Embodiment

Figure 24:
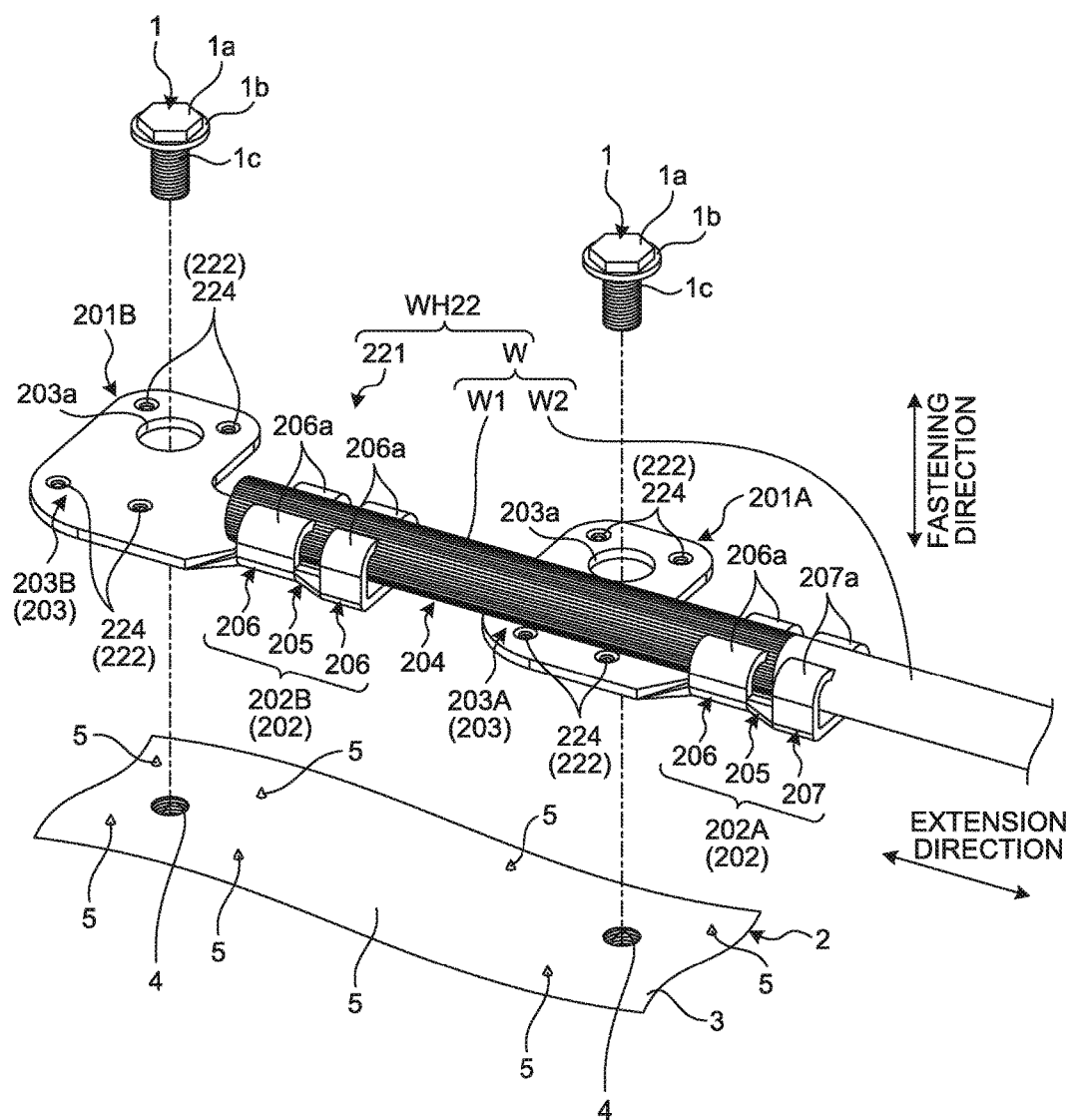
FIG. 24 is a perspective view illustrating a schematic configuration of a ground terminal according to an eighth embodiment.
Figure 25:
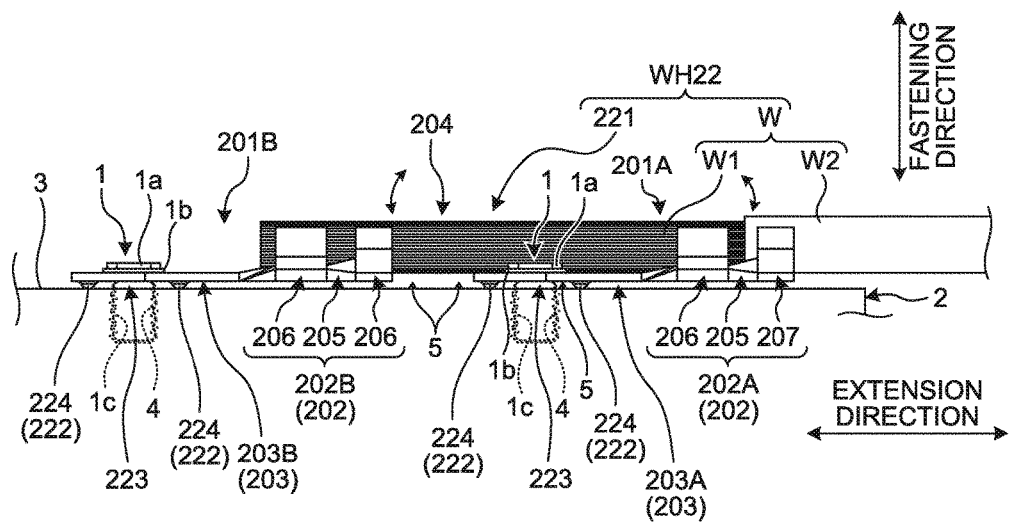
FIG. 25 is a side view illustrating the schematic configuration of the ground terminal in the eighth embodiment.
Figure 26:
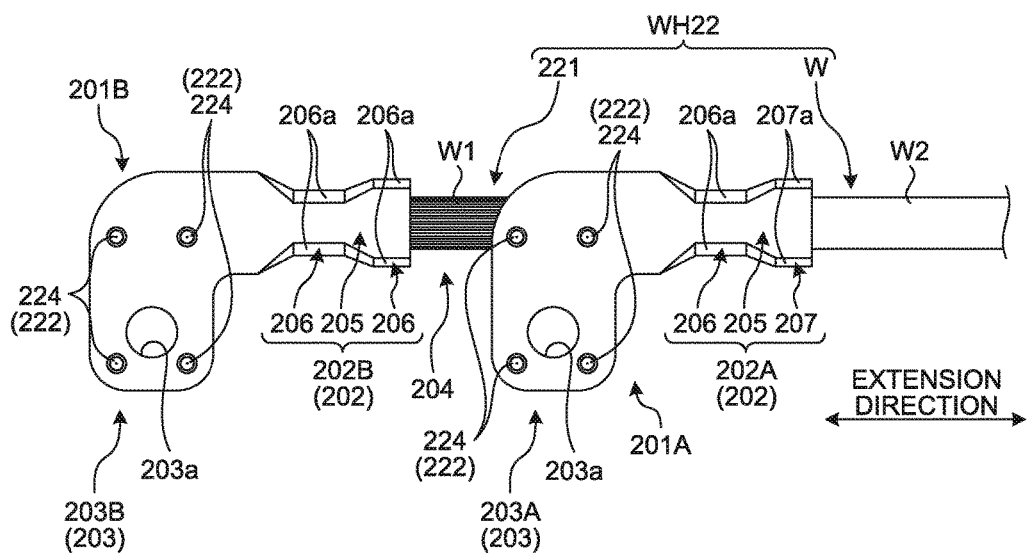
FIG. 26 is a plan view illustrating the schematic configuration of the ground terminal in the eighth embodiment.

FIG. 24 is a perspective view illustrating a schematic configuration of a ground terminal according to an eighth embodiment. FIG. 25 is a side view illustrating the schematic configuration of the ground terminal in the eighth embodiment. FIG. 26 is a plan view illustrating the schematic configuration of the ground terminal in the eighth embodiment (plan view at the side facing a grounding surface). The ground terminal and a wire harness in the eighth embodiment are different from those in the fifth embodiment in the configuration of projecting portions.

A ground terminal 221 in the embodiment as illustrated in FIG. 24, FIG. 25, and FIG. 26 is applied to, for example, a wire harness WH22 or the like. The wire harness WH22 includes the electric wire W and the ground terminal 221 provided at a terminal of the electric wire W. The ground terminal 221 in the embodiment includes projecting portions 222 instead of the projecting portions 212 of the above-mentioned ground terminal 211. The configurations of the ground terminal 221 other than the projecting portions 222 are substantially the same as those of the above-mentioned ground terminal 211 although shapes, sizes, and the like are slightly different therefrom.

The projecting portions 222 are portions that are formed so as to project from the fastening portions 203, and abut against the grounding surface 3 and form foreign matter avoiding space portions 223 between the fastening portions 203 and the grounding surface 3 in a state where the fastening portions 203 face the grounding surface 3. The projecting portions 222 function as spacers between the fastening portions 203 and the grounding surface 3 so that the foreign matter avoiding space portions 223 are formed as space portions capable of accommodating the foreign matters 5 as objects on the grounding surface 3 between the fastening portions 203 and the grounding surface 3.

The projecting portions 222 in the embodiment include projections 224 formed into dot-like shapes projecting toward the grounding surface 3 side from the surfaces of the fastening portions 203 that face the grounding surface 3. The projections 224 are provided on each of the fastening portion 203, in this example, each of the first fastening portion 203A of the first divided terminal 201A and the second fastening portion 203B of the second divided terminal 201B. The projections 224 have substantially the same configurations as those of the above-mentioned projections 124 although shapes, sizes, and the like are slightly different therefrom.

The ground terminal 221 and the wire harness WH22 as described above can absorb a step with the deformation portion 204 even when, for example, any of the fastening portions 203 runs onto the foreign matters 5 and can improve the possibility of the fastening portion 203 capable of facing and being fastened to the grounding surface 3 properly to exist, thereby being properly fastened to the grounding surface 3.

Furthermore, the ground terminal 221 and the wire harness WH22 as described above cause the front ends of the projecting portions 222 that are formed so as to project from the fastening portions 203 to abut against the grounding surface 3, thereby making the contact area with the grounding surface 3 relatively small. Moreover, the ground terminal 221 and the wire harness WH22 form the foreign matter avoiding space portions 223 between the fastening portions 203 and the grounding surface 3 and can therefore reduce the possibility of running onto the foreign matters 5, thereby being properly fastened to the grounding surface 3 more reliably.

In addition, the ground terminal 221 and the wire harness WH22 as described above enable the projecting portions 222 projecting from the fastening portions 203 to be easily provided with the projections 224. Furthermore, the ground terminal 221 and the wire harness WH22 can make the contact area with the grounding surface 3 relatively smaller than when the flange portions 214 or the like are provided and can therefore further reduce the possibility of the running onto the foreign matters 5.

Ninth Embodiment

Figure 27:
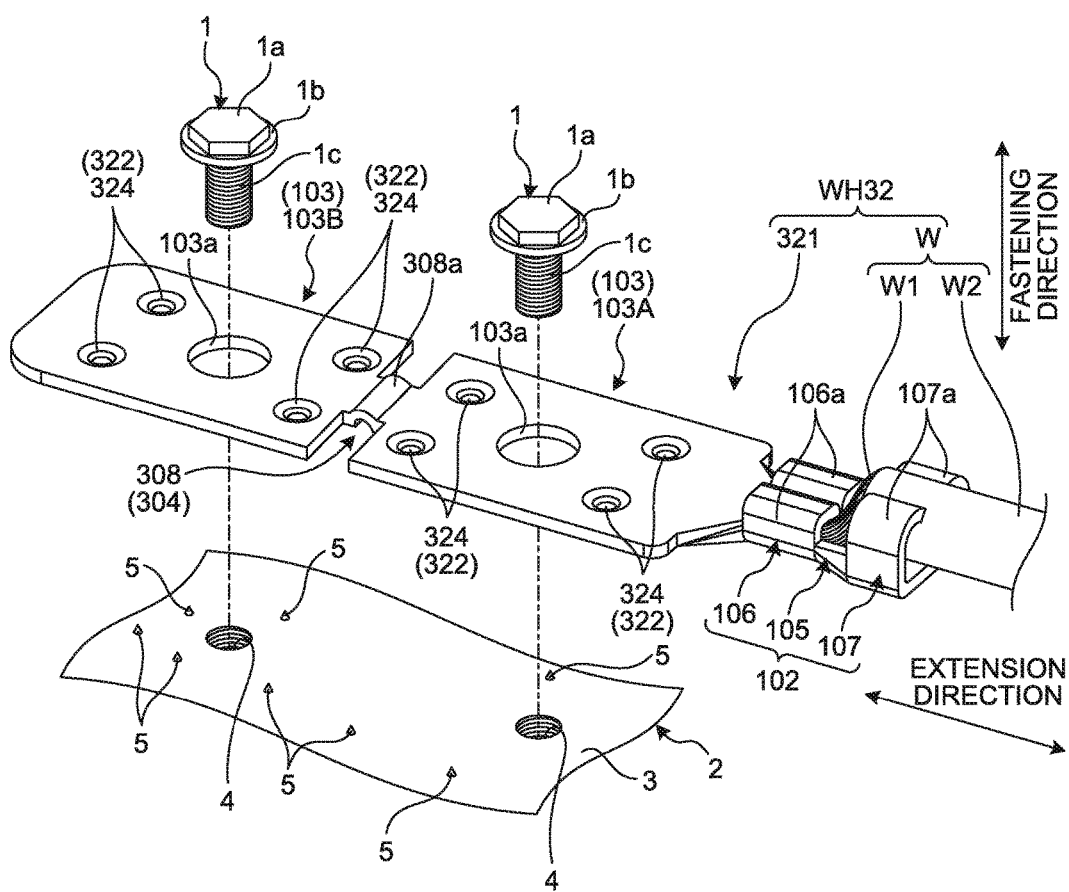
FIG. 27 is a perspective view illustrating a schematic configuration of a ground terminal according to a ninth embodiment.
Figure 28:
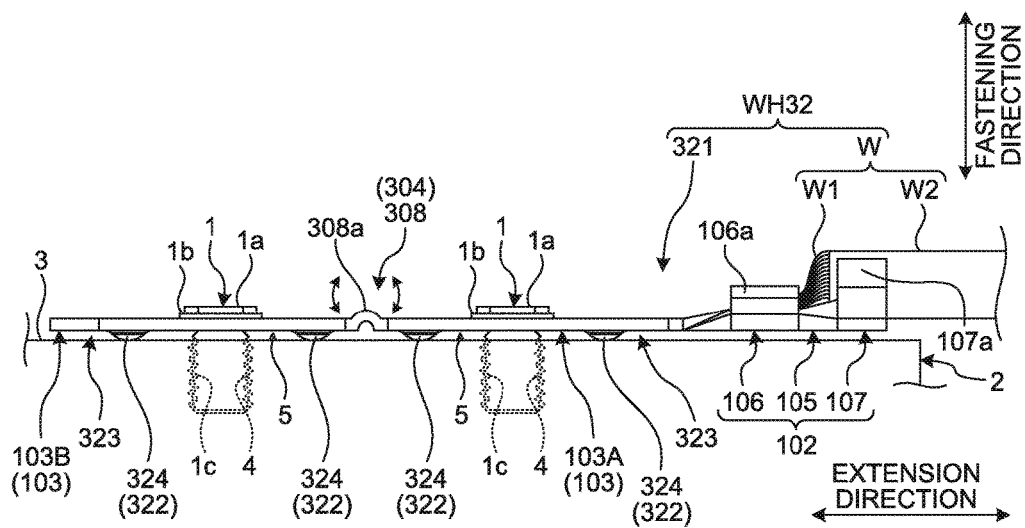
FIG. 28 is a side view illustrating the schematic configuration of the ground terminal in the ninth embodiment.
Figure 29:
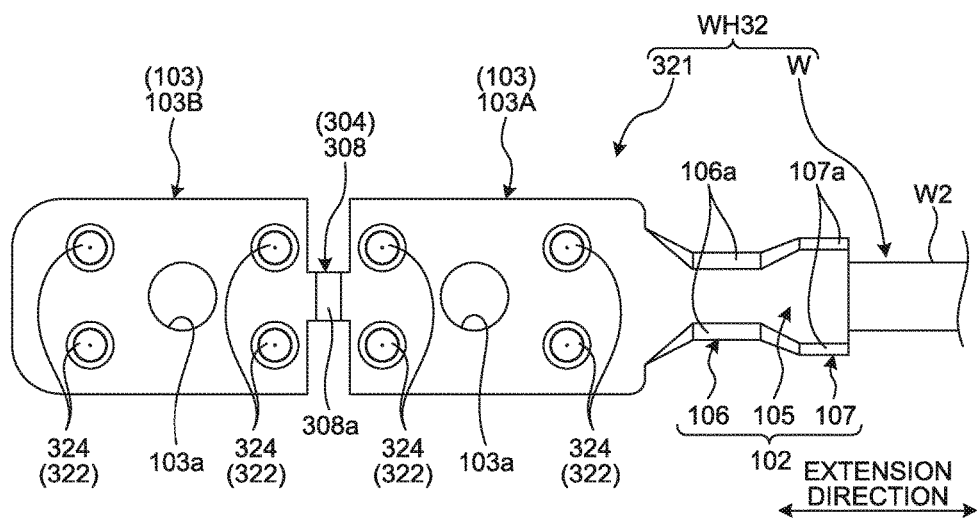
FIG. 29 is a plan view illustrating the schematic configuration of the ground terminal in the ninth embodiment.

FIG. 27 is a perspective view illustrating a schematic configuration of a ground terminal according to a ninth embodiment. FIG. 28 is a side view illustrating the schematic configuration of the ground terminal in the ninth embodiment. FIG. 29 is a plan view illustrating the schematic configuration of the ground terminal in the ninth embodiment (plan view at the side facing a grounding surface). The ground terminal and a wire harness in the ninth embodiment are different from those in the sixth embodiment in the configuration of projecting portions.

A ground terminal 321 in the embodiment as illustrated in FIG. 27, FIG. 28, and FIG. 29 is applied to, for example, a wire harness WH32 or the like. The wire harness WH32 includes the electric wire W and the ground terminal 321 provided at a terminal of the electric wire W. The ground terminal 321 in the embodiment includes projecting portions 322 instead of the projecting portions 312 of the above-mentioned ground terminal 311. The configurations of the ground terminal 321 other than the projecting portions 322 are substantially the same as those of the above-mentioned ground terminal 311 although the number of bending connecting portion 308 is one and shapes, sizes, and the like are slightly different therefrom.

The projecting portions 322 are portions that are formed so as to project from the fastening portions 103, and abut against the grounding surface 3 and form foreign matter avoiding space portions 323 between the fastening portions 103 and the grounding surface 3 in a state where the fastening portions 103 face the grounding surface 3. The projecting portions 322 function as spacers between the fastening portions 103 and the grounding surface 3 so that the foreign matter avoiding space portions 323 are formed as space portions capable of accommodating the foreign matters 5 as objects on the grounding surface 3 between the fastening portions 103 and the grounding surface 3.

The projecting portions 322 in the embodiment include projections 324 formed into dot-like shapes projecting toward the grounding surface 3 side from the surfaces of the fastening portions 103 that face the grounding surface 3. The projections 324 are provided on each of the fastening portions 103, in this example, each of the first fastening portion 103A and the second fastening portion 103B. The projections 324 have substantially the same configurations as those of the above-mentioned projections 124 although shapes, sizes, and the like are slightly different therefrom.

The ground terminal 321 and the wire harness WH32 as described above can absorb a step with the deformation portion 304 even when, for example, any of the fastening portions 103 runs onto the foreign matters 5 and can improve the possibility of the fastening portion 103 capable of facing and being fastened to the grounding surface 3 properly to exist, thereby being properly fastened to the grounding surface 3.

Furthermore, the ground terminal 321 and the wire harness WH32 as described above cause the front ends of the projecting portions 322 that are formed so as to project from the fastening portions 103 to abut against the grounding surface 3, thereby making the contact area with the grounding surface 3 relatively small. Moreover, the ground terminal 321 and the wire harness WH32 form the foreign matter avoiding space portions 323 between the fastening portions 103 and the grounding surface 3 and can therefore reduce the possibility of running onto the foreign matters 5, thereby being properly fastened to the grounding surface 3 more reliably.

In addition, the ground terminal 321 and the wire harness WH32 as described above enable the projecting portions 322 projecting from the fastening portions 103 to be easily provided with the projections 324. Furthermore, the ground terminal 321 and the wire harness WH32 can make the contact area with the grounding surface 3 relatively smaller than when the flange portions 314 or the like are provided and can therefore further reduce the possibility of the running onto the foreign matters 5.

Tenth Embodiment

Figure 30:
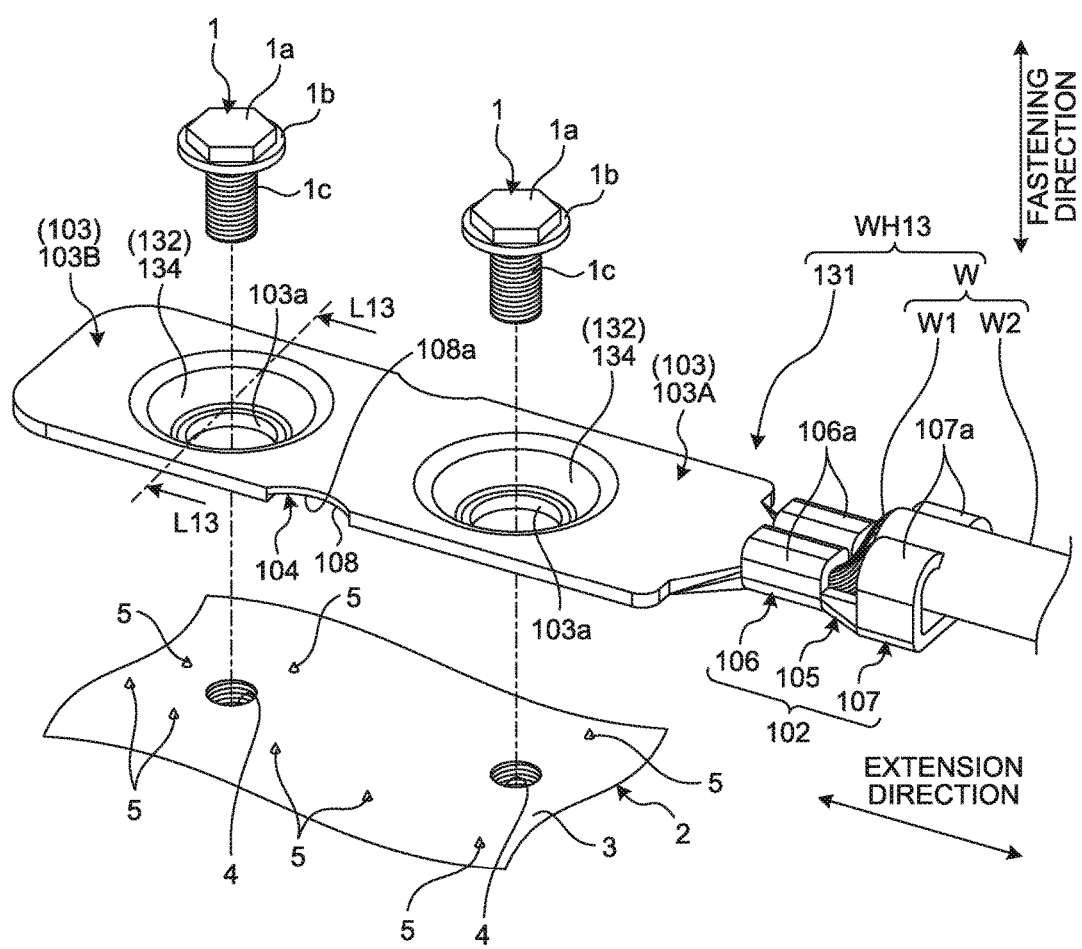
FIG. 30 is a perspective view illustrating a schematic configuration of a ground terminal according to a tenth embodiment.
Figure 31:
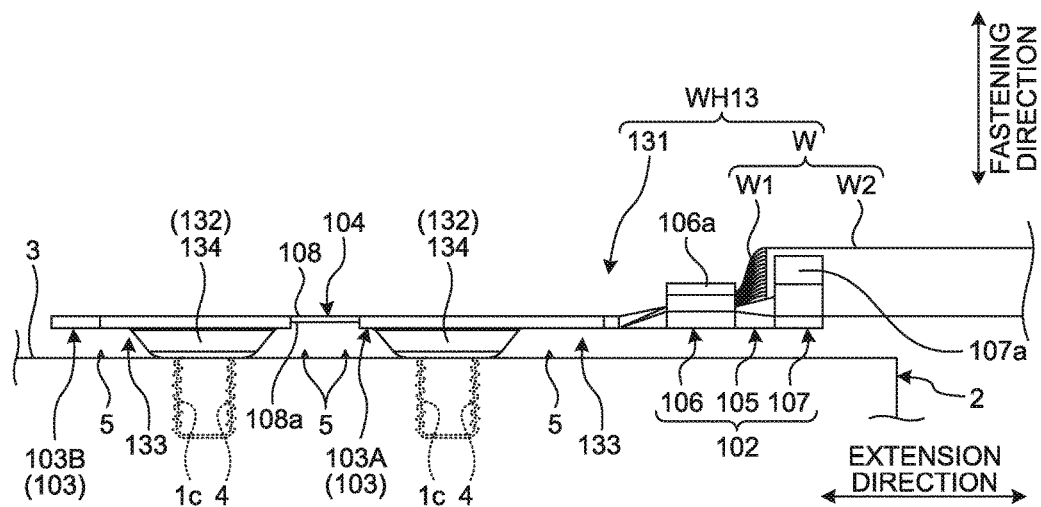
FIG. 31 is a side view illustrating the schematic configuration of the ground terminal in the tenth embodiment.
Figure 32:
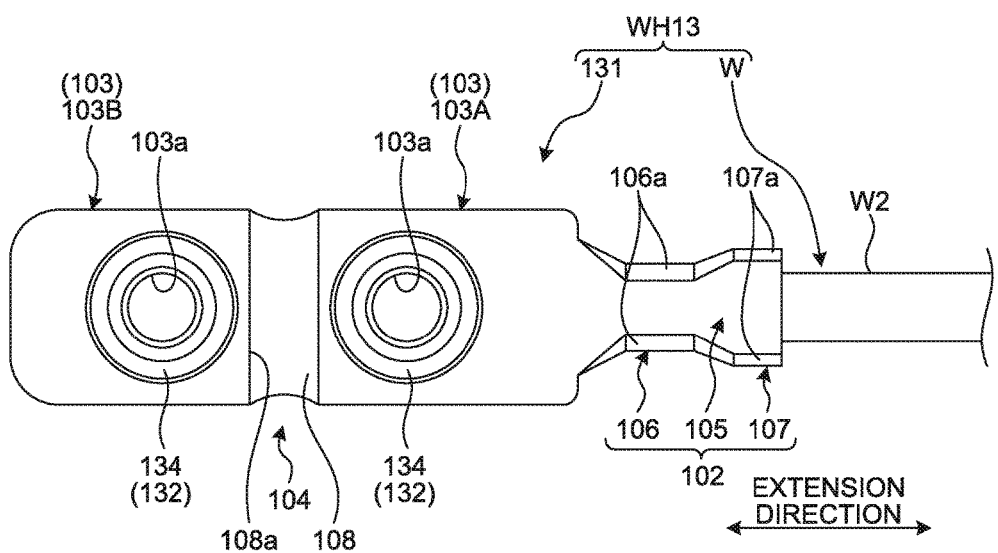
FIG. 32 is a plan view illustrating the schematic configuration of the ground terminal in the tenth embodiment.
Figure 33:
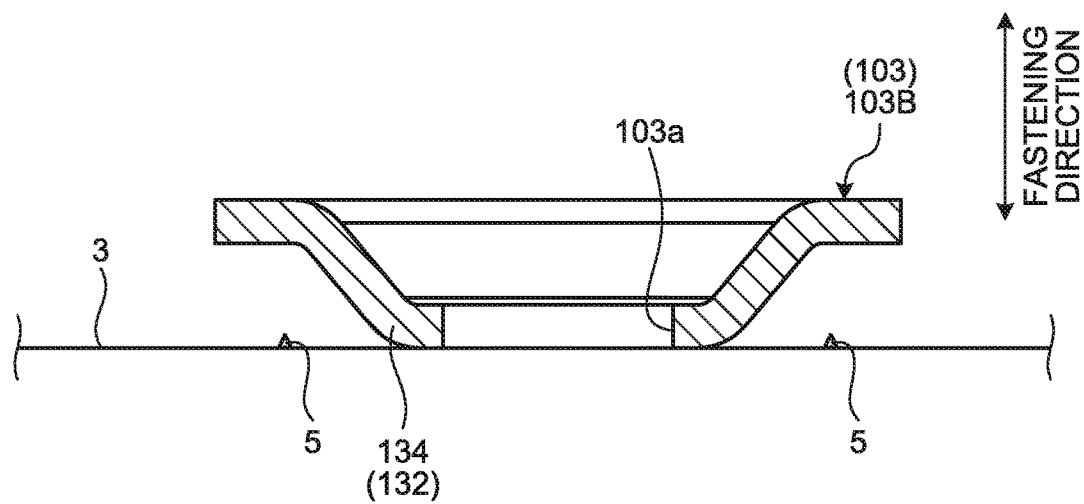
FIG. 33 is a cross-sectional view cut along line L13-L13 in FIG. 30.

FIG. 30 is a perspective view illustrating a schematic configuration of a ground terminal according to a tenth embodiment. FIG. 31 is a side view illustrating the schematic configuration of the ground terminal in the tenth embodiment. FIG. 32 is a plan view illustrating the schematic configuration of the ground terminal in the tenth embodiment (plan view at the side facing a grounding surface). FIG. 33 is a cross-sectional view cut along line L13-L13 in FIG. 30. The ground terminal and a wire harness in the tenth embodiment are different from those in the fourth and seventh embodiments in the configuration of projecting portions. It should be noted that fastening members are not illustrated in FIG. 33 for easiness of understanding.

A ground terminal 131 in the embodiment as illustrated in FIG. 30, FIG. 31, FIG. 32, and FIG. 33 is applied to, for example, a wire harness WH13 or the like. The wire harness WH13 includes the electric wire W and the ground terminal 131 provided at a terminal of the electric wire W. The ground terminal 131 in the embodiment includes projecting portions 132 instead of the projecting portions 112 of the above-mentioned ground terminal 111. The configurations of the ground terminal 131 other than the projecting portions 132 are substantially the same as those of the above-mentioned ground terminal 111 although shapes, sizes, and the like are slightly different therefrom.

The projecting portions 132 are portions that are formed so as to project from the fastening portions 103, and abut against the grounding surface 3 and form foreign matter avoiding space portions 133 between the fastening portions 103 and the grounding surface 3 in a state where the fastening portions 103 face the grounding surface 3. The projecting portions 132 function as spacers between the fastening portions 103 and the grounding surface 3 so that the foreign matter avoiding space portions 133 are formed as space portions capable of accommodating the foreign matters 5 as objects on the grounding surface 3 between the fastening portions 103 and the grounding surface 3.

The projecting portions 132 in the embodiment are formed into ring shapes projecting toward the grounding surface 3 side and include narrowing portions 134 having, on projection front ends, the fastening holes 103a into which the fastening members 1 are inserted. The narrowing portion 134 is provided on each of the fastening portions 103, in this example, each of the first fastening portion 103A and the second fastening portion 103B. One narrowing portion 134 is formed in the first fastening portion 103A as having such shape that a portion corresponding to the fastening hole 103a is hollowed and the fastening hole 103a is formed on a bottom portion of the hollow. In the same manner, one narrowing portion 134 is formed in the second fastening portion 103B as having such shape that a portion corresponding to the fastening hole 103a is hollowed and the fastening hole 103a is formed on a bottom portion of the hollow. The narrowing portion 134 provided on each of the first fastening portion 103A and the second fastening portion 103B is formed into a shape projecting toward the grounding surface 3 side from the surface facing the grounding surface 3 by, for example, press processing. The projecting amounts of the narrowing portions 134 of the projecting portions 132 are set such that the fastening portions 103 have a proper positional relation with the grounding surface 3, that is, have a positional relation of facing the grounding surface 3 substantially in parallel in a state where the front ends of the respective narrowing portions 134 abut against the grounding surface 3 with no foreign matter 5 interposed therebetween. The projecting portions 132 are preferably formed such that the projecting amounts of the respective narrowing portions 134 are larger than the previously supposed sizes of the foreign matters 5. The front ends of the narrowing portions 134 configuring the projecting portions 132 abut against the grounding surface 3 and function as the spacers between the fastening portions 103 and the grounding surface 3 so as to cause the foreign matter avoiding space portions 133 to be defined between the fastening portions 103 and the grounding surface 3.

The ground terminal 131 and the wire harness WH13 as described above can absorb a step with the deformation portion 104 even when, for example, any of the fastening portions 103 runs onto the foreign matters 5 and can improve the possibility of the fastening portion 103 capable of facing and being fastened to the grounding surface 3 properly to exist, thereby being properly fastened to the grounding surface 3.

Furthermore, the ground terminal 131 and the wire harness WH13 as described above cause the front ends of the projecting portions 132 that are formed so as to project from the fastening portions 103 to abut against the grounding surface 3, thereby making the contact area with the grounding surface 3 relatively small. Moreover, the ground terminal 131 and the wire harness WH13 form the foreign matter avoiding space portions 133 between the fastening portions 103 and the grounding surface 3 and can therefore reduce the possibility of running onto the foreign matters 5, thereby being properly fastened to the grounding surface 3 more reliably.

In addition, with the ground terminal 131 and the wire harness WH13 as described above, the projecting portions 132 are formed into the ring shapes projecting toward the grounding surface 3 side and include the narrowing portions 134 having, on the projection front ends, the fastening holes 103a into which the fastening members 1 are inserted. Accordingly, the ground terminal 131 and the wire harness WH13 enable the projecting portions 132 projecting from the fastening portions 103 to be easily provided with the narrowing portions 134 with the relatively small number of processing times. Furthermore, the ground terminal 131 and the wire harness WH13 can make the contact area with the grounding surface 3 relatively smaller than when the flange portions 114 or the like are provided and can therefore further reduce the possibility of the running onto the foreign matters 5.

Eleventh Embodiment

Figure 34:
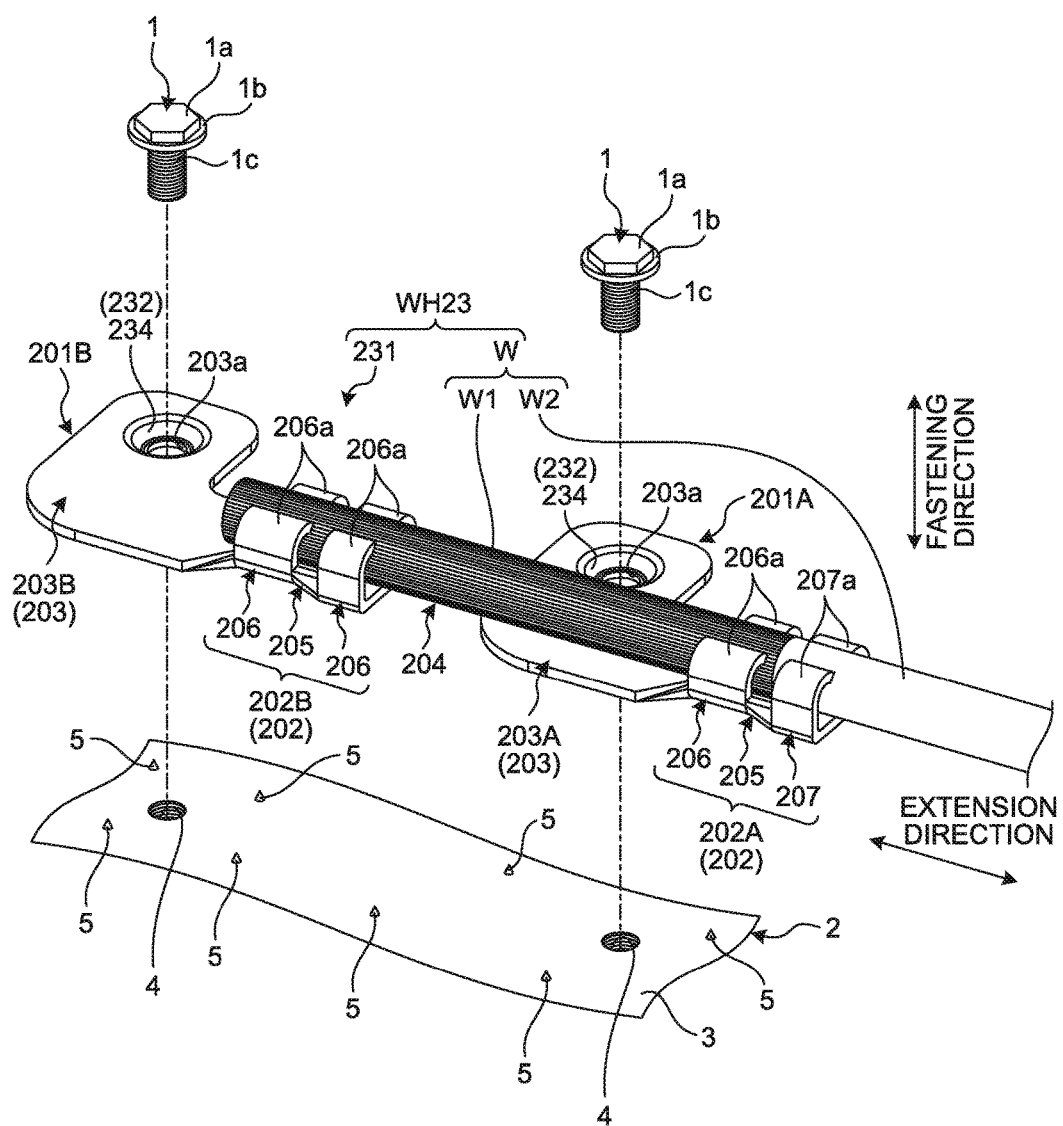
FIG. 34 is a perspective view illustrating a schematic configuration of a ground terminal according to an eleventh embodiment.
Figure 35:
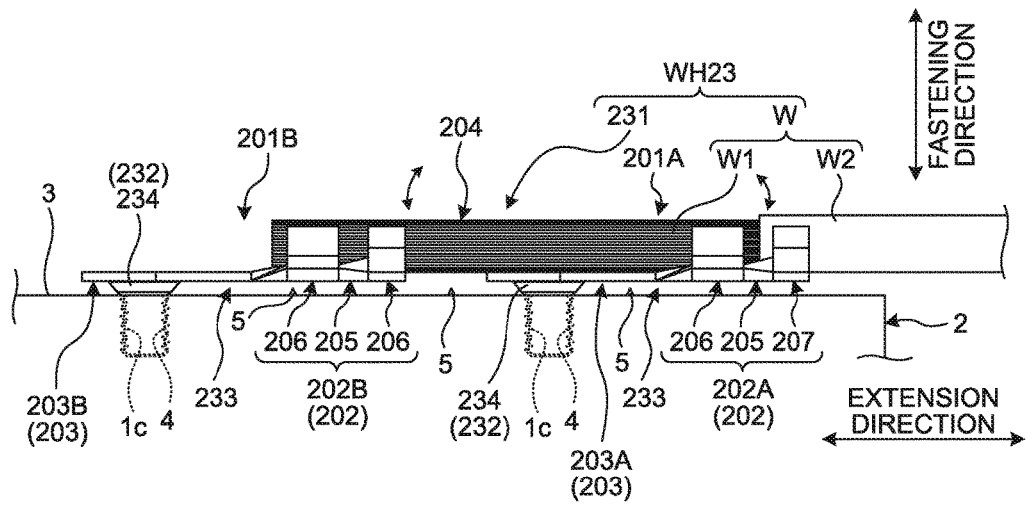
FIG. 35 is a side view illustrating the schematic configuration of the ground terminal in the eleventh embodiment.
Figure 36:
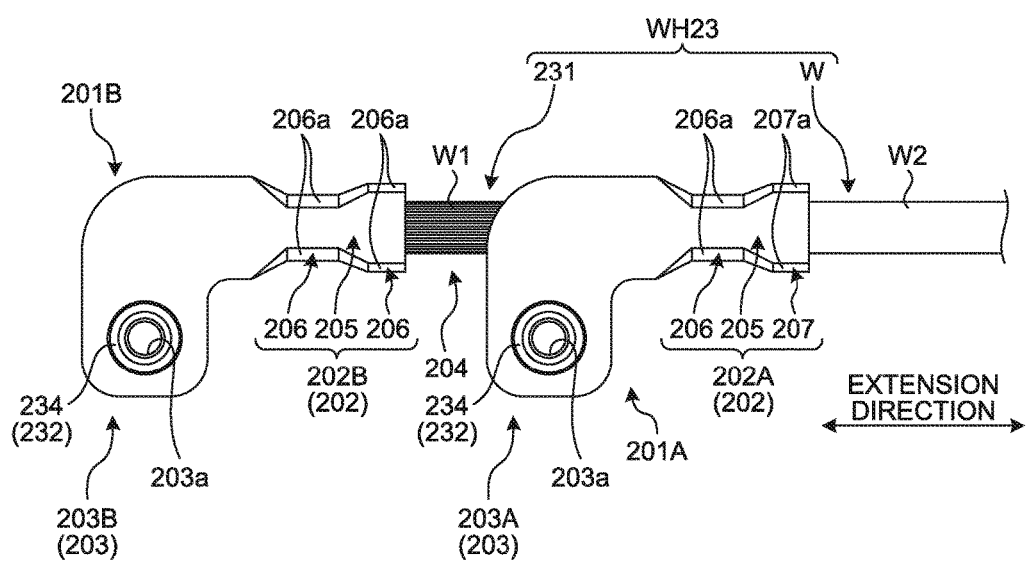
FIG. 36 is a plan view illustrating the schematic configuration of the ground terminal in the eleventh embodiment.

FIG. 34 is a perspective view illustrating a schematic configuration of a ground terminal according to an eleventh embodiment. FIG. 35 is a side view illustrating the schematic configuration of the ground terminal in the eleventh embodiment. FIG. 36 is a plan view illustrating the schematic configuration of the ground terminal in the eleventh embodiment (plan view at the side facing a grounding surface). The ground terminal and a wire harness in the eleventh embodiment are different from those in the fifth and eighth embodiments in the configuration of projecting portions.

An ground terminal 231 in the embodiment as illustrated in FIG. 34, FIG. 35, and FIG. 36 is applied to, for example, a wire harness WH23 or the like. The wire harness WH23 includes the electric wire W and the ground terminal 231 provided at a terminal of the electric wire W. The ground terminal 231 in the embodiment includes projecting portions 232 instead of the projecting portions 212 of the above-mentioned ground terminal 211. The configurations of the ground terminal 231 other than the projecting portions 232 are substantially the same as those of the above-mentioned ground terminal 211 although shapes, sizes, and the like are slightly different therefrom.

The projecting portions 232 are portions that are formed so as to project from the fastening portions 203, and abut against the grounding surface 3 and form foreign matter avoiding space portions 233 between the fastening portions 203 and the grounding surface 3 in a state where the fastening portions 203 face the grounding surface 3. The projecting portions 232 function as spacers between the fastening portions 203 and the grounding surface 3 so that the foreign matter avoiding space portions 233 are formed as space portions capable of accommodating the foreign matters 5 as objects on the grounding surface 3 between the fastening portions 203 and the grounding surface 3.

The projecting portions 232 in the embodiment are formed into ring shapes projecting toward the grounding surface 3 side and include narrowing portions 234 having, on projection front ends, the fastening holes 203a into which the fastening members 1 are inserted. The narrowing portion 234 is provided on each of the fastening portions 203, in this example, each of the first fastening portion 203A of the first divided terminal 201A and the second fastening portion 203B of the second divided terminal 201B. The narrowing portions 234 have substantially the same configurations as those of the above-mentioned narrowing portions 134 although shapes, sizes, and the like are slightly different therefrom.

The ground terminal 231 and the wire harness WH23 as described above can absorb a step with the deformation portion 204 even when, for example, any of the fastening portions 203 runs on the foreign matters 5 and can improve the possibility of the fastening portion 203 capable of facing and being fastened to the grounding surface 3 properly to exist, thereby being properly fastened to the grounding surface 3.

The ground terminal 231 and the wire harness WH23 as described above cause the front ends of the projecting portions 232 that are formed so as to project from the fastening portions 203 to abut against the grounding surface 3, thereby making the contact area with the grounding surface 3 relatively small. Moreover, the ground terminal 231 and the wire harness WH23 form the foreign matter avoiding space portions 233 between the fastening portions 203 and the grounding surface 3 and can therefore reduce the possibility of running onto the foreign matters 5, thereby being properly fastened to the grounding surface 3 more reliably.

In addition, the ground terminal 231 and the wire harness WH23 as described above enable the projecting portions 232 projecting from the fastening portions 203 to be easily provided with the narrowing portions 234 with the relatively small number of processing times. Furthermore, the ground terminal 231 and the wire harness WH23 can make the contact area with the grounding surface 3 relatively smaller than when the flange portions 214 or the like are provided and can therefore further reduce the possibility of the running onto the foreign matters 5.

Twelfth Embodiment

Figure 37:
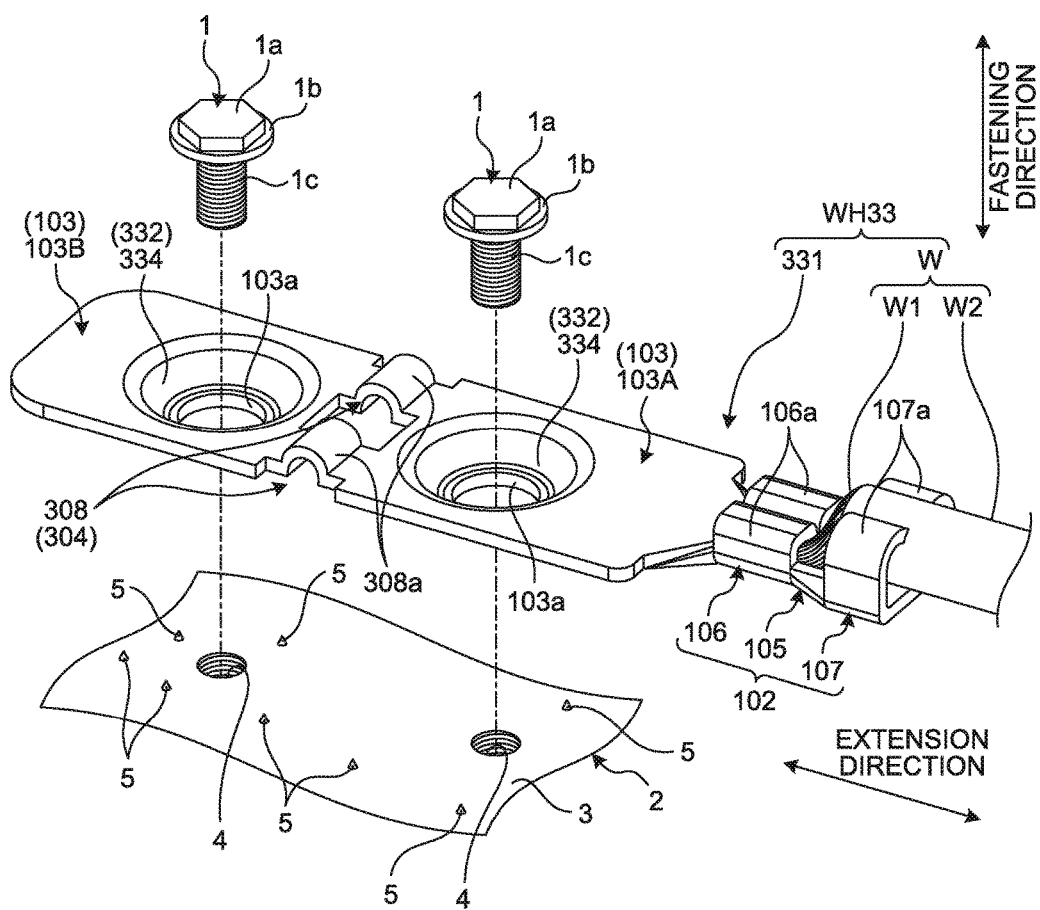
FIG. 37 is a perspective view illustrating a schematic configuration of a ground terminal according to a twelfth embodiment.
Figure 38:
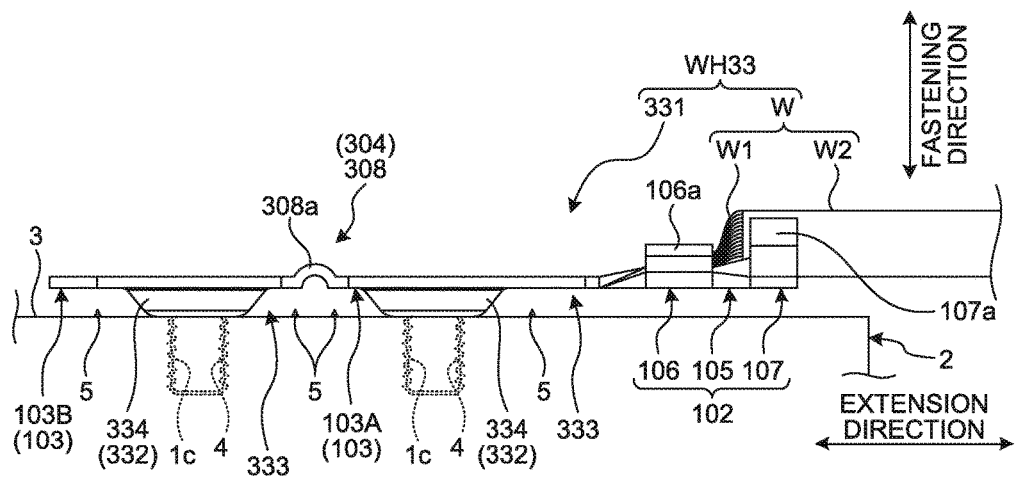
FIG. 38 is a side view illustrating the schematic configuration of the ground terminal in the twelfth embodiment.
Figure 39:
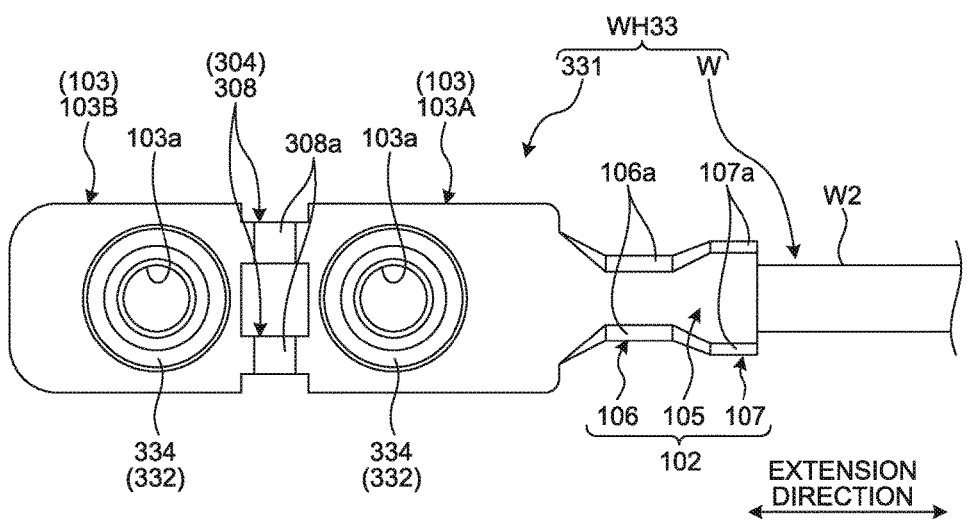
FIG. 39 is a plan view illustrating the schematic configuration of the ground terminal in the twelfth embodiment.

FIG. 37 is a perspective view illustrating a schematic configuration of a ground terminal according to a twelfth embodiment. FIG. 38 is a side view illustrating the schematic configuration of the ground terminal in the twelfth embodiment. FIG. 39 is a plan view illustrating the schematic configuration of the ground terminal in the twelfth embodiment (plan view at the side facing a grounding surface). The ground terminal and a wire harness in the twelfth embodiment are different from those in the sixth and ninth embodiments in the configuration of projecting portions.

A ground terminal 331 in the embodiment as illustrated in FIG. 37, FIG. 38, and FIG. 39 is applied to, for example, a wire harness WH33 or the like. The wire harness WH33 includes the electric wire W and the ground terminal 331 provided at a terminal of the electric wire W. The ground terminal 331 in the embodiment includes projecting portions 332 instead of the projecting portions 312 of the above-mentioned ground terminal 311. The configurations of the ground terminal 331 other than the projecting portions 332 are substantially the same as those of the above-mentioned ground terminal 311 although shapes, sizes, and the like are slightly different therefrom.

The projecting portions 332 are portions that are formed so as to project from the fastening portions 103, and abut against the grounding surface 3 and form foreign matter avoiding space portions 333 between the fastening portions 103 and the grounding surface 3 in a state where the fastening portions 103 face the grounding surface 3. The projecting portions 332 function as spacers between the fastening portions 103 and the grounding surface 3 so that the foreign matter avoiding space portions 333 are formed as space portions capable of accommodating the foreign matters 5 as objects on the grounding surface 3 between the fastening portions 103 and the grounding surface 3.

The projecting portions 332 in the embodiment are formed into ring shapes projecting toward the grounding surface 3 side and include narrowing portions 334 having, on projection front ends, the fastening holes 103a into which the fastening members 1 are inserted. The narrowing portion 334 is provided on each of the fastening portions 103, in this example, each of the first fastening portion 103A and the second fastening portion 103B. The narrowing portions 334 have substantially the same configurations as those of the above-mentioned narrowing portions 134 although shapes, sizes, and the like are slightly different therefrom.

The ground terminal 331 and the wire harness WH33 as described above can absorb a step with the deformation portion 304 even when, for example, any of the fastening portions 103 runs on the foreign matters 5 and can improve the possibility of the fastening portion 103 capable of facing and being fastened to the grounding surface 3 properly to exist, thereby being properly fastened to the grounding surface 3.

Furthermore, the ground terminal 331 and the wire harness WH33 as described above cause the front ends of the projecting portions 332 that are formed so as to project from the fastening portions 103 to abut against the grounding surface 3, thereby making the contact area with the grounding surface 3 relatively small. Moreover, the ground terminal 331 and the wire harness WH33 form the foreign matter avoiding space portions 333 between the fastening portions 103 and the grounding surface 3 and can therefore reduce the possibility of running onto the foreign matters 5, thereby being properly fastened to the grounding surface 3 more reliably.

In addition, the ground terminal 331 and the wire harness WH33 as described above enable the projecting portions 332 projecting from the fastening portions 103 to be easily provided with the narrowing portions 334 with the relatively small number of processing times. Furthermore, the ground terminal 331 and the wire harness WH33 can make the contact area with the grounding surface 3 relatively smaller than when the flange portions 314 or the like are provided and can therefore further reduce the possibility of the running onto the foreign matters 5.

Thirteenth Embodiment

Figure 40:
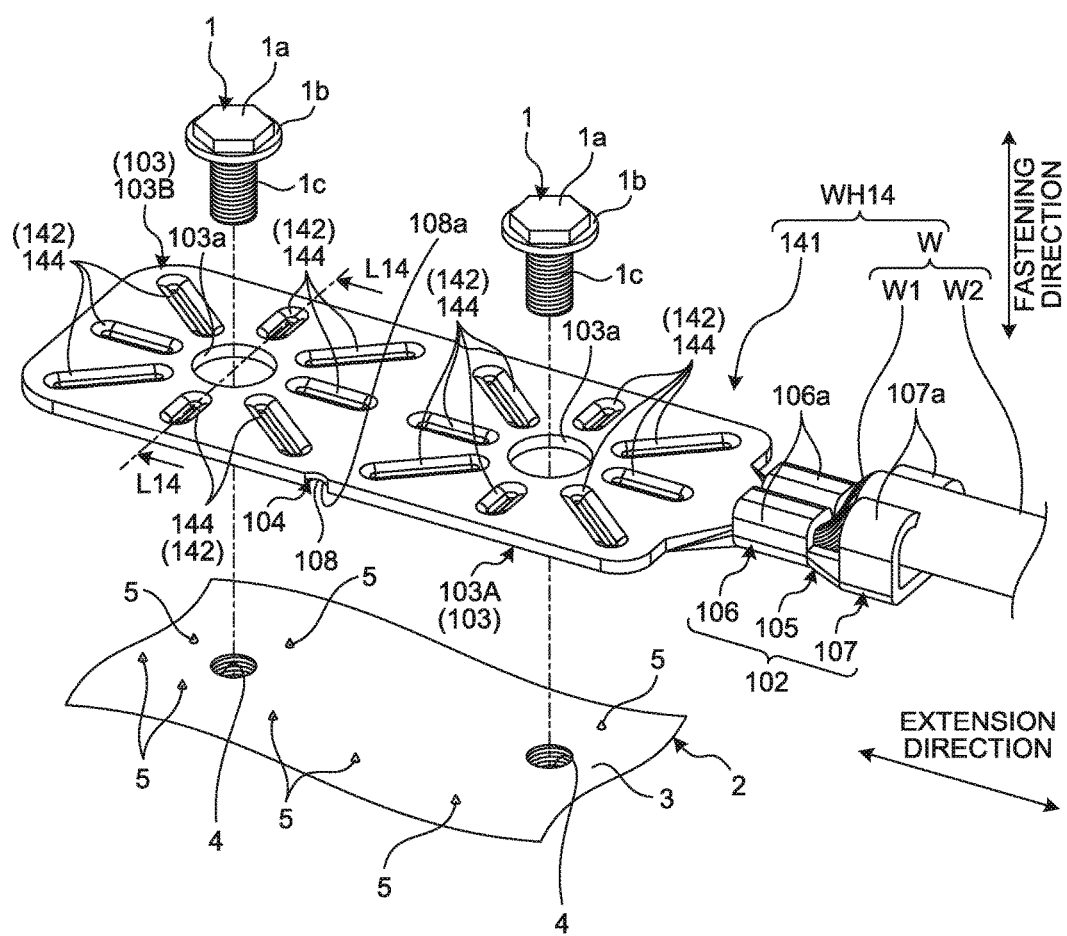
FIG. 40 is a perspective view illustrating a schematic configuration of a ground terminal according to a thirteenth embodiment.
Figure 41:
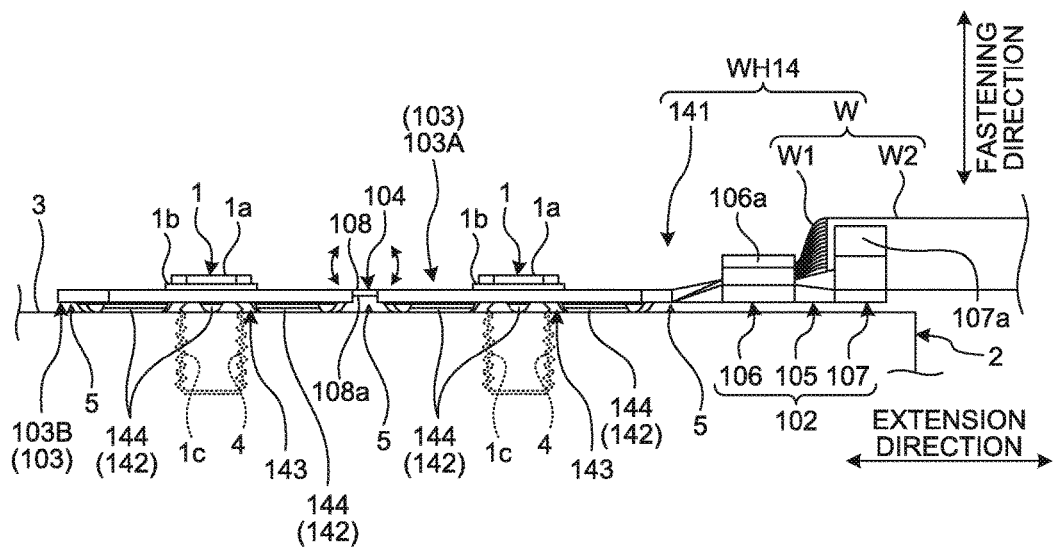
FIG. 41 is a side view illustrating the schematic configuration of the ground terminal in the thirteenth embodiment.
Figure 42:
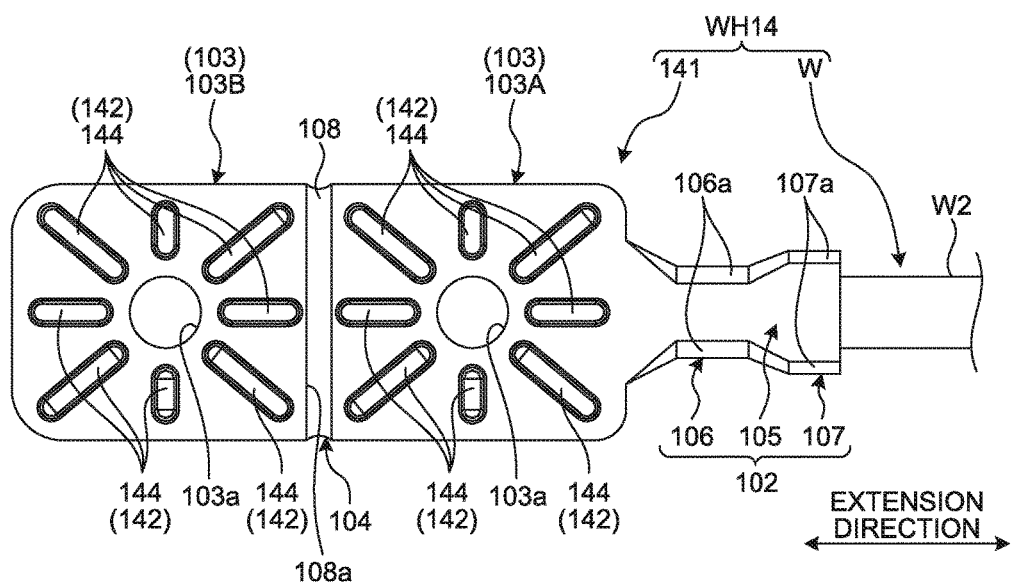
FIG. 42 is a plan view illustrating the schematic configuration of the ground terminal in the thirteenth embodiment.
Figure 43:
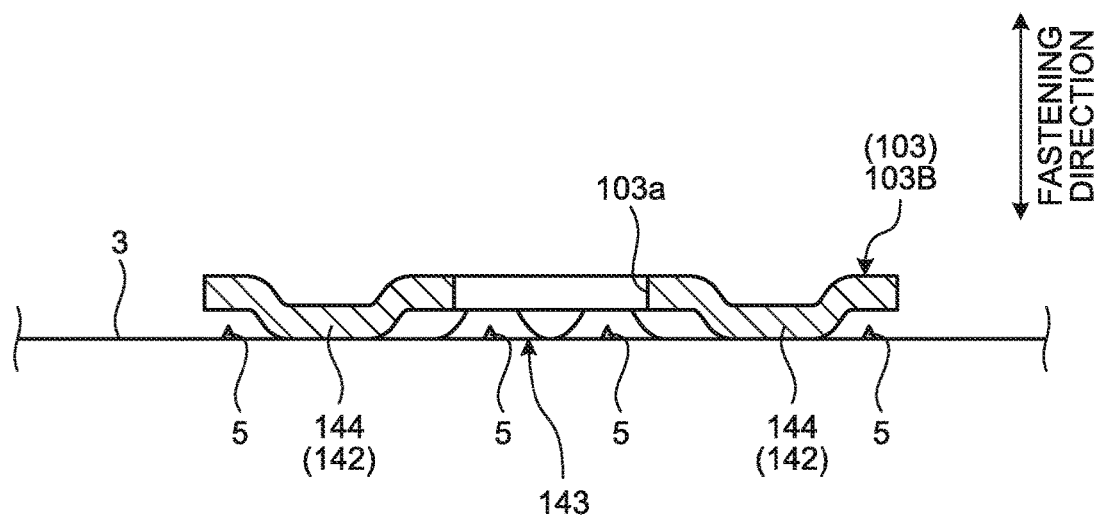
FIG. 43 is a cross-sectional view cut along line L14-L14 in FIG. 20.

FIG. 40 is a perspective view illustrating a schematic configuration of a ground terminal according to a thirteenth embodiment. FIG. 41 is a side view illustrating the schematic configuration of the ground terminal in the thirteenth embodiment. FIG. 42 is a plan view illustrating the schematic configuration of the ground terminal in the thirteenth embodiment (plan view at the side facing a grounding surface). FIG. 43 is a cross-sectional view cut along line L14-L14 in FIG. 20. The ground terminal and a wire harness in the thirteenth embodiment are different from those in the fourth, seventh, and tenth embodiments in the configuration of projecting portions. It should be noted that fastening members are not illustrated in FIG. 43 for easiness of understanding.

A ground terminal 141 in the embodiment as illustrated in FIG. 40, FIG. 41, FIG. 42, and FIG. 43 is applied to, for example, a wire harness WH14 or the like. The wire harness WH14 includes the electric wire W and the ground terminal 141 provided at a terminal of the electric wire W. The ground terminal 141 in the embodiment includes projecting portions 142 instead of the projecting portions 112 of the above-mentioned ground terminal 111. The configurations of the ground terminal 141 other than the projecting portions 142 are substantially the same as those of the above-mentioned ground terminal 111 although shapes, sizes, and the like are slightly different therefrom.

The projecting portions 142 are portions that are formed so as to project from the fastening portions 103, and abut against the grounding surface 3 and form foreign matter avoiding space portions 143 between the fastening portions 103 and the grounding surface 3 in a state where the fastening portions 103 face the grounding surface 3. The projecting portions 142 function as spacers between the fastening portions 103 and the grounding surface 3 so that the foreign matter avoiding space portions 143 are formed as space portions capable of accommodating the foreign matters 5 as objects on the grounding surface 3 between the fastening portions 103 and the grounding surface 3.

The projecting portions 142 in the embodiment include bead portions 144 formed linearly so as to project toward the grounding surface 3 side from the surfaces of the fastening portions 103 that face the grounding surface 3. The bead portions 144 are provided on each of the fastening portions 103, in this example, each of the first fastening portion 103A and the second fastening portion 103B. In the first fastening portion 103A, as the bead portions 144, in this example, eight bead portions 144 are formed radially around the fastening hole 103a so as to project to the grounding surface 3 side and surround the fastening hole 103a. In the same manner, in the second fastening portion 103B, as the bead portions 144, in this example, eight bead portions 144 are formed radially around the fastening hole 103a so as to project to the grounding surface 3 side and surround the fastening hole 103a. The bead portions 144 provided on each of the first fastening portion 103A and the second fastening portion 103B are formed into bar shapes projecting toward the grounding surface 3 side from the surface facing the grounding surface 3 by, for example, oval bead processing. The projecting amounts of the respective bead portions 144 of the projecting portions 142 are set such that the fastening portions 103 have a proper positional relation with the grounding surface 3, that is, have a positional relation of facing the grounding surface 3 substantially in parallel in a state where the front ends of the respective bead portions 144 abut against the grounding surface 3 with no foreign matter 5 interposed therebetween. The projecting portions 142 are preferably formed such that the projecting amounts of the respective bead portions 144 are larger than the previously supposed sizes of the foreign matters 5. The front ends of the respective bead portions 144 configuring the projecting portions 142 abut against the grounding surface 3 and function as the spacers between the fastening portions 103 and the grounding surface 3 so as to cause the foreign matter avoiding space portions 143 to be defined between the fastening portions 103 and the grounding surface 3.

The ground terminal 141 and the wire harness WH14 as described above can absorb a step with the deformation portion 104 even when, for example, any of the fastening portions 103 runs onto the foreign matters 5 and can improve the possibility of the fastening portion 103 capable of facing and being fastened to the grounding surface 3 properly to exist, thereby being properly fastened to the grounding surface 3.

Furthermore, the ground terminal 141 and the wire harness WH14 as described above cause the front ends of the projecting portions 142 that are formed so as to project from the fastening portions 103 to abut against the grounding surface 3, thereby making the contact area with the grounding surface 3 relatively small. Moreover, the ground terminal 141 and the wire harness WH14 form the foreign matter avoiding space portions 143 between the fastening portions 103 and the grounding surface 3 and can therefore reduce the possibility of running onto the foreign matters 5, thereby being properly fastened to the grounding surface 3 more reliably.

In addition, with the ground terminal 141 and the wire harness WH14 as described above, the projecting portions 142 include the bead portions 144 formed linearly so as to project toward the grounding surface 3 side from the surfaces of the fastening portions 103 that face the grounding surface 3. Accordingly, the ground terminal 141 and the wire harness WH14 enable the projecting portions 142 projecting from the fastening portions 103 to be easily provided with the bead projections 144. Furthermore, the ground terminal 141 and the wire harness WH14 enable the fastening portions 103 to stably abut against the grounding surface 3 so as to have the proper positional relation with the grounding surface 3 more reliably in comparison with the case when the projections 124 or the like are provided.

Fourteenth Embodiment

Figure 44:
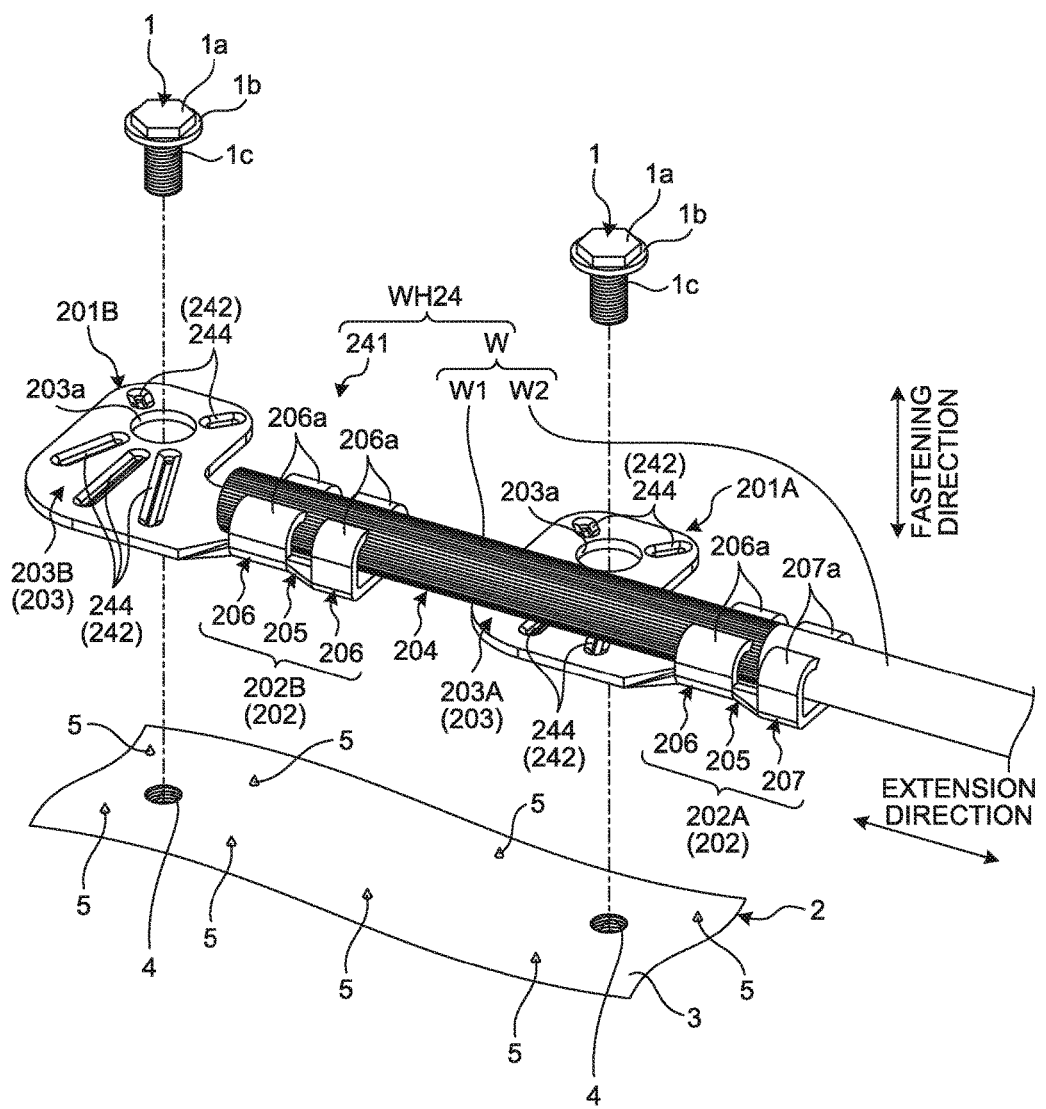
FIG. 44 is a perspective view illustrating a schematic configuration of a ground terminal according to a fourteenth embodiment.
Figure 45:
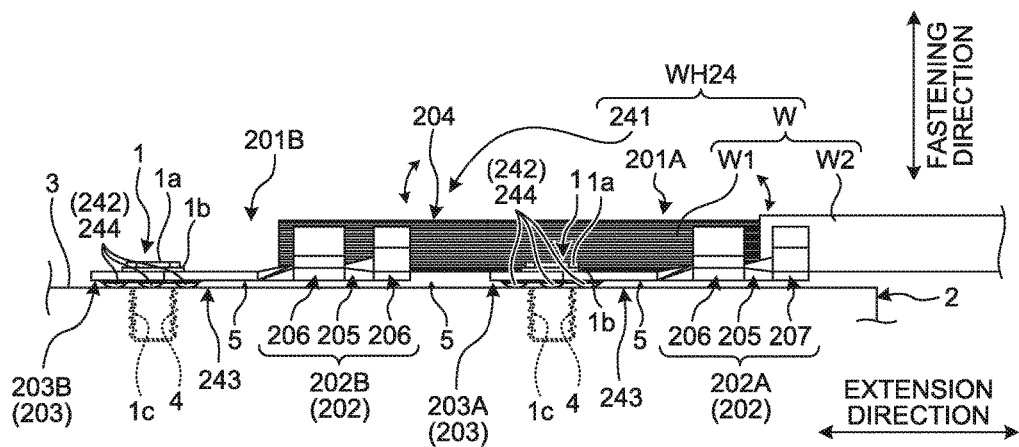
FIG. 45 is a side view illustrating the schematic configuration of the ground terminal in the fourteenth embodiment.
Figure 46:
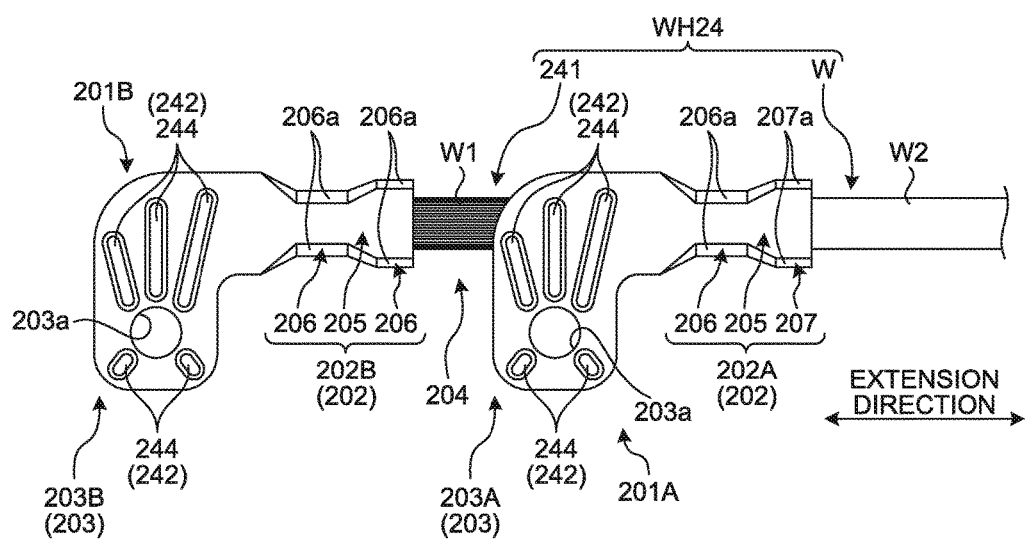
FIG. 46 is a plan view illustrating the schematic configuration of the ground terminal in the fourteenth embodiment.

FIG. 44 is a perspective view illustrating a schematic configuration of a ground terminal according to a fourteenth embodiment. FIG. 45 is a side view illustrating the schematic configuration of the ground terminal in the fourteenth embodiment. FIG. 46 is a plan view illustrating the schematic configuration of the ground terminal in the fourteenth embodiment (plan view at the side facing a grounding surface). The ground terminal and a wire harness in the fourteenth embodiment are different from those in the fifth, eighth, and eleventh embodiments in the configuration of projecting portions.

A ground terminal 241 in the embodiment as illustrated in FIG. 44, FIG. 45, and FIG. 46 is applied to, for example, a wire harness WH24 or the like. The wire harness WH24 includes the electric wire W and the ground terminal 241 provided at a terminal of the electric wire W. The ground terminal 241 in the embodiment includes projecting portions 242 instead of the projecting portions 212 of the above-mentioned ground terminal 211. The configurations of the ground terminal 241 other than the projecting portions 242 are substantially the same as those of the above-mentioned ground terminal 211 although shapes, sizes, and the like are slightly different therefrom.

The projecting portions 242 are portions that are formed so as to project from the fastening portions 203, and abut against the grounding surface 3 and form foreign matter avoiding space portions 243 between the fastening portions 203 and the grounding surface 3 in a state where the fastening portions 203 face the grounding surface 3. The projecting portions 242 function as spacers between the fastening portions 203 and the grounding surface 3 so that the foreign matter avoiding space portions 243 are formed as space portions capable of accommodating the foreign matters 5 as objects on the grounding surface 3 between the fastening portions 203 and the grounding surface 3.

The projecting portions 242 in the embodiment include bead portions 244 formed linearly so as to project toward the grounding surface 3 side from the surfaces of the fastening portions 203 that face the grounding surface 3. The bead portions 244 are provided on each of the fastening portions 203, in this example, each of the first fastening portion 203A of the first divided terminal 201A and the second fastening portion 203B of the second divided terminal 201B. The bead portions 244 have substantially the same configurations as those of the above-mentioned bead portions 144 although shapes, sizes, and the like are slightly different therefrom.

The ground terminal 241 and the wire harness WH24 as described above can absorb a step with the deformation portion 204 even when, for example, any of the fastening portions 203 runs onto the foreign matters 5 and can improve the possibility of the fastening portion 203 capable of facing and being fastened to the grounding surface 3 properly to exist, thereby being properly fastened to the grounding surface 3.

Furthermore, the ground terminal 241 and the wire harness WH24 as described above cause the front ends of the projecting portions 242 formed so as to project from the fastening portions 203 to abut against the grounding surface 3, thereby making the contact area with the grounding surface 3 relatively small. Moreover, the ground terminal 241 and the wire harness WH24 form the foreign matter avoiding space portions 243 between the fastening portions 203 and the grounding surface 3 and can therefore reduce the possibility of running onto the foreign matters 5, thereby being properly fastened to the grounding surface 3 more reliably.

In addition, the ground terminal 241 and the wire harness WH24 as described above enable the projecting portions 242 projecting from the fastening portions 203 to be easily provided with the bead portions 244. Furthermore, the ground terminal 241 and the wire harness WH24 enable the fastening portions 203 to stably abut against the grounding surface 3 so as to have the proper positional relation with the grounding surface 3 more reliably in comparison with the case when the projections 224 or the like are provided.

Fifteenth Embodiment

Figure 47:
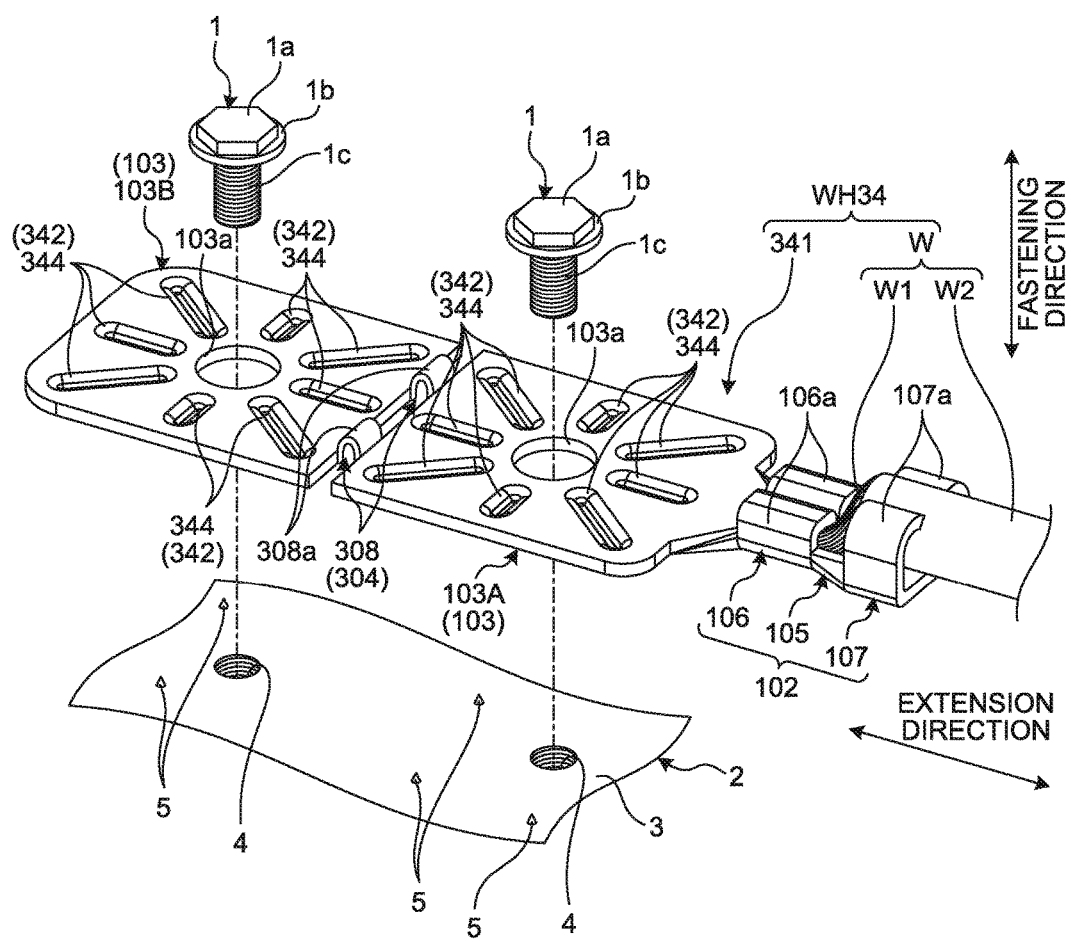
FIG. 47 is a perspective view illustrating a schematic configuration of a ground terminal according to a fifteenth embodiment.
Figure 48:
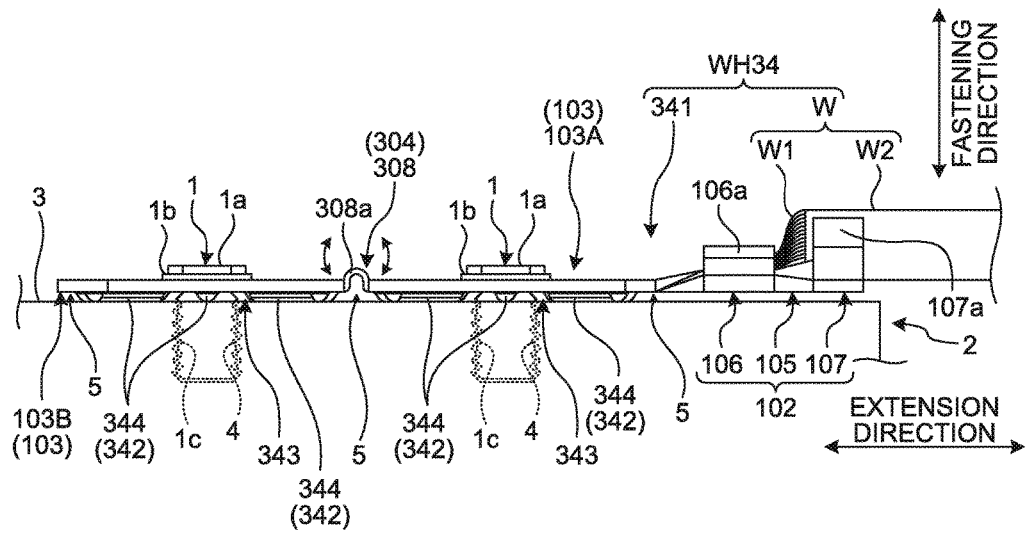
FIG. 48 is a side view illustrating the schematic configuration of the ground terminal in the fifteenth embodiment.
Figure 49:
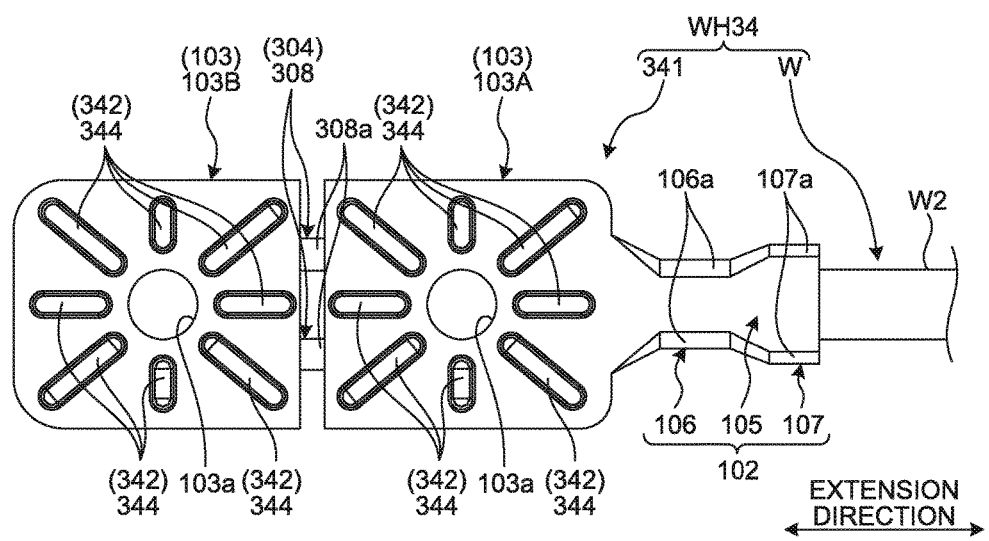
FIG. 49 is a plan view illustrating the schematic configuration of the ground terminal in the fifteenth embodiment.

FIG. 47 is a perspective view illustrating a schematic configuration of a ground terminal according to a fifteenth embodiment. FIG. 48 is a side view illustrating the schematic configuration of the ground terminal in the fifteenth embodiment. FIG. 49 is a plan view illustrating the schematic configuration of the ground terminal in the fifteenth embodiment (plan view at the side facing a grounding surface). The ground terminal and a wire harness in the fifteenth embodiment are different from those in the sixth, ninth, and twelfth embodiments in the configuration of projecting portions.

A ground terminal 341 in the embodiment as illustrated in FIG. 47, FIG. 48, and FIG. 49 is applied to, for example, a wire harness WH34 or the like. The wire harness WH34 includes the electric wire W and the ground terminal 341 provided at a terminal of the electric wire W. The ground terminal 341 in the embodiment includes projecting portions 342 instead of the projecting portions 312 of the above-mentioned ground terminal 311. The configurations of the ground terminal 341 other than the projecting portions 342 are substantially the same as those of the above-mentioned ground terminal 311 although shapes, sizes, and the like are slightly different therefrom.

The projecting portions 342 are portions that are formed so as to project from the fastening portions 103, and abut against the grounding surface 3 and form foreign matter avoiding space portions 343 between the fastening portions 103 and the grounding surface 3 in a state where the fastening portions 103 face the grounding surface 3. The projecting portions 342 function as spacers between the fastening portions 103 and the grounding surface 3 so that the foreign matter avoiding space portions 343 are formed as space portions capable of accommodating the foreign matters 5 as objects on the grounding surface 3 between the fastening portions 103 and the grounding surface 3.

The projecting portions 342 in the embodiment include bead portions 344 formed linearly so as to project toward the grounding surface 3 side from the surfaces of the fastening portions 103 that face the grounding surface 3. The bead portions 344 are provided on each of the fastening portions 103, in this example, each of the first fastening portion 103A and the second fastening portion 103B. The bead portions 344 have substantially the same configurations as those of the above-mentioned bead portions 144 although shapes, sizes, and the like are slightly different therefrom.

The ground terminal 341 and the wire harness WH34 as described above can absorb a step with the deformation portion 304 even when, for example, any of the fastening portions 103 runs onto the foreign matters 5 and can improve the possibility of the fastening portion 103 capable of facing and being fastened to the grounding surface 3 properly to exist, thereby being properly fastened to the grounding surface 3.

Furthermore, the ground terminal 341 and the wire harness WH34 as described above cause the front ends of the projecting portions 342 that are formed so as to project from the fastening portions 103 to abut against the grounding surface 3, thereby making the contact area with the grounding surface 3 relatively small. Moreover, the ground terminal 341 and the wire harness WH34 form the foreign matter avoiding space portions 343 between the fastening portions 103 and the grounding surface 3 and can therefore reduce the possibility of running onto the foreign matters 5, thereby being properly fastened to the grounding surface 3 more reliably.

In addition, the ground terminal 341 and the wire harness WH34 as described above enable the projecting portions 342 projecting from the fastening portions 103 to be easily provided with the bead portions 344. Furthermore, the ground terminal 341 and the wire harness WH34 enable the fastening portions 103 to stably abut against the grounding surface 3 so as to have the proper positional relation with the grounding surface 3 more reliably in comparison with the case when the projections 324 or the like are provided.

Sixteenth Embodiment

Figure 50:
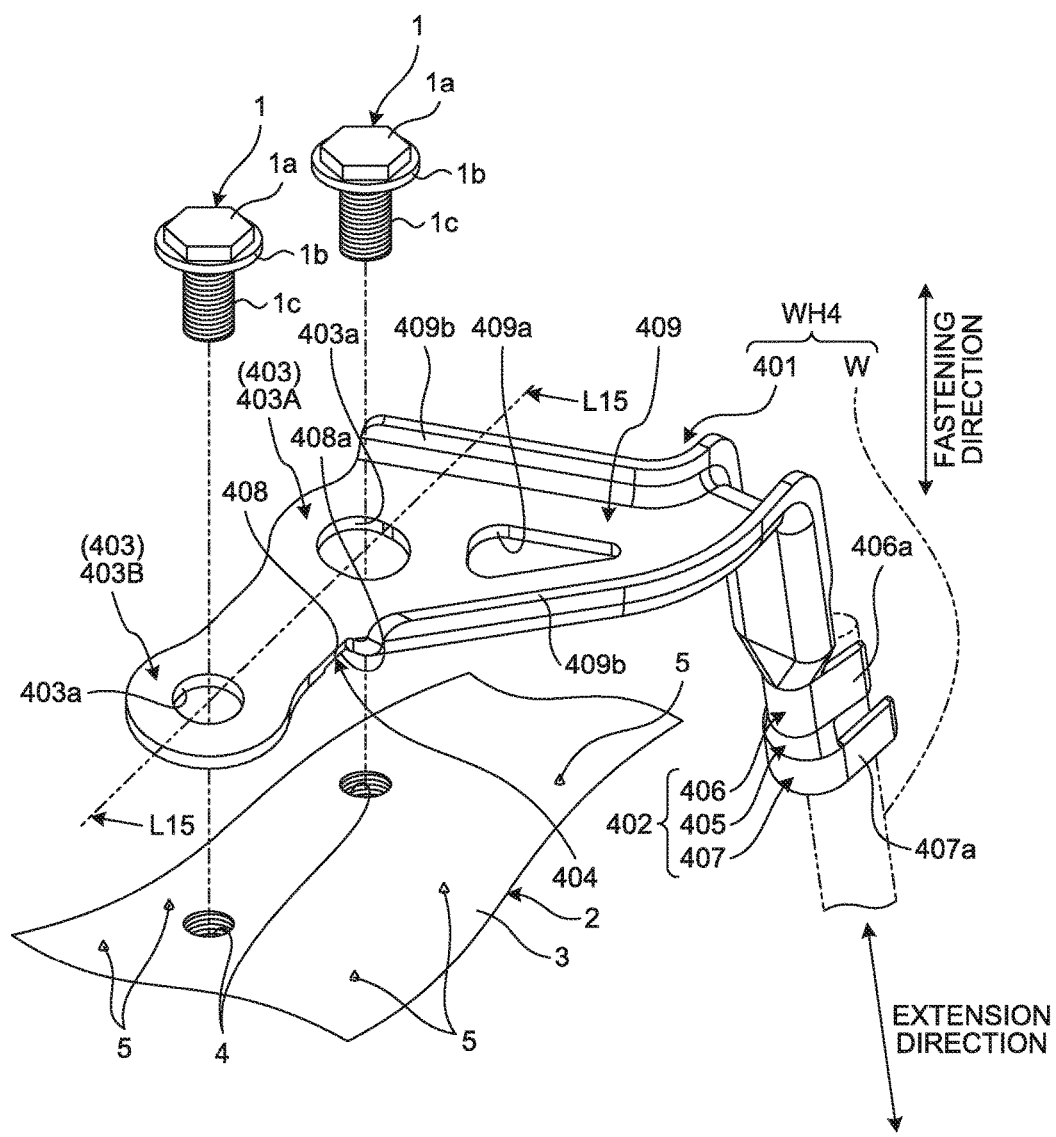
FIG. 50 is a perspective view illustrating a schematic configuration of a ground terminal according to a sixteenth embodiment.
Figure 51:
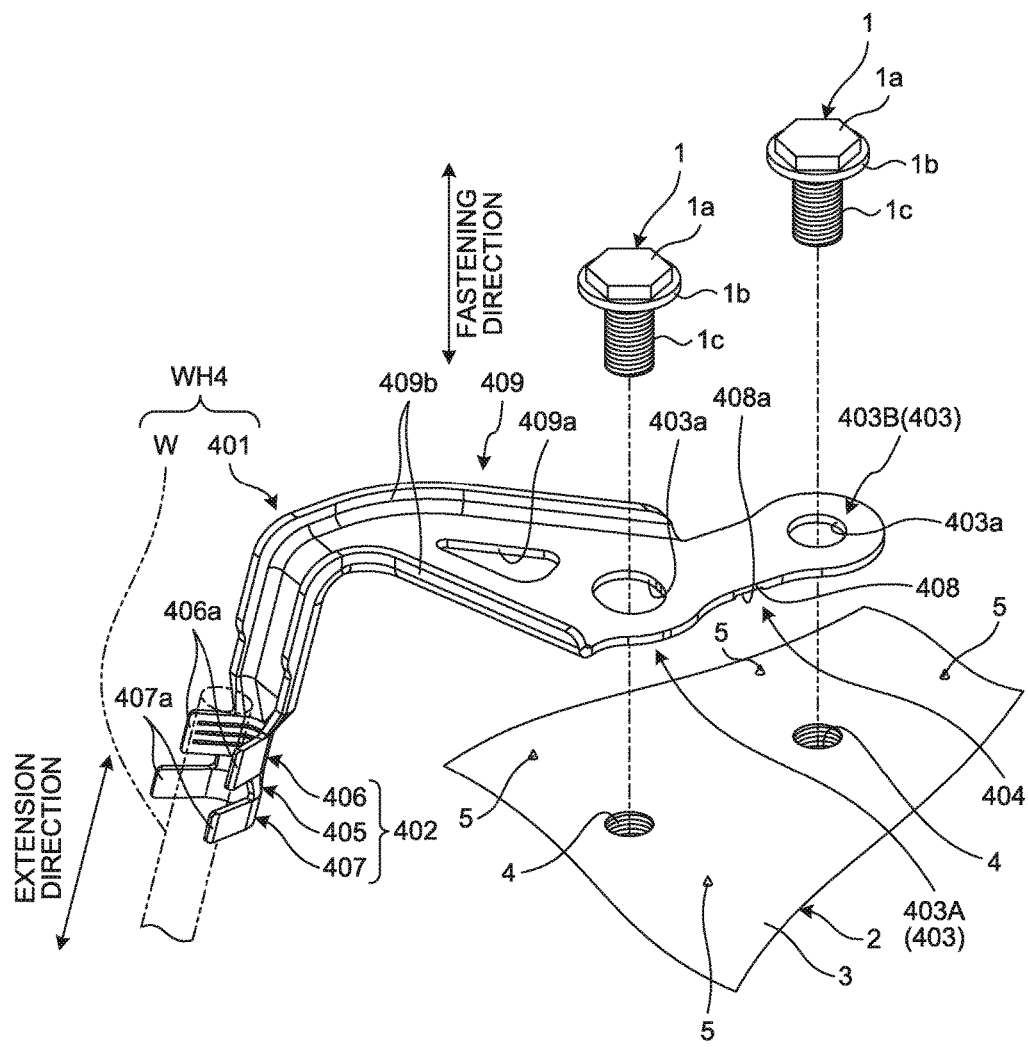
FIG. 51 is a perspective view illustrating the schematic configuration of the ground terminal in the sixteenth embodiment.
Figure 52:
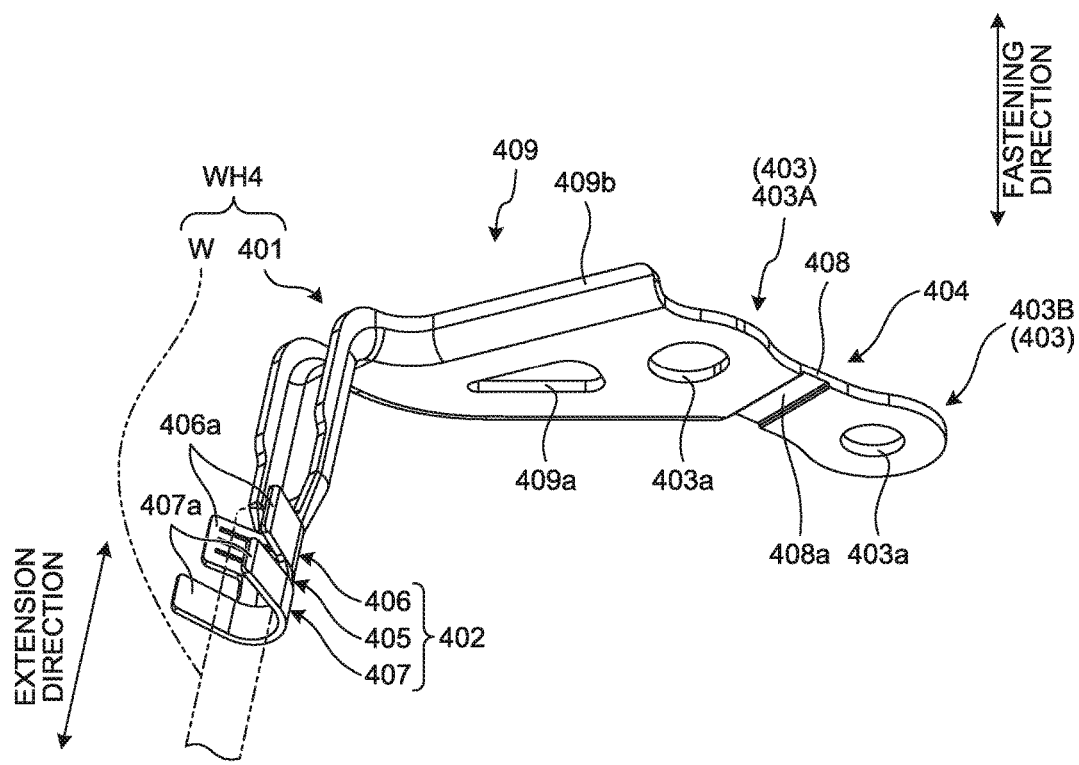
FIG. 52 is a perspective view illustrating the schematic configuration of the ground terminal in the sixteenth embodiment.
Figure 53:
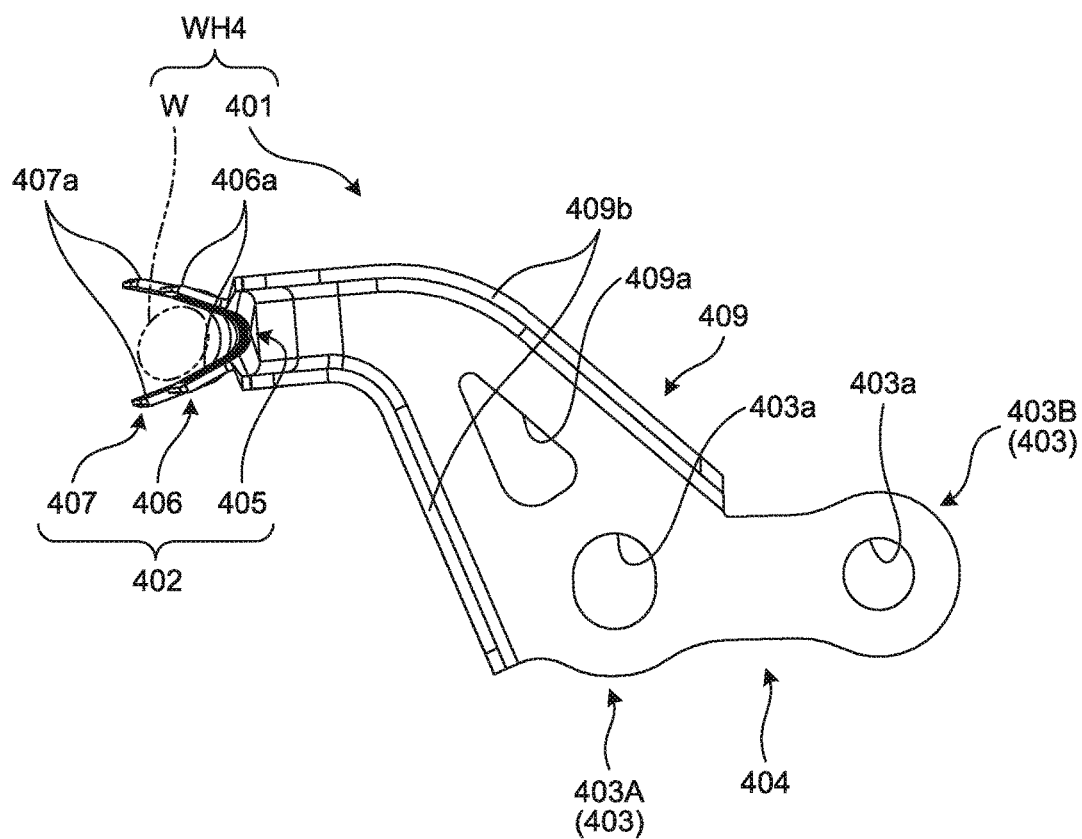
FIG. 53 is a plan view illustrating the schematic configuration of the ground terminal in the sixteenth embodiment.
Figure 54:
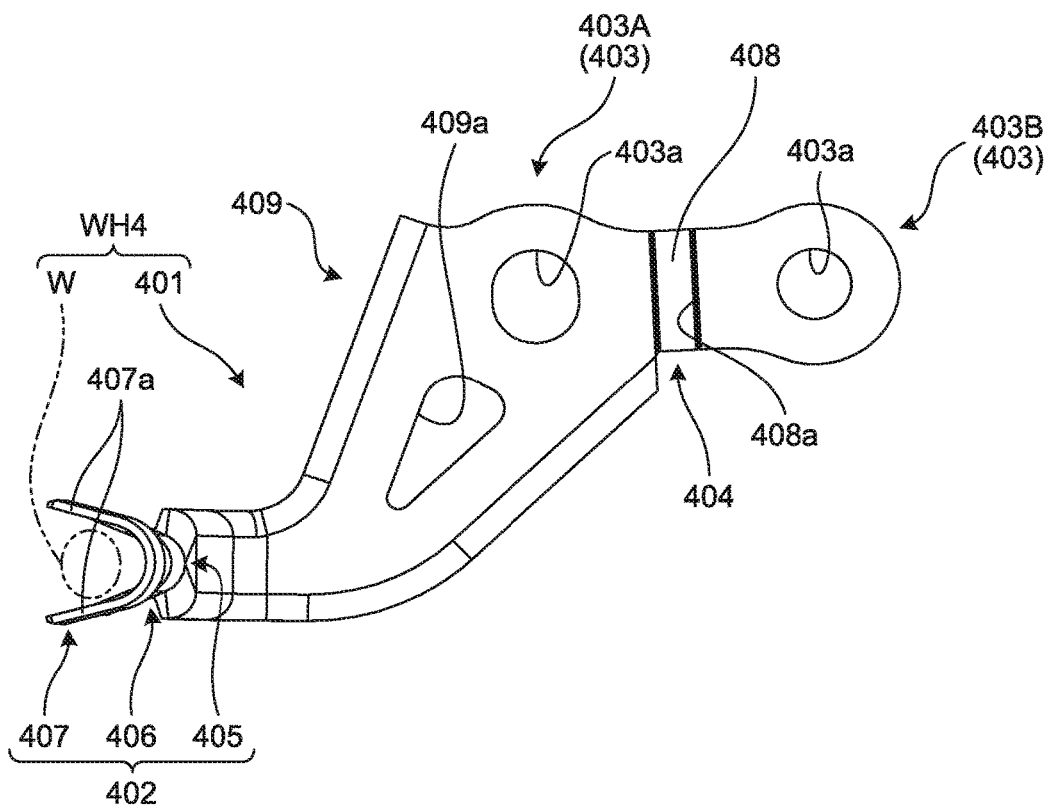
FIG. 54 is a plan view illustrating the schematic configuration of the ground terminal in the sixteenth embodiment.
Figure 55:
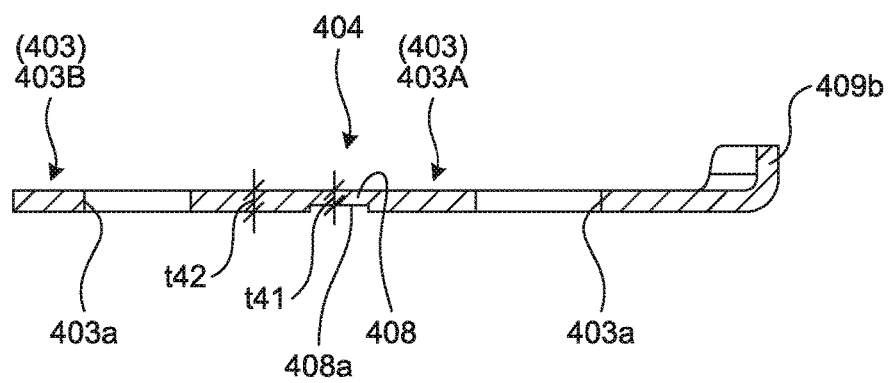
FIG. 55 is a cross-sectional view cut along line L15-L15 in FIG. 50.

FIG. 50, FIG. 51, and FIG. 52 are perspective views illustrating a schematic configuration of a ground terminal according to a sixteenth embodiment. FIG. 53 is a plan view illustrating the schematic configuration of the ground terminal in the sixteenth embodiment (plan view at the side facing a grounding surface). FIG. 54 is a plan view illustrating the schematic configuration of the ground terminal in the sixteenth embodiment (plan view at the side facing a grounding surface). FIG. 55 is a cross-sectional view cut along line L15-L15 in FIG. 50. The ground terminal and a wire harness in the sixteenth embodiment are different from those in the first embodiment and the like in the configuration of fastening portions. It should be noted that an electric wire is indicated by alternate long and two short dashes line in the respective drawings for plain illustration. The respective configurations of the electric wire are appropriately described with reference to FIG. 1 and the like.

A ground terminal 401 in the embodiment as illustrated in FIG. 50 to FIG. 55 is applied to, for example, a wire harness WH4 or the like. The wire harness WH4 includes the electric wire W and the ground terminal 401 provided at a terminal of the electric wire W. The ground terminal 401 in the embodiment includes a wire connecting portion 402, a plurality of fastening portions 403, and a deformation portion 404. The overall ground terminal 401 is integrally configured with conductive metal. The ground terminal 401 includes two fastening portions 403, that is, a first fastening portion 403A as the first fastening portion 403 and a second fastening portion 403B as the second fastening portion 403. In the following description, when the first fastening portion 403A and the second fastening portion 403B need not to be particularly distinguished from each other, they are simply referred to as the "fastening portion 403" in some cases.

The wire connecting portion 402 is a portion to which the electric wire W is connected. To be more specific, the wire connecting portion 402 includes a base portion 405 on which a terminal of the electric wire W is arranged, a conductor connecting portion 406 to which the linear conductor W1 (see FIG. 1 and the like) of the electric wire W is connected, and a cover connecting portion 407 to which the cover portion W2 of the electric wire W is connected. The base portion 405, the conductor connecting portion 406, and the cover connecting portion 407 have substantially the same configurations as those of the base portion 105, the conductor connecting portion 106, and the cover connecting portion 107 as described above although shapes, sizes, and the like are slightly different therefrom. The conductor connecting portion 406 includes a pair of caulking pieces 406a and the cover connecting portion 407 includes a pair of caulking pieces 407a. In the wire connecting portion 402, in a state where the terminal of the electric wire W at the side at which the linear conductor W1 is exposed is placed on the base portion 405, the linear conductor W1 is located at the side of the caulking pieces 406a, and the cover portion W2 is located at the side of the caulking pieces 407a, the linear conductor W1 is caulked together with the caulking pieces 406a and the cover portion W2 is caulked together with the caulking pieces 407a. With this, in the wire connecting portion 402, the linear conductor W1 is crimped between the caulking pieces 406a and the base portion 405 in the conductor connecting portion 406 and the cover portion W2 is crimped between the caulking pieces 407a and the base portion 405 in the cover connecting portion 407.

Each of the fastening portions 403 is a portion that is connected to the wire connecting portion 402 including the conductor connecting portion 406, is formed into a planar shape, and can be fastened to the grounding surface 3 through the fastening member 1 in a state of facing the grounding surface 3. The fastening portions 403 in the embodiment include the first fastening portion 403A and the second fastening portion 403B as described above. Both of the first fastening portion 403A and the second fastening portion 403B in the embodiment are formed into substantially circular plate shapes. The base portion 405 of the wire connecting portion 402 is connected to the first fastening portion 403A in the embodiment through a bending portion 409. The bending portion 409 is a portion that connects the first fastening portion 403A and the base portion 405. The bending portion 409 is formed into a substantially triangular shape tapered toward an end portion at the base portion 405 side from an end portion at the first fastening portion 403A side and the end portion at the base portion 405 side is bent substantially perpendicularly in the direction intersecting with the extension direction of the electric wire W. In this example, the bending portion 409 is configured by further including a punched hole portion 409a penetrating therethrough in the fastening direction and reinforcing flange portions 409b formed by bending edge portions. The second fastening portion 403B is connected to an end portion of the first fastening portion 403A at the side opposite to the bending portion 409 side through the deformation portion 404. The first fastening portion 403A and the second fastening portion 403B are formed into a planar shape so as to face and be substantially parallel with the grounding surface 3 in the fastening direction in a state of being fastened to the grounding surface 3. In this example, the normal line of the plane of the first fastening portion 403A and the second fastening portion 403B is typically along the fastening direction. To be more specific, in this example, the first fastening portion 403A and the second fastening portion 403B are formed on a plane different from the base portion 405. Both of the first fastening portion 403A and the second fastening portion 403B have fastening holes 403a formed at substantially center positions. The respective fastening holes 403a penetrate through the first fastening portion 403A and the second fastening portion 403B in the fastening direction and the fastening members 1 are inserted into the respective fastening holes 403a. When the shaft portions 1c of the fastening members 1 are inserted into the respective fastening holes 403a and the shaft portions 1c are screwed with the screw holes 4 in the grounding surface 3, the first fastening portion 403A and the second fastening portion 403B are held between the washers 1b and the grounding surface 3 and fastening force acts thereon. With this, the first fastening portion 403A and the second fastening portion 403B are fastened to the grounding surface 3. The fastening holes 403a formed in the first fastening portion 403A are long holes for absorbing tolerance.

The deformation portion 404 is a portion that connects the fastening portions 403 and is configured to be deformed more easily than the fastening portions 403. The deformation portion 404 is located between the first fastening portion 403A and the second fastening portion 403B and is configured as a portion connecting the first fastening portion 403A and the second fastening portion 403B. That is to say, the first fastening portion 403A is connected to the deformation portion 404 at one end side and the second fastening portion 403B is connected to the deformation portion 404 at the other end side facing the first fastening portion 403A.

The deformation portion 404 in the embodiment includes a thin portion 408 that is formed to be thinner than the fastening portions 403. The thin portion 408 has substantially the same configuration as that of the above-mentioned thin portion 108. The thin portion 408 is formed into a plate shape connecting the first fastening portion 403A and the second fastening portion 403B and is formed such that a plate thickness t41 (see FIG. 55) of the thin portion 408 along the fastening direction is smaller than a plate thickness t42 (see FIG. 55) of the first fastening portion 403A and the second fastening portion 403B. The thin portion 408 has a recess 408a that is formed at the surface side facing the grounding surface 3 in accordance with the difference between the plate thickness t41 and the plate thickness t42 in a state where the first fastening portion 403A and the second fastening portion 403B are fastened to the grounding surface 3 in substantially the same manner as the above-mentioned thin portion 108. That is to say, in this example, the surface of the thin portion 408 at the side facing the grounding surface 3 has a step with respect to the first fastening portion 403A and the second fastening portion 403B whereas the surface thereof at the side opposite to the side facing the grounding surface 3 is uniform with the first fastening portion 403A and the second fastening portion 403B on the same plane. The recess 408a is preferably formed such that the depth thereof along the fastening direction is larger than the previously supposed depths of the foreign matters 5. The thin portion 408 is formed in a range in which it does not overlap with portions of the first fastening portion 403A and the second fastening portion 403B that are held between the washers 1b and the grounding surface 3 and on which fastening force acts. The thin portion 408 configuring the deformation portion 404 in the embodiment is provided at a position facing the grounding surface 3 in the fastening direction in a state where the first fastening portion 403A and the second fastening portion 403B are fastened to the grounding surface 3.

The ground terminal 401 and the wire harness WH4 as described above can absorb a step with the deformation portion 404 even when, for example, any of the fastening portions 403 runs onto the foreign matters 5 and can improve the possibility of the fastening portion 403 capable of facing and being fastened to the grounding surface 3 properly to exist, thereby being properly fastened to the grounding surface 3.

The ground terminal 401 and the wire harness WH4 as described above can make the deformation portion 404 easy to be deformed with the thin portion 408 and can absorb a possibly generated step between the fastening portion 403 that has not run onto the foreign matters 5 and the fastening portion 403 that has run onto the foreign matters 5 by causing the thin portion 408 to function as a hinge. Furthermore, in the ground terminal 401 and the wire harness WH4, the deformation portion 404 can be easily formed by press processing or the like.

Furthermore, the ground terminal 401 and the wire harness WH4 as described above cause the recess 408a of the thin portion 408 to function as a foreign matter avoiding (escape) space portion for accommodating the foreign matters 5 as objects on the grounding surface 3 and preventing running onto the foreign matters 5, thereby reducing the possibility that the deformation portion 404 itself runs onto the foreign matters 5.

Moreover, the ground terminal 401 and the wire harness WH4 as described above enable the grounding surface 3 to function as a receiving surface of the deformation portion 404, thereby preventing excessive deformation of the deformation portion 404 and vibration from the deformation portion 404.

Seventeenth Embodiment

Figure 56:
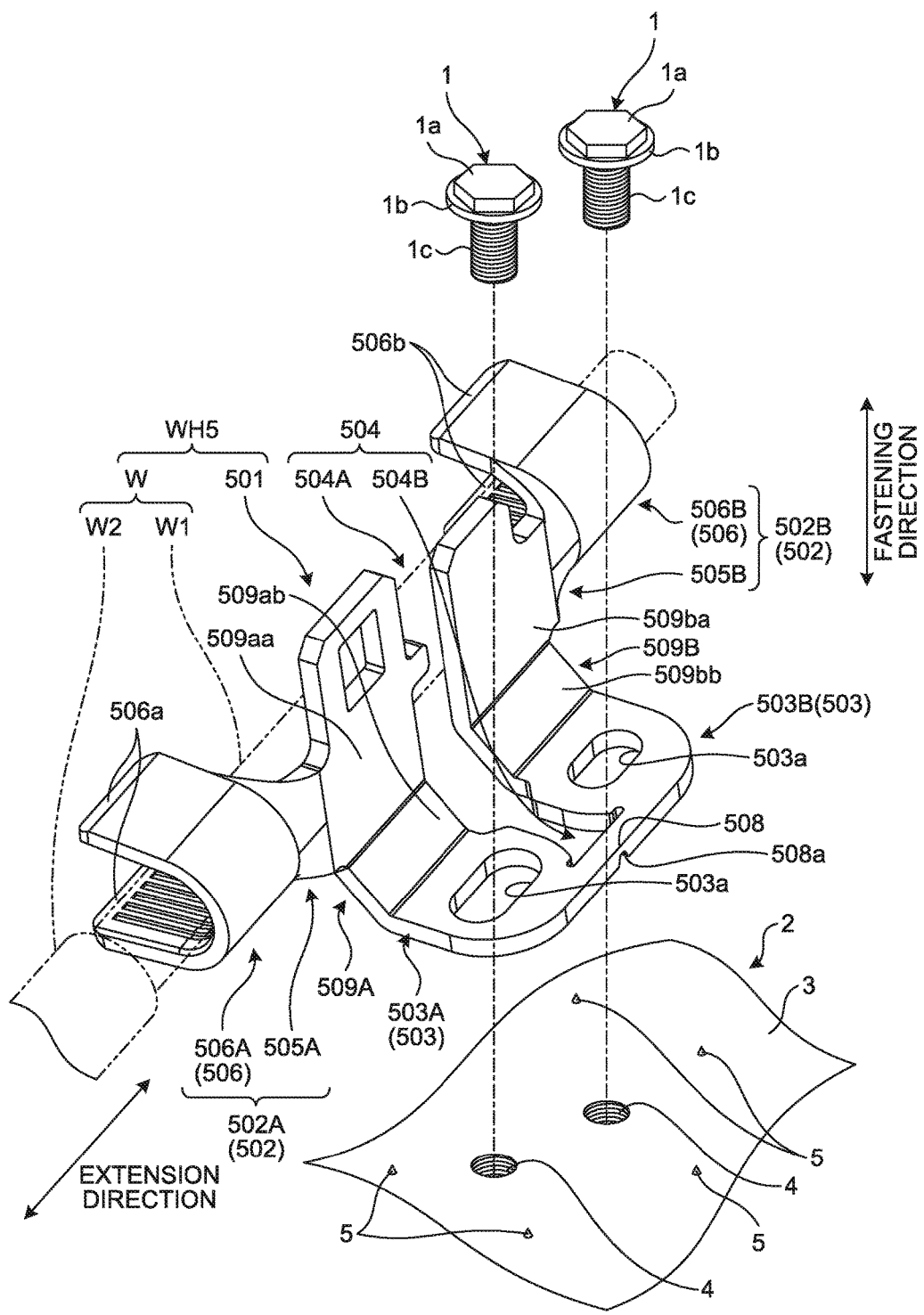
FIG. 56 is a perspective view illustrating a schematic configuration of a ground terminal according to a seventeenth embodiment.
Figure 57:
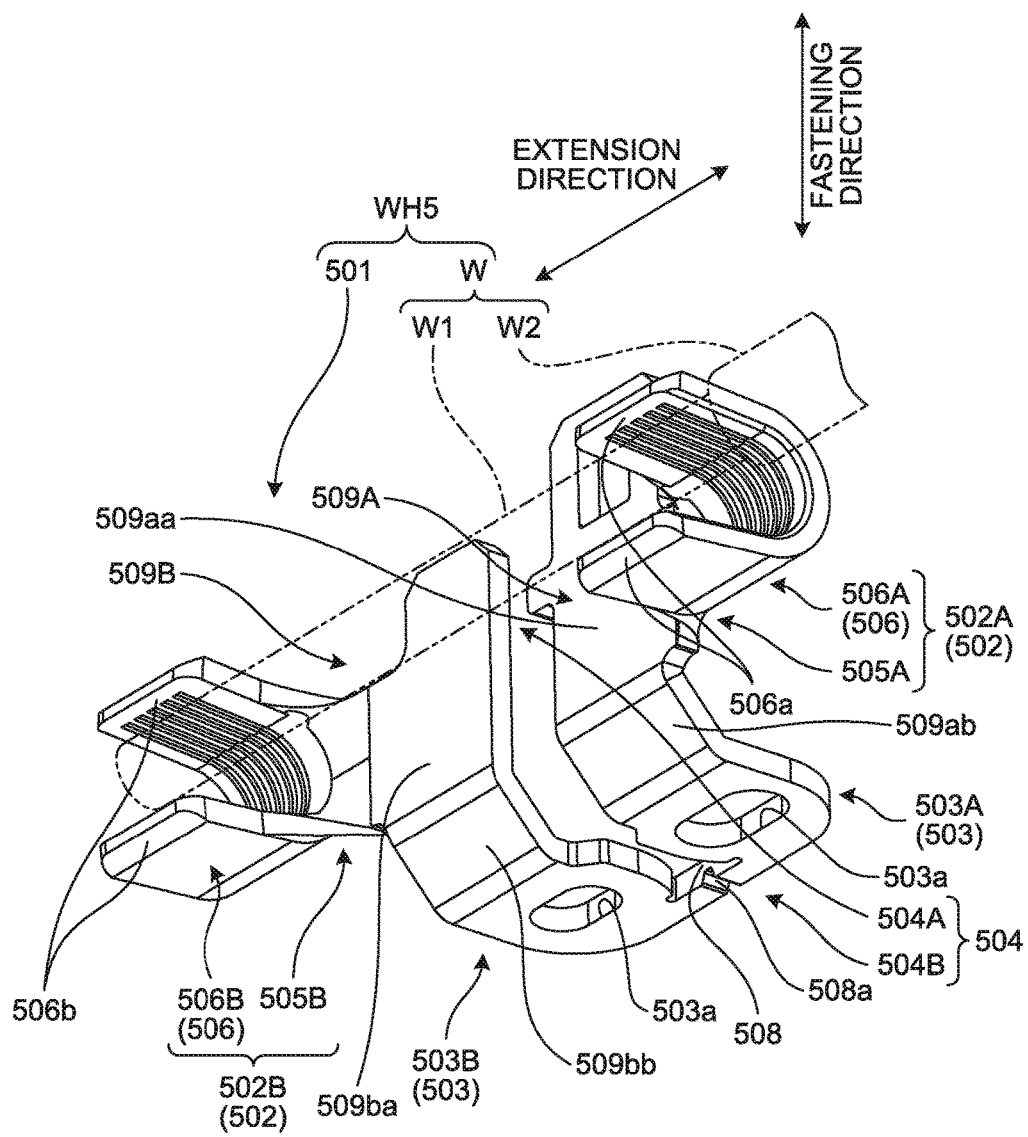
FIG. 57 is a perspective view illustrating the schematic configuration of the ground terminal in the seventeenth embodiment.
Figure 58:
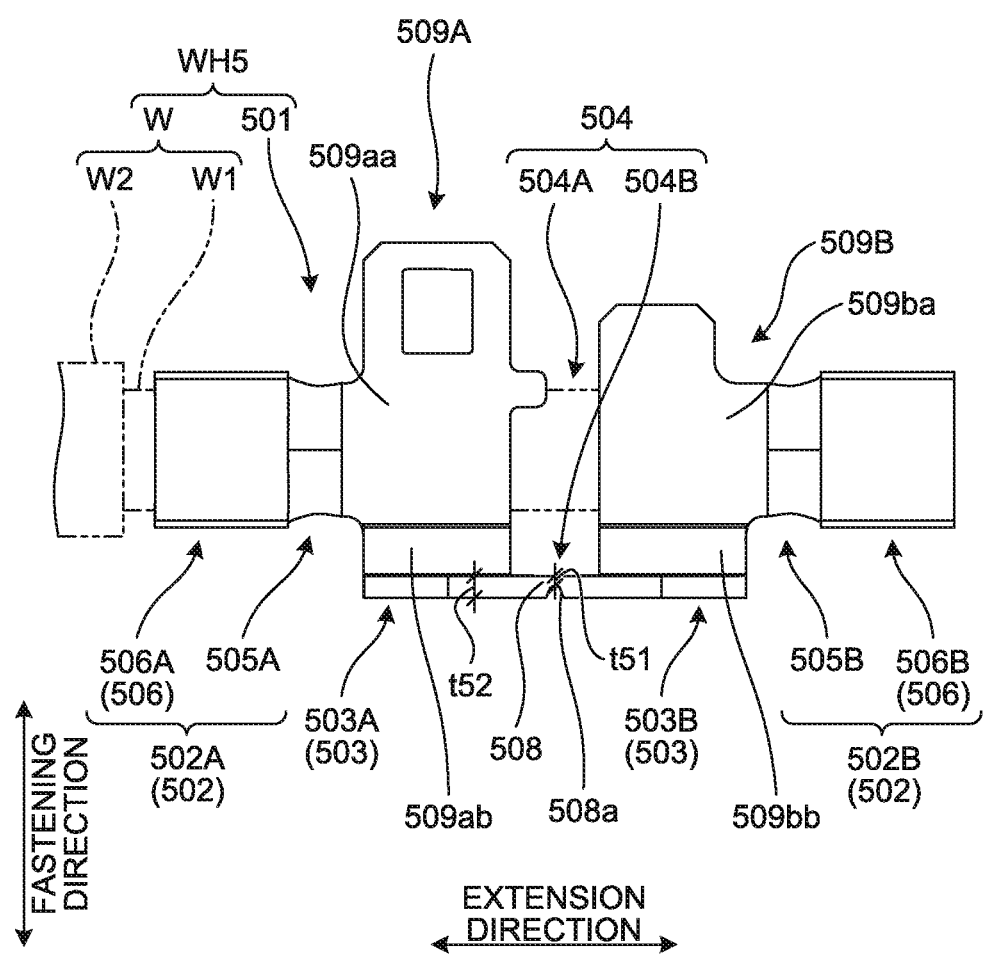
FIG. 58 is a side view illustrating the schematic configuration of the ground terminal in the seventeenth embodiment.

FIG. 56 and FIG. 57 are perspective views illustrating a schematic configuration of a ground terminal according to a seventeenth embodiment. FIG. 58 is a side view illustrating the schematic configuration of the ground terminal in the seventeenth embodiment. FIG. 59 is a plan view illustrating the schematic configuration of the ground terminal in the seventeenth embodiment (plan view at the side facing a grounding surface). The ground terminal and a wire harness in the seventeenth embodiment are different from those in the second embodiment in that a first deformation portion and a second deformation portion are included as deformation portions.

A ground terminal 501 in the embodiment as illustrated in FIG. 56 to FIG. 59 is applied to, for example, a wire harness WH5 or the like. The wire harness WH5 includes the electric wire W and the ground terminal 501 provided at a terminal of the electric wire W. The ground terminal 501 in the embodiment includes a plurality of wire connecting portions 502, a plurality of fastening portions 503, and a deformation portion 504.

The ground terminal 501 in the embodiment is integrally configured by sets of one wire connecting portion 502 and one fastening portion 503 with conductive metal. The ground terminal 501 includes two wire connecting portions 502, that is, a first wire connecting portion 502A as the first wire connecting portion 502 and a second wire connecting portion 502B as the second wire connecting portion 502. The ground terminal 501 includes two fastening portions 503, that is, a first fastening portion 503A as the first fastening portion 503 and a second fastening portion 503B as the second fastening portion 503. In the ground terminal 501, the first wire connecting portion 502A and the first fastening portion 503A are integrally formed and the second wire connecting portion 502B and the second fastening portion 503B are integrally formed, and they are connected to each other by the deformation portion 504. In this example, the first wire connecting portion 502A and the first fastening portion 503A and the second wire connecting portion 502B and the second fastening portion 503B are integrally formed through a second deformation portion 504B, which will be described later. In the following description, when the first wire connecting portion 502A and the second wire connecting portion 502B need not to be particularly distinguished from each other, they are simply referred to as the "wire connecting portion 502" in some cases. Furthermore, when the first fastening portion 503A and the second fastening portion 503B need not to be particularly distinguished from each other, they are simply referred to as the "fastening portion 503" in some cases.

The wire connecting portions 502 are portions to which the electric wire W is connected. The first wire connecting portion 502A includes a first base portion 505A on which a terminal of the electric wire W is arranged and a first conductor connecting portion 506A to which the linear conductor W1 of the electric wire W is connected and the second wire connecting portion 502B includes a second base portion 505B on which a terminal of the electric wire W is arranged and a second conductor connecting portion 506B to which the linear conductor W1 of the electric wire W is connected. The first base portion 505A, the first conductor connecting portion 506A and the second base portion 505B, and the second conductor connecting portion 506B are located so as to face each other in the extension direction of the electric wire W. The first base portion 505A, the second base portion 505B, the first conductor connecting portion 506A, and the second conductor connecting portion 506B have substantially the same configurations as those of the base portion 105, the conductor connecting portion 106, and the like as described above although shapes, sizes, and the like are slightly different therefrom. The first conductor connecting portion 506A includes a pair of caulking pieces 506a and the second conductor connecting portion 506B includes a pair of caulking pieces 506b. In the first conductor connecting portion 506A, in a state where the linear conductor W1 at the terminal of the electric wire W at the side at which the linear conductor W1 is exposed is held between the first base portion 505A and the pair of caulking pieces 506a, the linear conductor W1 is caulked together with the caulking pieces 506a and the linear conductor W1 is thereby crimped between the caulking pieces 506a and the first base portion 505A. In the second conductor connecting portion 506B, in a state where the linear conductor W1 at the terminal of the electric wire W at the side at which the linear conductor W1 is exposed at the terminal leading end side of the linear conductor W1 relative to the first conductor connecting portion 506A is held between the second base portion 505B and the pair of caulking pieces 506b, the linear conductor W1 is caulked together with the caulking pieces 506b and the linear conductor W1 is thereby crimped between the caulking pieces 506b and the second base portion 505B. In the following description, when the first conductor connecting portion 506A and the second conductor connecting portion 506B need not to be particularly distinguished from each other, they are simply referred to as the "conductor connecting portion 506" in some cases.

Each of the fastening portions 503 is a portion that is connected to the first conductor connecting portion 506A or the second conductor connecting portion 506B, is formed into a planar shape, and can be fastened to the grounding surface 3 through the fastening member 1 in a state of facing the grounding surface 3. The fastening portions 503 in the embodiment include the first fastening portion 503A and the second fastening portion 503B as described above. Both of the first fastening portion 503A and the second fastening portion 503B in the embodiment are formed into substantially long hole plate shapes. The first fastening portion 503A in the embodiment is connected to the first base portion 505A of the first wire connecting portion 502A through a first bending portion 509A and the second fastening portion 503B is connected to the second base portion 505B of the second wire connecting portion 502B through a second bending portion 509B. Furthermore, the first fastening portion 503A and the second fastening portion 503B are integrally connected to each other through the second deformation portion 504B, which will be described later. The first bending portion 509A is a portion that connects the first fastening portion 503A and the first base portion 505A and the second bending portion 509B is a portion that connects the second fastening portion 503B and the second base portion 505B. The first bending portion 509A is formed into a substantially rectangular plate shape and includes a rectangular portion 509aa and a bent end portion 509ab. The rectangular portion 509aa is formed so as to extend to the second conductor connecting portion 506B side from the first base portion 505A along the extension direction. The bent end portion 509ab is formed so as to project from the rectangular portion 509aa in the direction intersecting with the extension direction and be bent with respect to the rectangular portion 509aa. The first fastening portion 503A is connected to an end portion of the bent end portion 509ab at the side opposite to the rectangular portion 509aa side on the first bending portion 509A, and the first fastening portion 503A and the first bending portion 509A as a whole are thereby formed into a substantially L shape when seen along the extension direction. The second bending portion 509B is formed into a substantially rectangular plate shape and includes a rectangular portion 509ba and a bent end portion 509bb. The rectangular portion 509ba is formed so as to extend to the first conductor connecting portion 506A side from the second base portion 505B along the extension direction. The bent end portion 509bb is formed so as to project from the rectangular portion 509ba in the direction intersecting with the extension direction and be bent with respect to the rectangular portion 509ba. The second fastening portion 503B is connected to an end portion of the bent end portion 509bb at the side opposite to the rectangular portion 509ba side on the second bending portion 509B, and the second fastening portion 503B and the second bending portion 509B as a whole are thereby formed into a substantially L shape when seen along the extension direction. The rectangular portion 509aa of the first bending portion 509A and the rectangular portion 509ba of the second bending portion 509B are located at the first conductor connecting portion 506A side and at the second conductor connecting portion 506B side, respectively, between the first conductor connecting portion 506A and the second conductor connecting portion 506B in the extension direction and the respective end surfaces thereof face each other in the extension direction. The first fastening portion 503A and the second fastening portion 503B are formed into a planar shape so as to face and be substantially parallel with the grounding surface 3 in the fastening direction in a state of being fastened to the grounding surface 3, and the normal line of the plane is substantially orthogonal to the extension direction. In this example, the normal line of the plane of the first fastening portion 503A and the second fastening portion 503B is typically along the fastening direction. Both of the first fastening portion 503A and the second fastening portion 503B have fastening holes 503*a* formed at substantially center positions. The respective fastening holes 503*a* penetrate through the first fastening portion 503A and the second fastening portion 503B in the fastening direction and the fastening members 1 are inserted into the respective fastening holes 503*a*. When the shaft portions 1*c* of the fastening members 1 are inserted into the respective fastening holes 503*a* and the shaft portions 1*c* are screwed with the screw holes 4 in the grounding surface 3, the first fastening portion 503A and the second fastening portion 503B are held between the washers 1*b* and the grounding surface 3 and fastening force acts thereon. With this, the first fastening portion 503A and the second fastening portion 503B are fastened to the grounding surface 3. The respective fastening holes 503*a* are long holes for absorbing tolerance.

The deformation portion 504 is a portion that connects the fastening portions 503 and is configured to be deformed more easily than the fastening portions 503. The deformation portion 504 in the embodiment includes a first deformation portion 504A and the second deformation portion 504B.

The first deformation portion 504A is located between the first conductor connecting portion 506A and the second conductor connecting portion 506B in the extension direction and is configured as a portion connecting the fastening portions 503 through the first conductor connecting portion 506A and the second conductor connecting portion 506B. To be more specific, the first deformation portion 504A includes the linear conductor W1 that connects the fastening portions 503 through the respective conductor connecting portions 506 and is more flexible than the fastening portions 503. That is to say, in this example, the first deformation portion 504A is also utilized as the linear conductor W1 that configures the electric wire W and is more flexible than the fastening portions 503. The linear conductor W1 is provided so as to bridge between the first conductor connecting portion 506A and the second conductor connecting portion 506B and connects the first fastening portion 503A and the second fastening portion 503B through the respective conductor connecting portions 506. The linear conductor W1 configuring the first deformation portion 504A in the embodiment is provided at a position facing the grounding surface 3 in the fastening direction in a state where the first fastening portion 503A and the second fastening portion 503B are fastened to the grounding surface 3.

On the other hand, the second deformation portion 504B is located between the first fastening portion 503A and the second fastening portion 503B in the extension direction and is configured as a portion connecting the first fastening portion 503A and the second fastening portion 503B. To be more specific, the second deformation portion 504B connects the fastening portions 503 connected by the above-mentioned first deformation portion 504A and includes a thin portion 508 formed to be thinner than the fastening portions 503. The thin portion 508 has substantially the same configuration as that of the above-mentioned thin portion 108, is formed into a plate bar shape connecting the first fastening portion 503A and the second fastening portion 503B, and is formed such that a plate thickness t51 (see FIG. 58) along the fastening direction is smaller than a plate thickness t52 (see FIG. 58) of the first fastening portion 503A and the second fastening portion 503B. The thin portion 508 has a recess 508*a* that is formed at the surface side facing the grounding surface 3 in accordance with the difference between the plate thickness t51 and the plate thickness t52 in a state where the first fastening portion 503A and the second fastening portion 503B are fastened to the grounding surface 3 in substantially the same manner as the above-mentioned thin portion 108. That is to say, in this example, the surface of the thin portion 508 at the side facing the grounding surface 3 has a step with respect to the first fastening portion 503A and the second fastening portion 503B whereas the surface thereof at the side opposite to the side facing the grounding surface 3 is uniform with the first fastening portion 503A and the second fastening portion 503B on the same plane. The recess 508*a* is preferably formed such that the depth thereof along the fastening direction is larger than the previously supposed depths of the foreign matters 5. The thin portion 508 is formed in a range in which it does not overlap with portions of the first fastening portion 503A and the second fastening portion 503B that are held between the washers 1*b* and the grounding surface 3 and on which fasting force acts. The thin portion 508 configuring the deformation portion 504 in the embodiment is provided at a position facing the grounding surface 3 in the fastening direction in a state where the first fastening portion 503A and the second fastening portion 503B are fastened to the grounding surface 3.

The ground terminal 501 and the wire harness WH5 as described above can absorb a step with the deformation portion 504 even when, for example, any of the fastening portions 503 runs onto the foreign matters 5 and can improve the possibility of the fastening portion 503 capable of facing and being fastened to the grounding surface 3 properly to exist, thereby being properly fastened to the grounding surface 3.

Furthermore, with the ground terminal 501 and the wire harness WH5 as described above, at least one conductor connecting portion 506 is provided corresponding to each of the fastening portions 503 and the deformation portion 504 has the first deformation portion 504A including the linear conductor W1 that connects the fastening portions 503 through the respective conductor connecting portions 506 and is more flexible than the fastening portions 503 and the second deformation portion 504B including the thin portion 508 that connects the fastening portions 503 connected by the first deformation portion 504A and is formed to be thinner than the fastening portions 503. Accordingly, the ground terminal 501 and the wire harness WH5 can make the first deformation portion 504A easy to be deformed with the flexible linear conductor W1 and can absorb a possibly generated step between the fastening portion 503 that has not run onto the foreign matters 5 and the fastening portion 503 that has run onto the foreign matters 5 with flexible movement of the linear conductor W1. In addition, the ground terminal 501 and the wire harness WH5 can fix a relative positional relation of the fastening portions 503 by further connecting the fastening portions 503 connected by the first deformation portion 504A through the second deformation portion 504B configured by the thin portion 508, thereby making the respective fastening holes 503*a* formed in the respective fastening portions 503 be easy to be aligned with the screw holes 4. Although variation is possibly easy to be generated in the relative positional relation of the respective fastening holes 503*a* by configuring the first deformation portion 504A by the linear conductor W1 that is relatively easy to be deformed, the ground terminal 501 and the wire harness WH5 can eliminate this contradiction by further connecting the fastening portions 503 connected by the first deformation portion 504A through the second deformation portion 504B configured by the thin portion 508, thereby improving mounting operability. The ground terminal 501 and the wire harness WH5 can make the second deformation portion 504B easy to be deformed by the thin portion 508 and can absorb a possibly generated step between the fastening portion 503 that has not run onto the foreign matters 5 and the fastening portion 503 that has run onto the foreign matters 5 by causing the thin portion 508 to function as a hinge. Furthermore, the ground terminal 501 and the wire harness WH5 cause a space portion between the fastening portions 503 connected by the linear conductor W1 and the recess 508a of the thin portion 508 to function as foreign matter avoiding (escape) space portions for preventing running onto the foreign matters 5 as objects on the grounding surface 3, thereby reducing the possibility that the deformation portion 504 itself runs onto the foreign matters 5.

Moreover, the ground terminal 501 and the wire harness WH5 as described above enable the grounding surface 3 to function as a receiving surface of the first deformation portion 504A and the second deformation portion 504B, thereby preventing excessive deformation of the first deformation portion 504A and the second deformation portion 504B and vibration from the first deformation portion 504A and the second deformation portion 504B.

The ground terminal and the wire harness according to each of the above-mentioned embodiments are not limited to the above-mentioned embodiments and various changes can be made in a range as described in the scope of the invention. The ground terminal and the wire harness according to the embodiment may be configured by appropriately combining components in the respective embodiments and modifications as described above.

In the above description, the fixing portion 2 is configured by, for example, the vehicle body or the like and the planar grounding surface 3 thereof is configured by applying the non-conductive film such as the coating film to the surface of the housing made of the conductive metal. The configuration is not limited thereto. For example, the coating film or the like may not be applied.

In the above description, the electric wire W may not include the cover portion W2 and the wire connecting portion may not include the cover connecting portion.

In the above description, the ground terminal includes the two fastening portions. The ground terminal is not however limited thereto and may include equal to or more than three fastening portions.

The ground terminal and the wire harness according to the embodiment can improve the possibility of the fastening portion capable of being fastened to the grounding surface to exist without running onto objects such as fine foreign matters by providing the fastening portions that are fastened to the grounding surface even when, for example, the foreign matters adhere to the grounding surface. Furthermore, the ground terminal and the wire harness can absorb a possibly generated step between the fastening portion that has not run onto the foreign matters and the fastening portion that has run onto the foreign matters with deformation of the deformation portion. The fastening portion that has not run onto the foreign matters can therefore be prevented from following the fastening portion that has run onto the foreign matters and being influenced by the foreign matters. As a result, the ground terminal and the wire harness can absorb a step with the deformation portion even when, for example, any of the fastening portions runs onto the foreign matters and can improve the possibility of the fastening portion capable of facing and being fastened to the grounding surface properly to exist, thereby providing an effect of being properly fastened to the grounding surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ground terminal comprising:
    a conductor connecting portion to which a linear conductor is connected;
    a plurality of fastening portions each of which is connected to the conductor connecting portion, is formed into a planar shape, and is configured to be individually fastened to a grounding surface through a respective fastening member of a plurality of fastening members in a state of facing the grounding surface; and
    a deformation portion that is located between the fastening portions, connects the fastening portions and is deformed more easily than the fastening portions,
    wherein the plurality of fastening portions each have a fastening hole,
    wherein the deformation portion includes a thin portion that is formed to be thinner than the fastening portions,
    wherein the thin portion has a recess at a lower side surface side facing the grounding surface, and a planar upper side surface, opposite the lower side surface and facing away from the grounding surface,
    wherein the planar upper side surface and the plurality of fastening portions are in a same plane, and
    wherein end portions of the thin portion in a direction orthogonal to both an extension direction and a fastening direction, have a curved shale, the extension direction being a direction along which the plurality of fastening portions are arranged and the fastening direction being a direction in which the plurality of fastening members fasten the plurality of fastening portions to the grounding surface.

2. The ground terminal according to claim 1, further comprising:
    projecting portions that are formed so as to project from the fastening portions, abut against the grounding surface, and form foreign matter avoiding space portions capable of accommodating objects on the grounding surface between the fastening portions and the grounding surface, in a state where the fastening portions face the grounding surface.

3. The ground terminal according to claim 1, wherein a surface of the recess facing the grounding surface is a planar surface that is parallel to the planar upper side surface.

* * * * *